US012804444B2

(12) United States Patent
Cirik et al.

(10) Patent No.: US 12,804,444 B2
(45) Date of Patent: Nov. 17, 2026

(54) BEAM MANAGEMENT IN EVENT TRIGGERED REPORTING

(71) Applicant: Ofinno, LLC, Reston, VA (US)

(72) Inventors: Ali Cagatay Cirik, Chantilly, VA (US); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/375,567

(22) Filed: Oct. 31, 2025

(65) Prior Publication Data

US 2026/0129493 A1 May 7, 2026

Related U.S. Application Data

(60) Provisional application No. 63/716,294, filed on Nov. 5, 2024.

(51) Int. Cl.
*H04W 24/10* (2009.01)
*H04B 7/06* (2006.01)

(52) U.S. Cl.
CPC .......... *H04W 24/10* (2013.01); *H04B 7/0626* (2013.01)

(58) Field of Classification Search
CPC ..... H04B 7/0626; H04W 24/10; H04W 72/23
See application file for complete search history.

(56) References Cited

U.S. PATENT DOCUMENTS 10,834,777 B2 11/2020 Babaei et al.
10,855,396 B2 12/2020 Zhou et al.
11,006,305 B2 5/2021 Babaei et al.
11,025,331 B2 6/2021 Cirik et al.
11,336,400 B2 5/2022 Zhou et al.
11,363,627 B2 6/2022 Cirik et al.
11,546,963 B2 1/2023 Cirik et al.
11,729,800 B2 8/2023 Xu et al.
11,765,613 B2 9/2023 Babaei et al.
11,777,664 B2 10/2023 Zhou et al.
(Continued)

FOREIGN PATENT DOCUMENTS

WO 2025/235694 A1 11/2025

OTHER PUBLICATIONS

Extended European Search Report mailed Mar. 24, 2026 in EP Patent Application No. 25212993.7.
(Continued)

*Primary Examiner* — Liton Miah
(74) *Attorney, Agent, or Firm* — Jacob L. Mangan; Kavon Nasabzadeh; Brett K. Gardner

(57) ABSTRACT

A wireless device receives one or more radio resource control (RRC) messages comprising one or more configuration parameters of a cell, where the one or more configuration parameters comprise a first parameter indicating a TCI state, among a first TCI state and a second TCI state, to apply to a first set of reference signals for channel state information (CSI) reporting triggered by the wireless device. The wireless device receives a control command indicating the first TCI state and the second TCI state. The wireless device triggers a CSI report based on a first radio link quality of at least one reference signal in the first set of reference signals being higher, by a threshold value, than a second radio link quality of a reference signal indicated by the TCI state indicated by the first parameter.

20 Claims, 31 Drawing Sheets

(56) References Cited

U.S. PATENT DOCUMENTS

| | | | |
|---|---|---|---|
| 11,844,138 B2 | 12/2023 | Babaei et al. | |
| 11,889,519 B2 | 1/2024 | Cirik et al. | |
| 11,929,805 B2 | 3/2024 | Zhou et al. | |
| 11,997,606 B2 | 5/2024 | Zhou et al. | |
| 12,010,701 B2 | 6/2024 | Cirik et al. | |
| 12,016,016 B2 | 6/2024 | Yi et al. | |
| 12,581,502 B2 * | 3/2026 | Kung | H04B 7/0696 |
| 2020/0350967 A1 | 11/2020 | Xu et al. | |
| 2021/0007138 A1 | 1/2021 | Xu et al. | |
| 2021/0028843 A1 * | 1/2021 | Zhou | H04B 7/063 |
| 2021/0328644 A1 * | 10/2021 | Hao | H04B 7/0486 |
| 2021/0360631 A1 | 11/2021 | Cirik et al. | |
| 2022/0007399 A1 | 1/2022 | Rastegardoost et al. | |
| 2022/0159417 A1 | 5/2022 | Zhou et al. | |
| 2022/0217743 A1 | 7/2022 | Zhou et al. | |
| 2022/0264313 A1 | 8/2022 | Babaei et al. | |
| 2022/0353707 A1 | 11/2022 | Cirik et al. | |
| 2022/0353892 A1 | 11/2022 | Cirik et al. | |
| 2022/0361202 A1 | 11/2022 | Yi et al. | |
| 2022/0377780 A1 | 11/2022 | Khoshkholgh Dashtaki et al. | |
| 2023/0041095 A1 | 2/2023 | Zhou et al. | |
| 2023/0171788 A1 | 6/2023 | Kung et al. | |
| 2023/0180242 A1 | 6/2023 | Cirik et al. | |
| 2023/0199796 A1 | 6/2023 | Cirik et al. | |
| 2023/0209386 A1 | 6/2023 | Khoshkholgh Dashtaki et al. | |
| 2023/0254852 A1 | 8/2023 | Cirik et al. | |
| 2023/0254853 A1 | 8/2023 | Cirik et al. | |
| 2023/0284065 A1 * | 9/2023 | Zhou | H04B 17/30 370/252 |
| 2023/0291455 A1 | 9/2023 | Xu et al. | |
| 2023/0337247 A1 * | 10/2023 | Cirik | H04W 74/0808 |
| 2023/0345493 A1 | 10/2023 | Cirik et al. | |
| 2023/0413078 A1 | 12/2023 | Cirik et al. | |
| 2024/0014946 A1 | 1/2024 | Zhou et al. | |
| 2024/0030982 A1 | 1/2024 | Cirik et al. | |
| 2024/0032082 A1 | 1/2024 | Xu et al. | |
| 2024/0114520 A1 | 4/2024 | Cirik et al. | |
| 2024/0187128 A1 * | 6/2024 | Fröberg Olsson | H04L 1/005 |
| 2026/0012821 A1 * | 1/2026 | Zhu | H04W 24/08 |

OTHER PUBLICATIONS

3GPP TS 38.211 V18.2.0 (Mar. 2024); Technical Specification; 3rd Generation Partnership Project; Technical Specification Group Radio Access Network; NR; Physical channels and modulation; (Release 18).

3GPP TS 38.212 V18.4.0 (Sep. 2024); Technical Specification; 3rd Generation Partnership Project; Technical Specification Group Radio Access Network; NR; Multiplexing and channel coding; (Release 18).

3GPP TS 38.213 V18.4.0 (Sep. 2024); Technical Specification; 3rd Generation Partnership Project; Technical Specification Group Radio Access Network; NR; Physical layer procedures for control (Release 18).

3GPP TS 38.214 V18.4.0 (Sep. 2024); Technical Specification; 3rd Generation Partnership Project; Technical Specification Group Radio Access Network; NR; Physical layer procedures for data; (Release 18).

3GPP TS 38.300 V18.3.0 (Sep. 2024); Technical Specification; 3rd Generation Partnership Project; Technical Specification Group Radio Access Network; NR; NR and NG-RAN Overall Description; Stage 2; (Release 18).

3GPP TS 38.306 V18.3.0 (Sep. 2024); Technical Specification; 3rd Generation Partnership Project; Technical Specification Group Radio Access Network; NR; User Equipment (UE) radio access capabilities; (Release 18).

3GPP TS 38.321 V18.3.0 (Sep. 2024);Technical Specification; 3rd Generation Partnership Project; Technical Specification Group Radio Access Network; NR; Medium Access Control (MAC) protocol specification; (Release 18).

3GPP TS 38.331 V18.3.0 (Sep. 2024); Technical Specification; 3rd Generation Partnership Project; Technical Specification Group Radio Access Network; NR; Radio Resource Control (RRC) protocol specification; (Release 18).

R1-2407622; 3GPP TSG RAN WG1 Meeting #118bis; Hefei, China, Oct. 14-18, 2024; Agenda Item: 9.2.1; Source: Futurewei; Title: Enhancements for UE-initiated/Event-driven Beam Management; Document for: Discussion and decision.

R1-2407678; 3GPP TSG-RAN WG1 Meeting #118bis; Hefei, China, Oct. 14-18, 2024; Agenda Item: 9.2.1; Source: Huawei, HiSilicon; Title: On UE initiated/event-driven beam management; Document for: Discussion and Decision.

R1-2407698; 3GPP TSG RAN WG1 #118bis; Hefei, China, Oct. 14-18, 2024; Agenda Item: 9.2.1; Source: Spreadtrum Communications; Title: Discussion on UE-initiated/event-driven beam management; Document for: Discussion and decision.

R1-2407773; 3GPP TSG RAN WG1 Meeting #118bis; Hefei, China, Oct. 14-18, 2024; Source: ZTE Corporation, Sanechips; Title: Discussion on enhancements for UE-initiated/event-driven beam management; Agenda Item: 9.2.1; Document for: Discussion and Decision.

R1-2407812; 3GPP TSG RAN WG1 #118bis; Hefei, China, Oct. 14-18, 2024; Agenda Item: 9.2.1; Source: MediaTek Inc.; Title: UE-Initiated/Event-Driven Beam Management; Document for: Discussion and Decision/.

R1-2407853; 3GPP TSG RAN WG1 #118bis; Hefei, China, Oct. 14-18, 2024; Source: vivo; Title: Remaining issues on UE-initiated/event-driven beam management; Agenda Item: 9.2.1; Document for: Discussion and Decision.

R1-2407897; 3GPP TSG RAN WG1 #118-bis; Hefei, China, Oct. 14-18, 2024; Agenda item: 9.2.1; Title: Discussion on enhancements for UE-initiated/event-driven beam management; Source: CMCC; Document for: Discussion and Decision.

R1-2407961; 3GPP TSG RAN WG1 #118bis; Hefei, China, Oct. 14-18, 2024; Agenda Item: 9.2.1; Source: Xiaomi; Title: Enhancements for UE-initiated/event-driven beam management; Document for: Discussion and Decision.

R1-2408039; 3GPP TSG RAN WG1 #118bis; Hefei, China, Oct. 14-18, 2024; Source: CATT; Title: Enhancement for UE-initiated/event-driven beam management; Agenda Item: 9.2.1; Document for: Discussion and Decision.

R1-2408083; 3GPP TSG RAN WG1 #118; Hefei, CN, Oct. 14-18, 2024; Agenda Item: 9.2.1; Source: TCL; Title: Discussion on UE-initiated/event-driven beam management; Document for: Discussion and Decision.

R1-2408108; 3GPP TSG RAN WG1 Meeting #118bis; Hefei, China, Oct. 14-18, 2024; Source: Fujitsu; Title: Discussion on enhancements for UE-initiated/event-driven beam management; Agenda item: 9.2.1; Document for: Discussion and Decision.

R1-2408117; 3GPP TSG RAN WG1#118bis; Hefei, China, Oct. 14-18, 2024; Agenda Item: 9.2.1; Source: Transsion Holdings; Title: Enhancements for UE-initiated/event-driven beam management; Document for: Discussion and decision.

R1-2408164; 3GPP TSG RAN WG1 #118bis; Hefei, China, Oct. 14-18, 2024; Source: OPPO; Title: Discussions on UE-initiated/event-driven beam management; Agenda Item: 9.2.1; Document for: Discussion and Decision.

R1-2408187; 3GPP TSG RAN WG1 #118bis; Hefei, P.R. China, Oct. 14-18, 2024; Agenda Item: 9.2.1; Source: InterDigital, Inc.; Title: Discussion on Rel-19 UE/Event-Driven Beam Management; Document for: Discussion and Decision.

R1-2408199; 3GPP TSG RAN WG1#118bis; Hefei, Anhui, China, Oct. 14-18, 2024; Agenda Item: 9.2.1; Source: Lenovo; Title: Enhancements for UE-initiated/event-driven beam management; Document for: Discussion.

R1-2408223; 3GPP TSG RAN WG1 #118bis; Hefei, China, Oct. 14-18, 2024; Agenda item: 9.2.1; Source: NEC; Title: Discussion on enhancements for UE-initiated or event-driven beam management; Document for: Discussion and Decision.

R1-2408230; 3GPP TSG-RAN WG1 Meeting #118bis; Hefei, China, Oct. 14-18, 2024; Agenda Item: 9.2.1; Source: Honor; Title: Discussion on the UE-initiated/event-driven beam management; Document for: Discussion and Decision.

(56) References Cited

OTHER PUBLICATIONS

R1-2408296; 3GPP TSG RAN WG1 #118bis; Hefei, China, Oct. 14-18, 2024; Source: Intel Corporation; Title: Enhancements for Event-driven Beam Management; Agenda item: 9.2.1; Document for: Discussion and Decision.
R1-2408317; 3GPP TSG RAN WG1 #118bis; Hefei, China, Oct. 14-18, 2024; Agenda item: 9.2.1; Source: Moderator (ZTE); Title: Offline summary for Rel-19 MIMO UEIBM (9.2.1) pre-RAN1#118bis; Document for: Discussion and Decision.
R1-2408336; 3GPP TSG RAN WG1 #118bis; Hefei, China, Oct. 14-18, 2024; Agenda item: 9.2.1; Source: LG Electronics; Title: UE-initiated beam management; Document for: Discussion and Decision.
R1-2408348; 3GPP TSG RAN WG1 #118bis; Hefei, China, Oct. 14-18, 2024; Source: Sharp; Title: Enhancements for UE-initiated/event-driven beam management; Agenda Item: 9.2.1; Document for: Discussion and Decision.
R1-2408368; 3GPP TSG RAN WG1 #118bis; Hefei, China, Oct. 14-18, 2024; Agenda Item: 9.2.1; Source: Google; Title: Discussion on enhancements for UE-initiated or event-driven beam management; Document for: Discussion.
R1-2408382; 3GPP TSG RAN WG1 Meeting #118bis; Hefei, China, Oct. 14-18, 2024; Source: Ruijie Networks; Title: Discussion on enhancements for UE-initiated/event-driven beam management; Agenda Item: 9.2.1; Document for: Discussion and decision.
R1-2408404; 3GPP TSG RAN WG1 #118bis; Hefei, China, Oct. 14-18, 2024; Agenda Item: 9.2.1; Source: Sony; Title: Enhancements for UE-initiated/event-driven beam management; Document for: Discussion.
R1-2408457; 3GPP TSG RAN WG1 #118bis; Hefei, China, Oct. 14-18, 2024; Source: Apple Inc.; Title: Enhancements for UE-initiated beam management; Agenda item: 9.2.1; Document for: Discussion and Decision.
R1-2408562; 3GPP TSG RAN WG1 #118bis; Hefei, China, Oct. 14-18, 2024; Source: ETRI; Title: Enhancements for UE-initiated/event-driven beam management; Agenda Item: 9.2.1; Document for: Discussion.
R1-2408610; 3GPP TSG-RAN WG1 Meeting #118bisTdoc; Hefei, China, Oct. 14-18, 2024; Agenda Item: 9.2.1; Source: Ericsson; Title: Remaining issues for UE-initiated beam management; Document for: Discussion.
R1-2408635; 3GPP TSG RAN WG1 #118bis; Hefei, China, Oct. 14-18, 2024; Agenda item: 9.2.1; Source: Samsung; Title: UE-initiated (UEI) beam management enhancements; Document for: Discussion and Decision.
R1-2408738; 3GPP TSG-RAN WG1 Meeting #118bis; Hefei, CN, Oct. 14-18, 2024; Agenda item: 9.2.1; Source: Nokia; Title: Enhancements to facilitate UE-initiated/event-driven beam management; Document for: Discussion and Decision.
R1-2408748; 3GPP TSG RAN WG1 #118bis; Hefei, China, Oct. 14-18, 2024; Source: Meta; Title: Enhancements for UE Initiated Beam Management; Agenda item: 9.2.1; Document for: Discussion and Decision.
R1-2408778; 3GPP TSG RAN WG1 #118bis; Hefei, China, Oct. 14-18, 2024; Source: NTT Docomo, Inc.; Title: Discussion on Enhancements for UE-initiated/event-driven beam management; Agenda Item: 9.2.1; Document for: Discussion and Decision.
R1-2408827; 3GPP TSG RAN WG1 #118bis; Hefei, China, Oct. 14-18, 2024; Agenda Item: 9.2.1; Source: ITRI; Title: Discussion on UE-initiated/event-driven beam management; Document for: Discussion and Decision.
R1-2408842; 3GPP TSG-RAN WG1 #118bis; Hefei, China, Oct. 14-18, 2024; Agenda item: 9.2.1; Source: Qualcomm Incorporated; Title: Enhancements for UE-initiated/event-driven beam management; Document for: Discussion/Decision.
R1-2408881; 3GPP TSG-RAN WG1 Meeting #118bis; Hefei China, Oct. 14-Oct. 18, 2024; Source: Panasonic; Title: Enhancements for UE-initiated/event-driven beam management; Agenda Item: 9.2.1; Document for: Discussion.
R1-2408890; 3GPP TSG RAN WG1 #118bis; Hefei, China, Oct. 14-18, 2024; Agenda Item: 9.2.1; Source: ASUSTek; Title: Discussion on UE initiated beam report; Document for: Discussion and Decision.
R1-2408911; 3GPP TSG RAN WG1 #118bis; Hefei, China, Oct. 14-18, 2024; Source: KDDI Corporation; Title: Discussions on enhancements for UE-initiated/event-driven beam management; Agenda Item: 9.2.1 Enhancements for UE-initiated/event-driven beam management; Document for: Discussion and Decision.
R1-2408925; 3GPP TSG RAN WG1 #118-bis; Hefei, China, Oct. 14-Oct. 18, 2024; Agenda Item: 9.2.1; Source: CEWIT; Title: Enhancements for UE-initiated/event-driven beam management; Document for: Discussion.
R1-2408940; 3GPP TSG RAN WG1 #118bis; Hefei, China, Oct. 14-18, 2024; Source: NICT; Title: Discussion on enhancements for UE-initiated/event-driven beam management; Item: 9.2.1; Document for: Discussion.
R2-2409096; 3GPP TSG-RAN WG2 Meeting #127bis; Hefei, China, Oct. 14-18, 2024; Agenda item: 8.6.3; Source: Samsung; Title: Support of Event Triggered L1 Measurement Reporting; WID/SID: NR_Mob_Ph4-Core; Document for: Discussion and Decision.

* cited by examiner

2502

| | | | | | | | | |
|---|---|---|---|---|---|---|---|---|
| R | Serving Cell ID | | | | | DL BWP ID | | Oct 1 |
| $F_{1,1}$ = 1 | $F_{1,2}$ = 1 | $F_{2,1}$ = 1 | $F_{2,2}$ = 0 | $F_{3,1}$ = 0 | $F_{3,2}$ = 1 | $F_{4,1}$= 1 | $F_{4,2}$= 1 | Oct 2 |
| $F_{5,1}$= 0 | $F_{5,2}$ = 0 | $F_{6,1}$= 0 | $F_{6,2}$= 0 | $F_{7,1}$= 0 | $F_{7,2}$= 0 | $F_{8,1}$= 0 | $F_{8,2}$= 0 | Oct 3 |
| R | TCI state ID 8 | | | | | | | Oct 4 |
| R | TCI state ID 4 | | | | | | | Oct 5 |
| R | TCI state ID 9 | | | | | | | Oct 6 |
| R | TCI state ID 2 | | | | | | | Oct 7 |
| R | TCI state ID 7 | | | | | | | Oct 8 |
| R | TCI state ID 6 | | | | | | | Oct 9 |

| | |
|---|---|
| TCI codepoint 001 | TCI state 8, TCI state 4 |
| TCI codepoint 010 | TCI state 9 |
| TCI codepoint 011 | TCI state 2 |
| TCI codepoint 100 | TCI state 7, TCI state 6 |

- TCI field in DCI = 001 → TCI state 8 and TCI state 4 are indicated
- TCI field in DCI = 010 → TCI state 9 and TCI state 4 are indicated
- TCI field in DCI = 011 → TCI state 9 and TCI state 2 are indicated
- TCI field in DCI = 100 → TCI state 7 and TCI state 6 are indicated

FIG. 25

BEAM MANAGEMENT IN EVENT TRIGGERED REPORTING

CROSS-REFERENCE TO RELATED APPLICATIONS

This application claims the benefit of U.S. Provisional Application No. 63/716,294, filed Nov. 5, 2024, which is hereby incorporated by reference in its entirety.

BRIEF DESCRIPTION OF THE DRAWINGS

Examples of several of the various embodiments of the present disclosure are described herein with reference to the drawings.

FIG. 25 illustrates activation of transmission configuration indicator (TCI) states via a MAC CE and indication of TCI states via downlink control information (DCI).

DETAILED DESCRIPTION

Figure 1A:
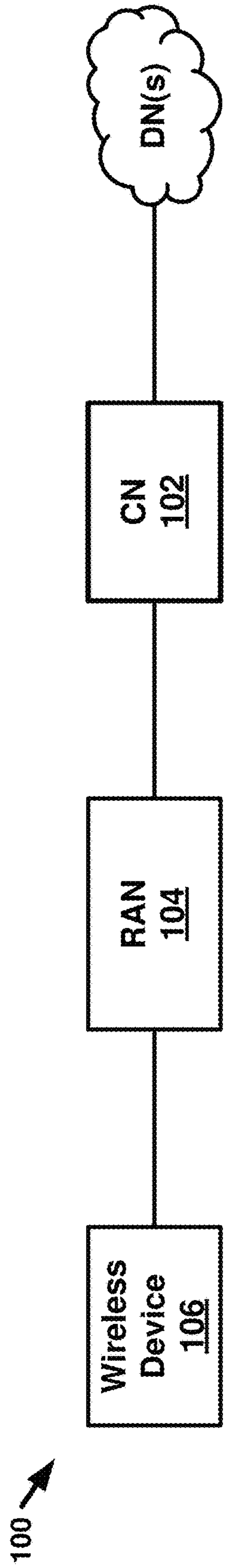
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that affect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNS), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
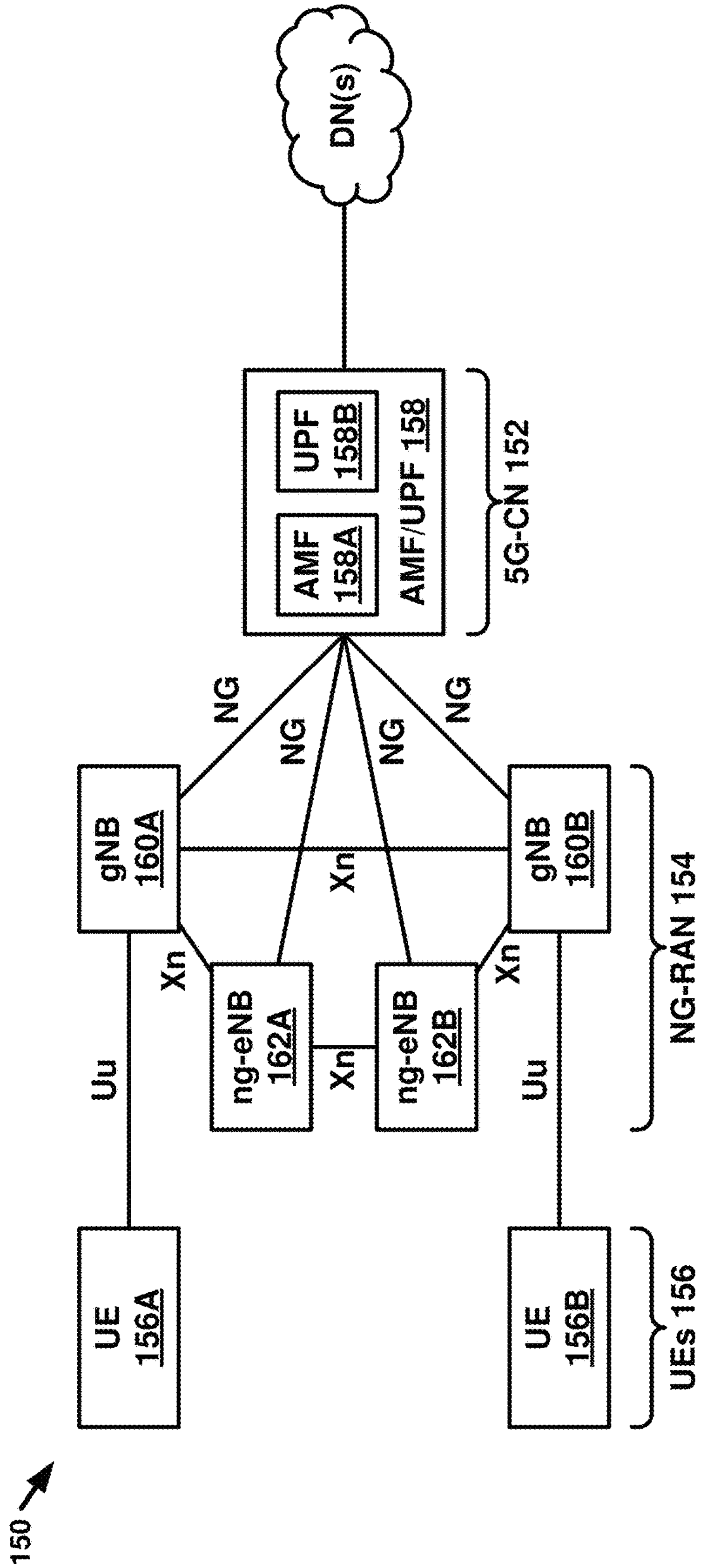

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
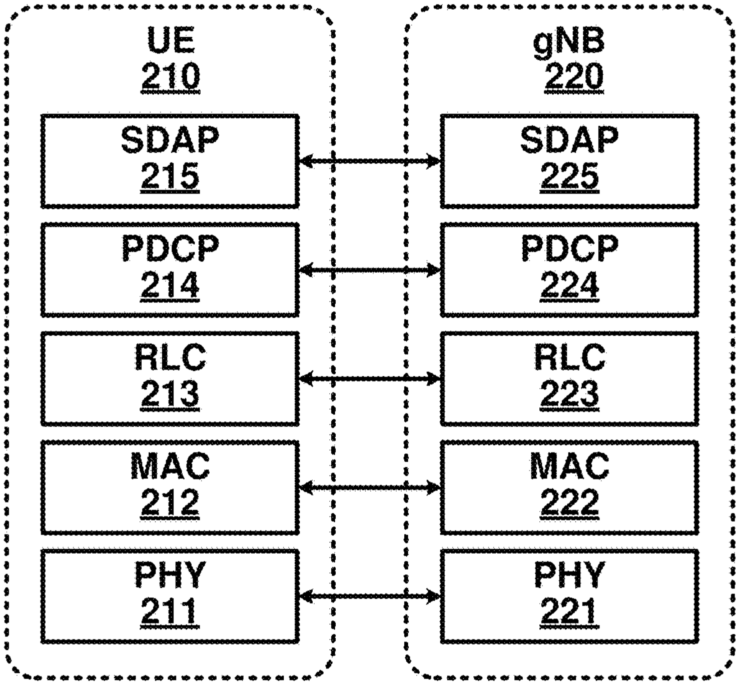
FIG. 2A and FIG. 2B respectively illustrate a New Radio (NR) user plane and control plane protocol stack.
Figure 2B:
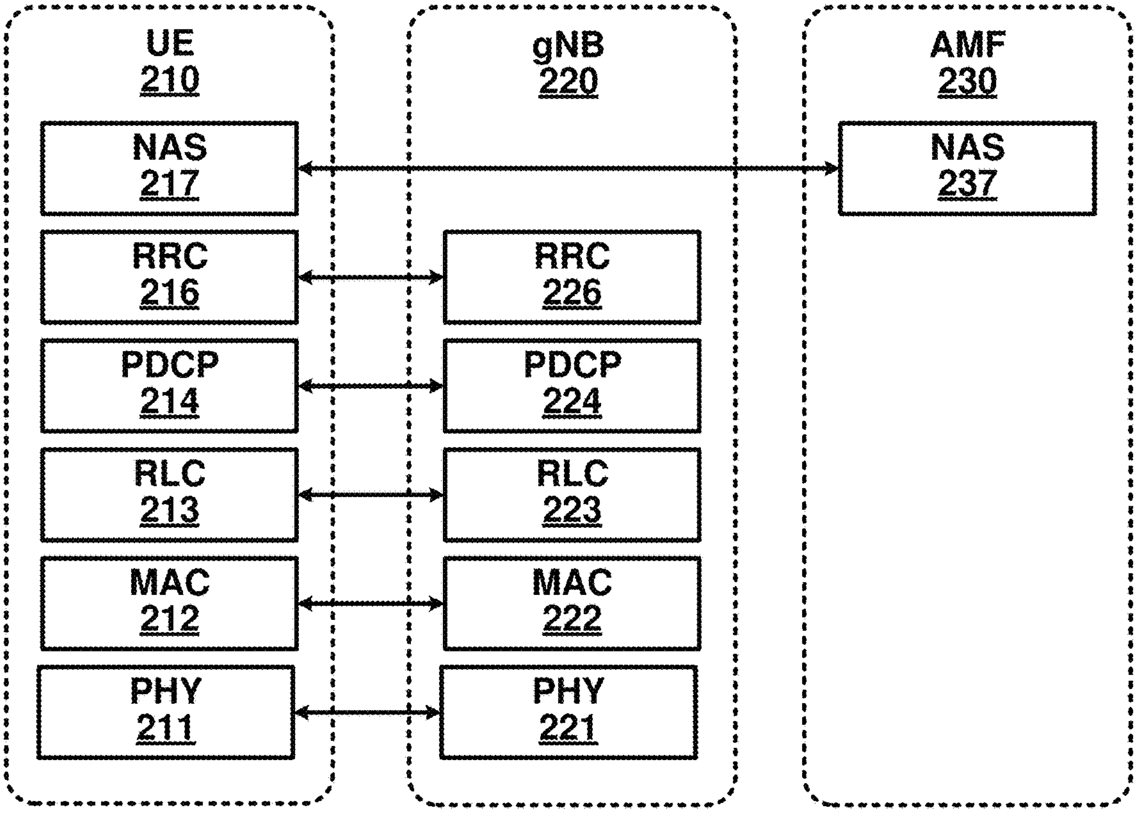

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
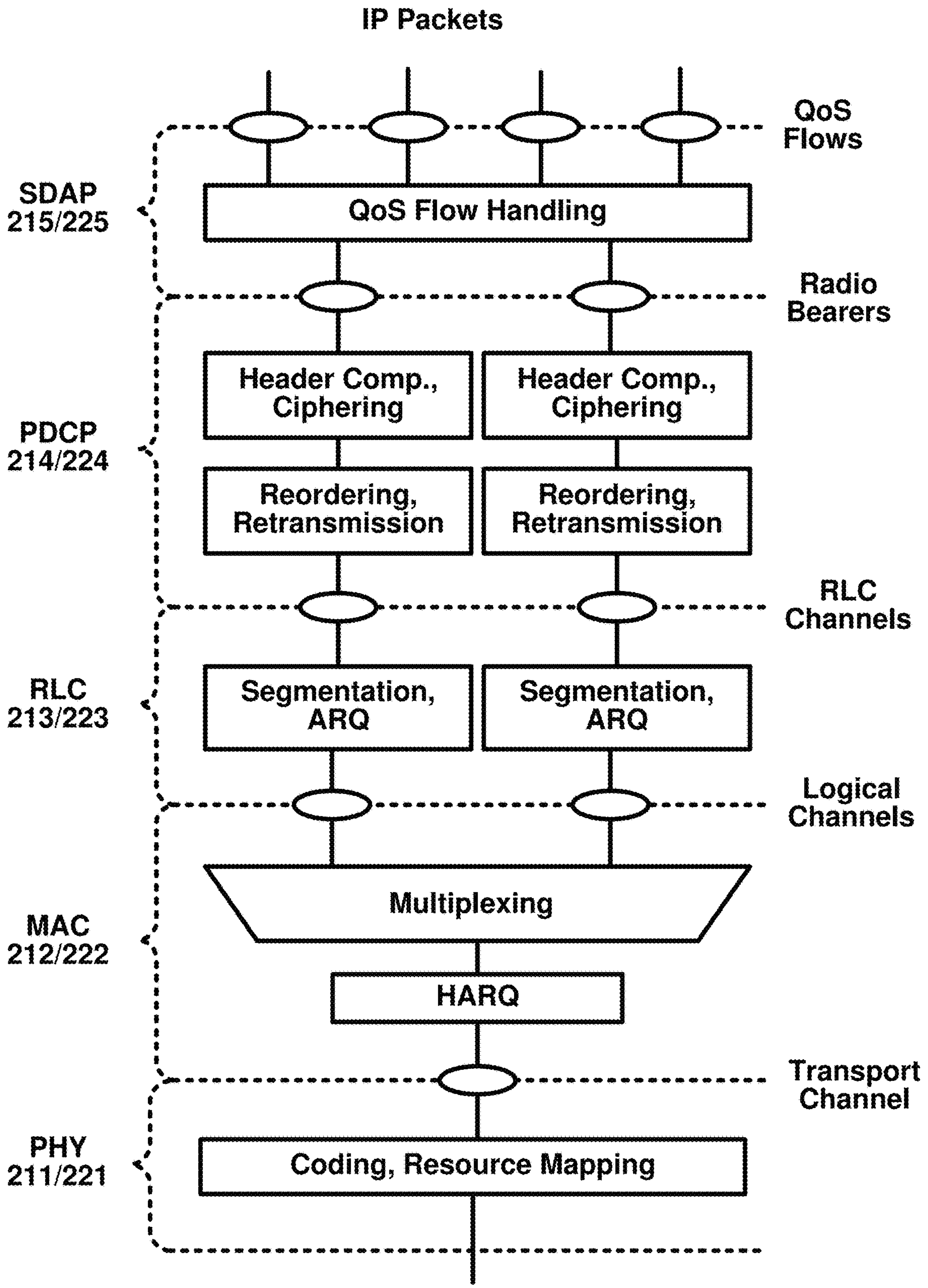
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
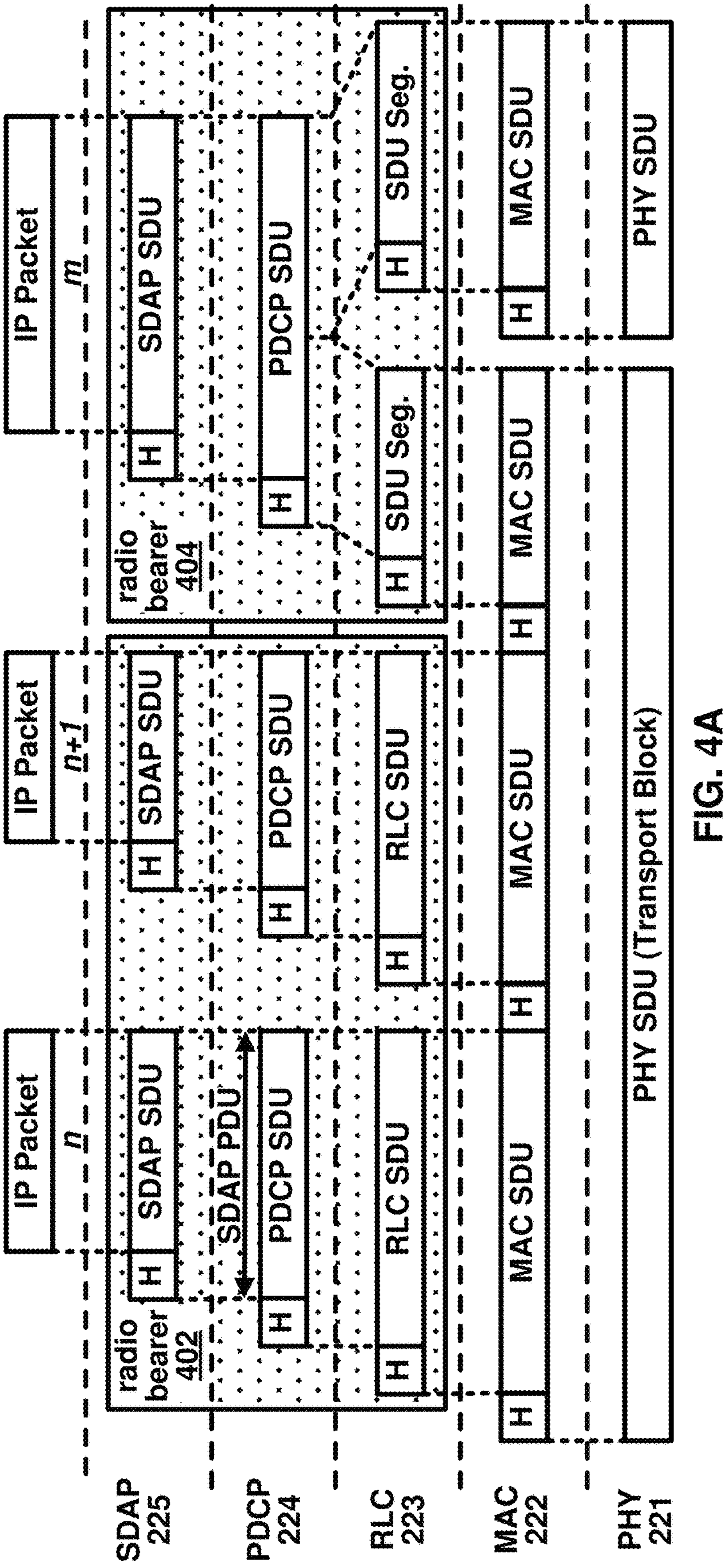
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
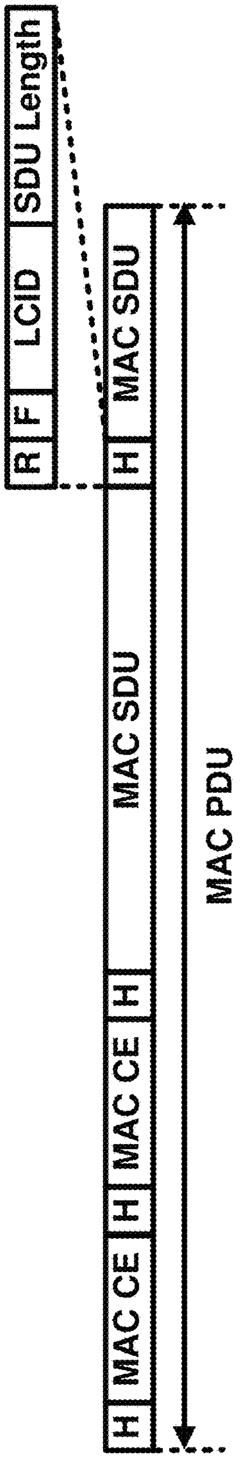
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random-access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
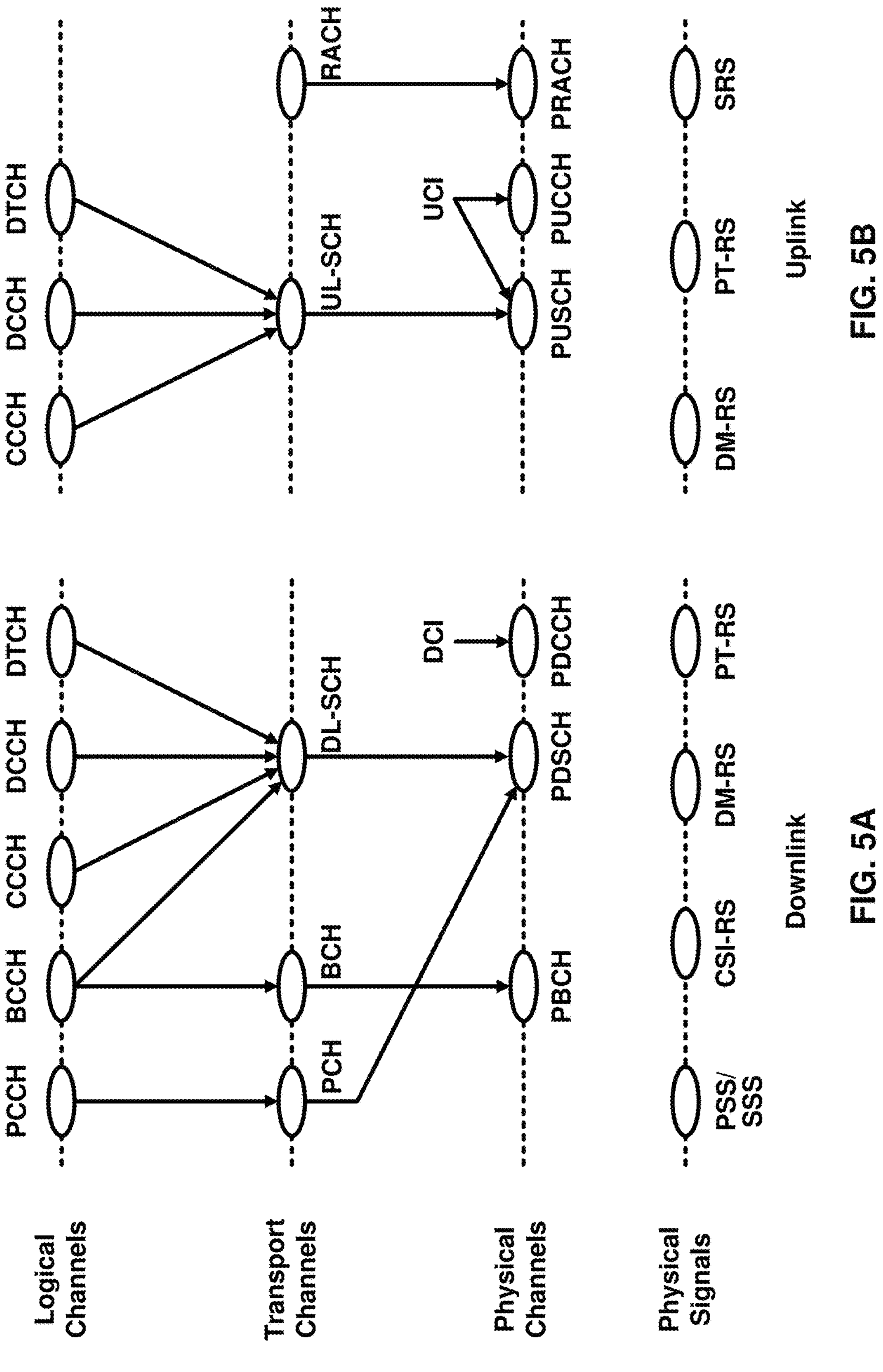
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random-access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages,
- including the SIBs from the BCCH;
- an uplink shared channel (UL-SCH) for carrying uplink data and signaling messages; and
- a random-access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random-access channel (PRACH) for random-access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
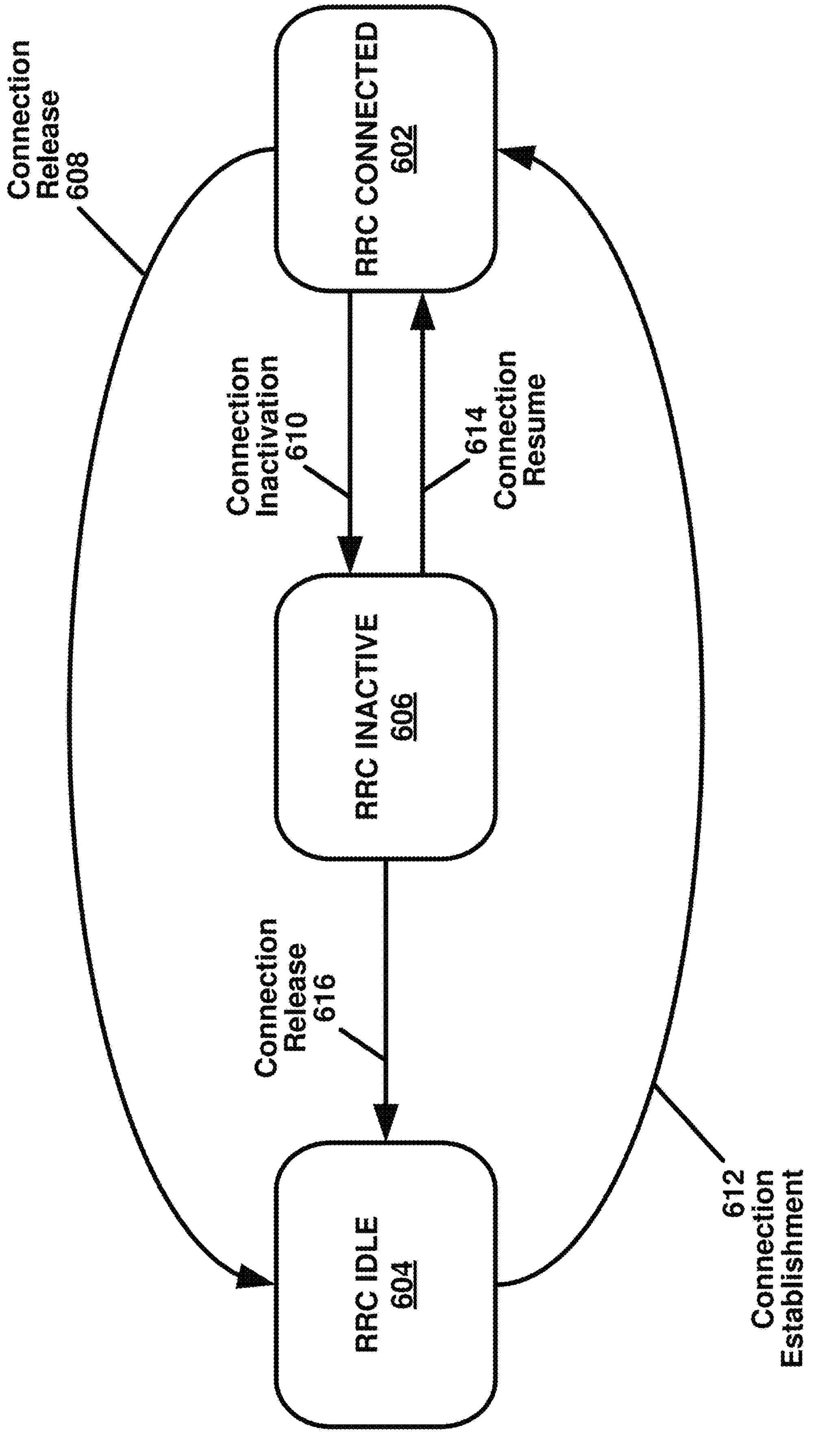
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random-access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split into two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
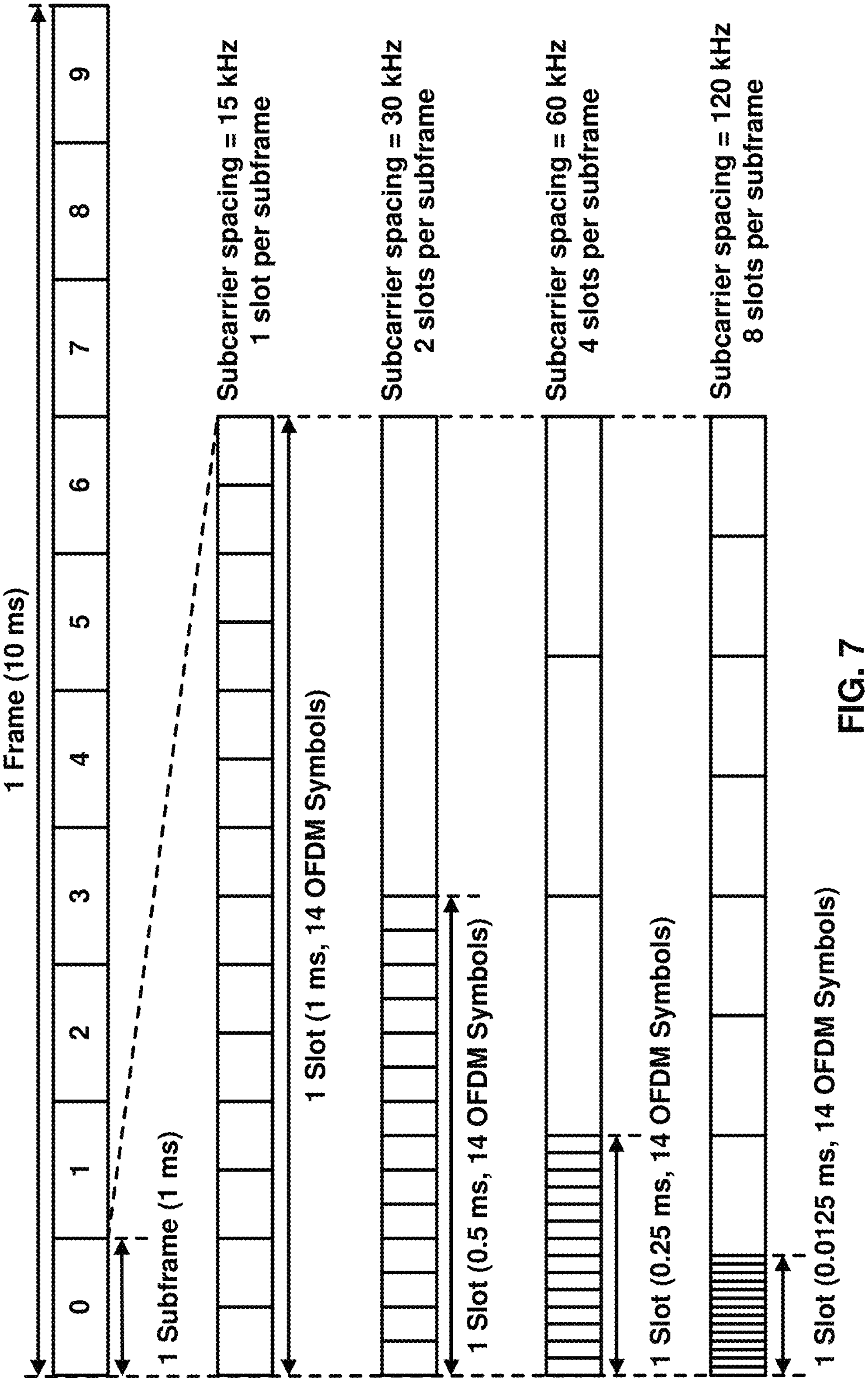
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
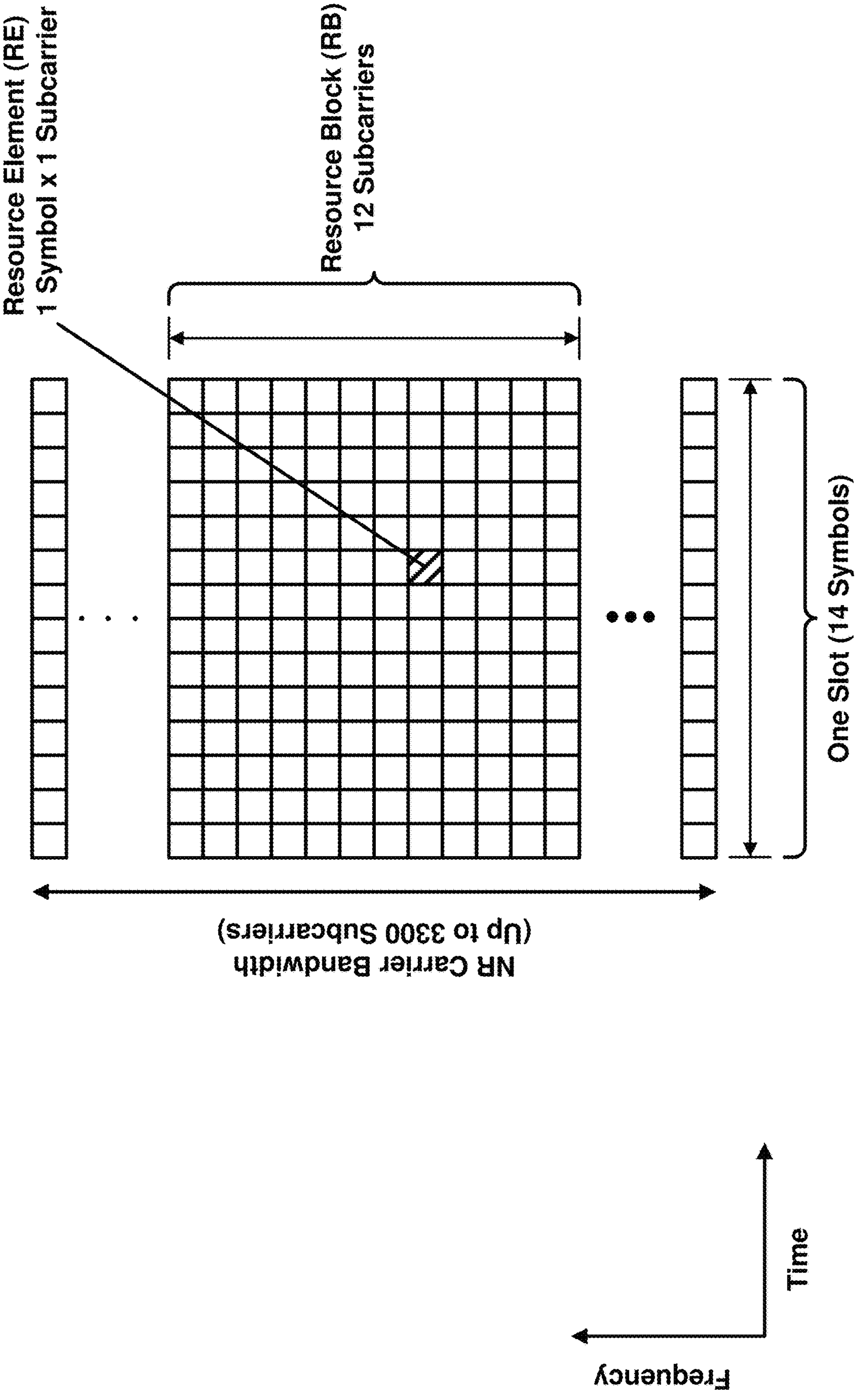
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random-access.

Figure 9:
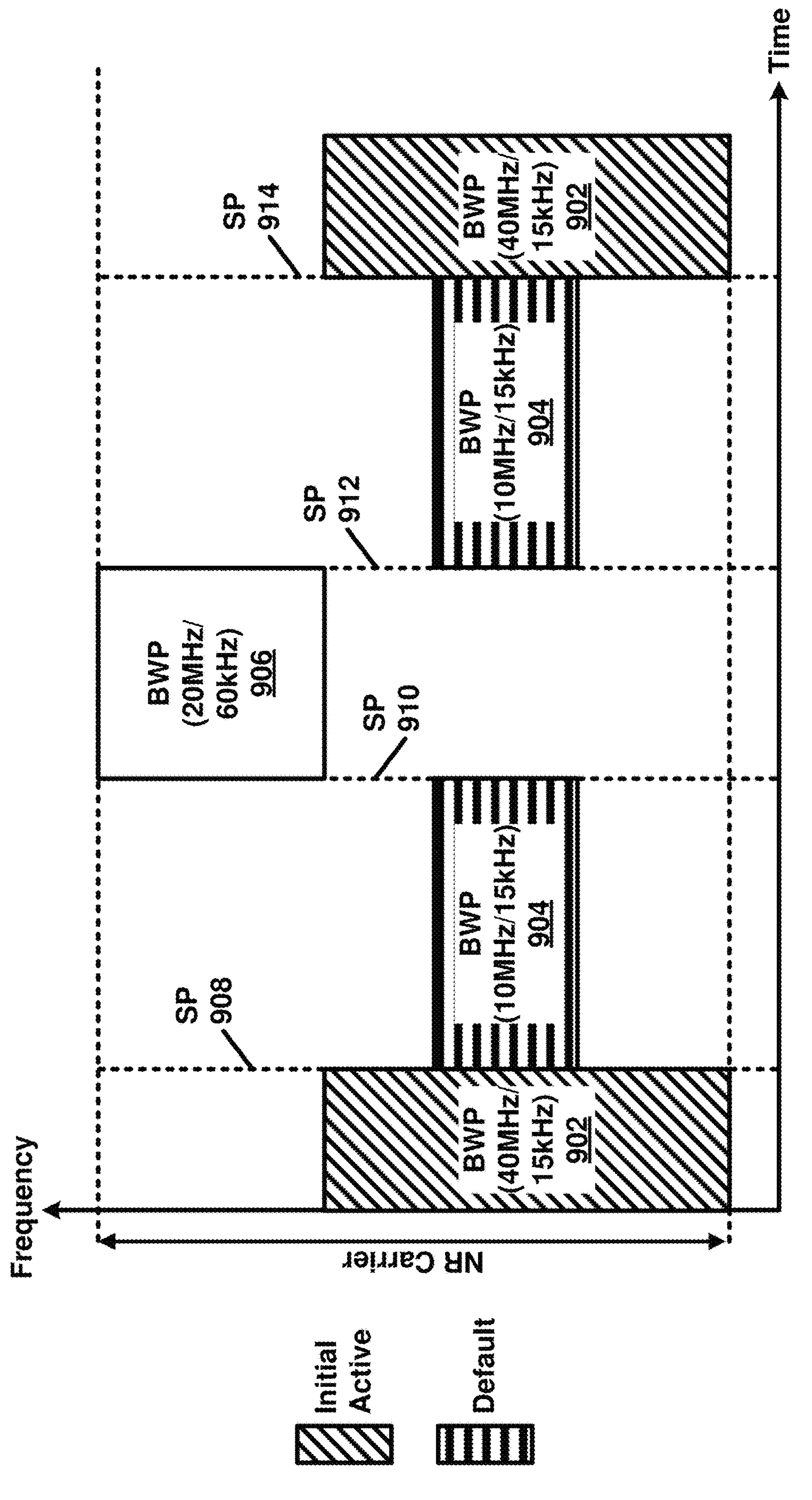
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response to receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
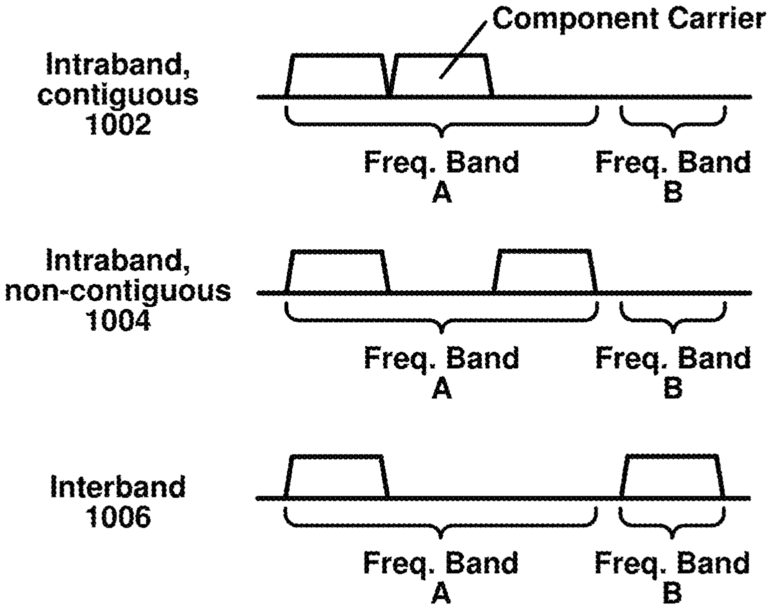
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
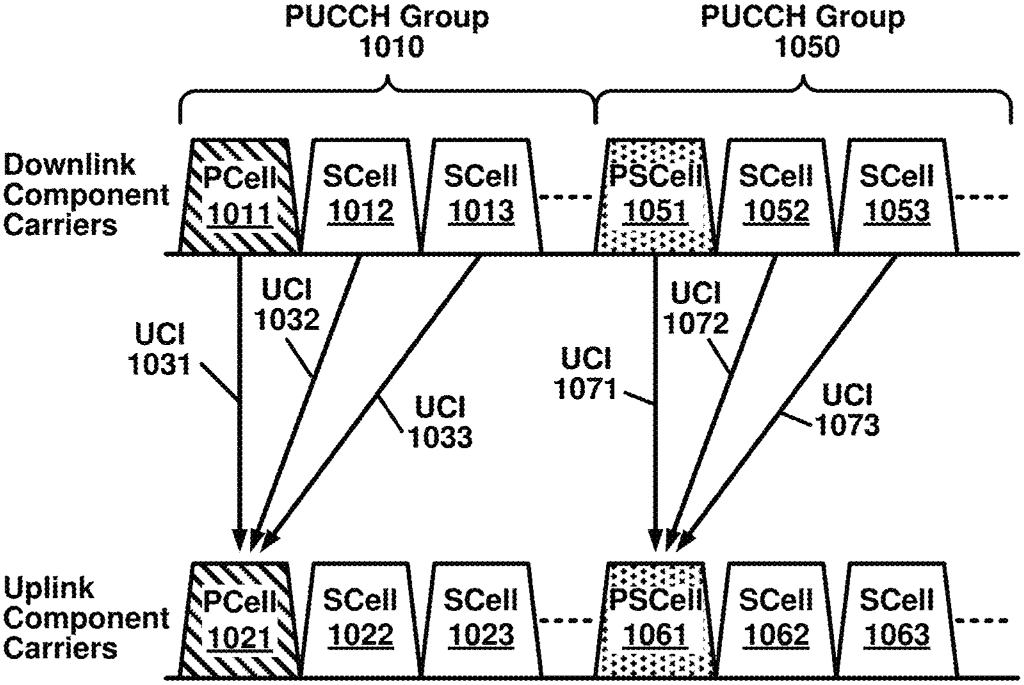
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
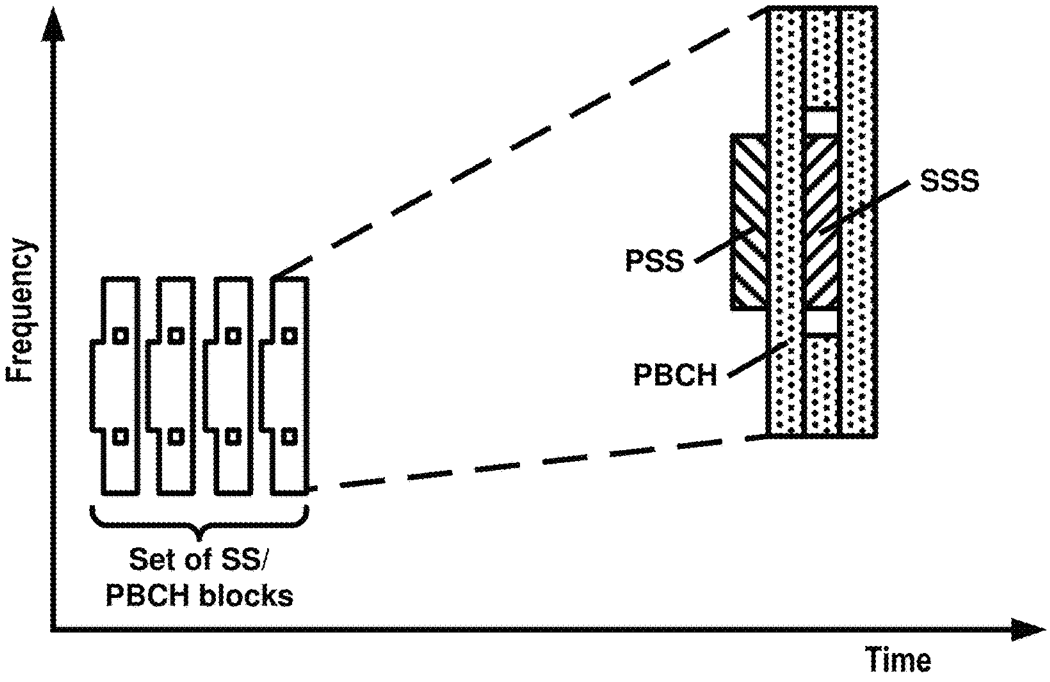
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
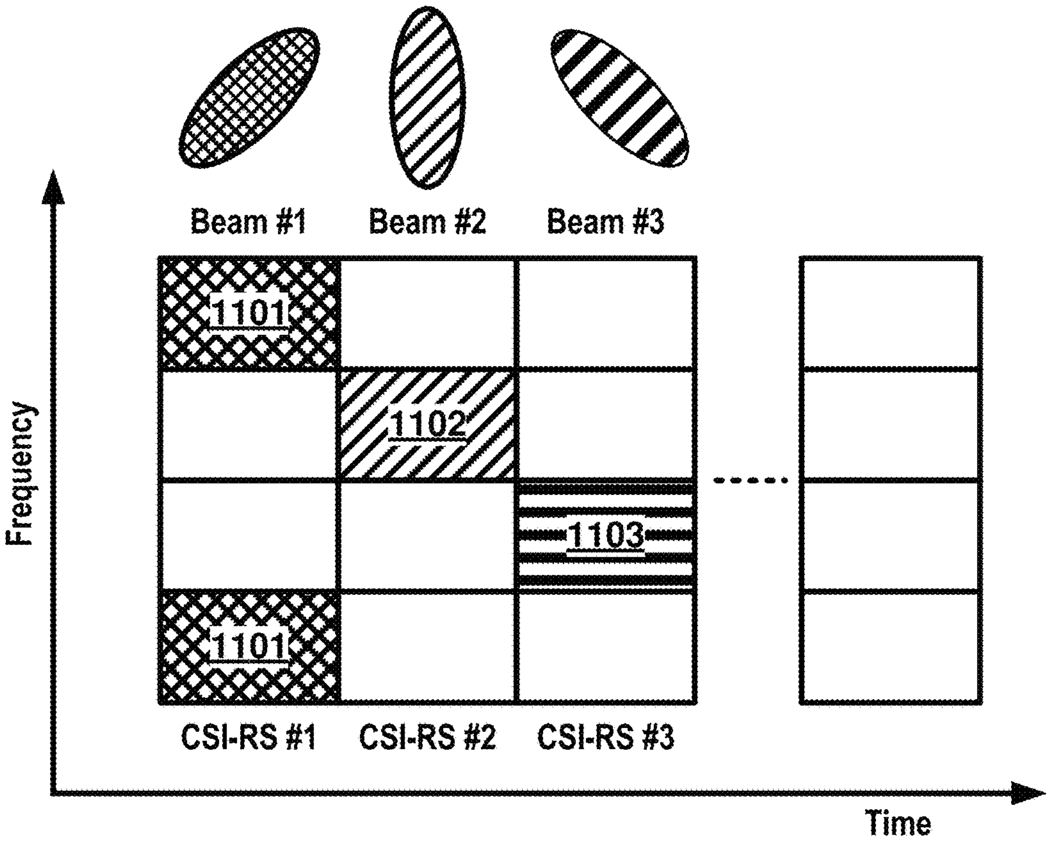
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
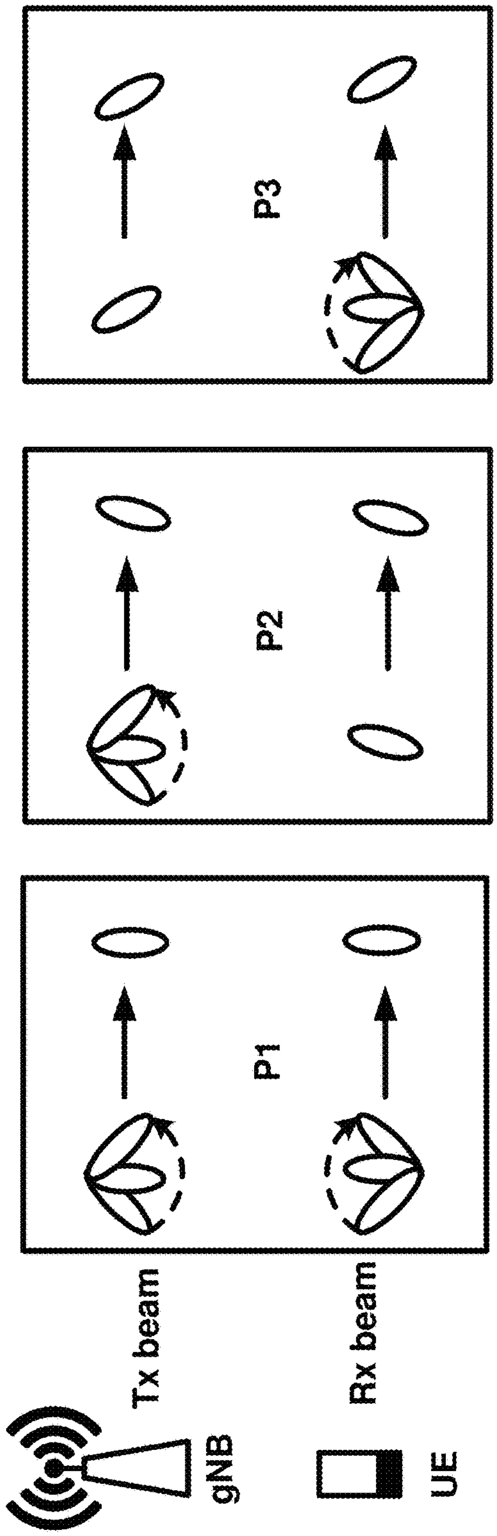
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
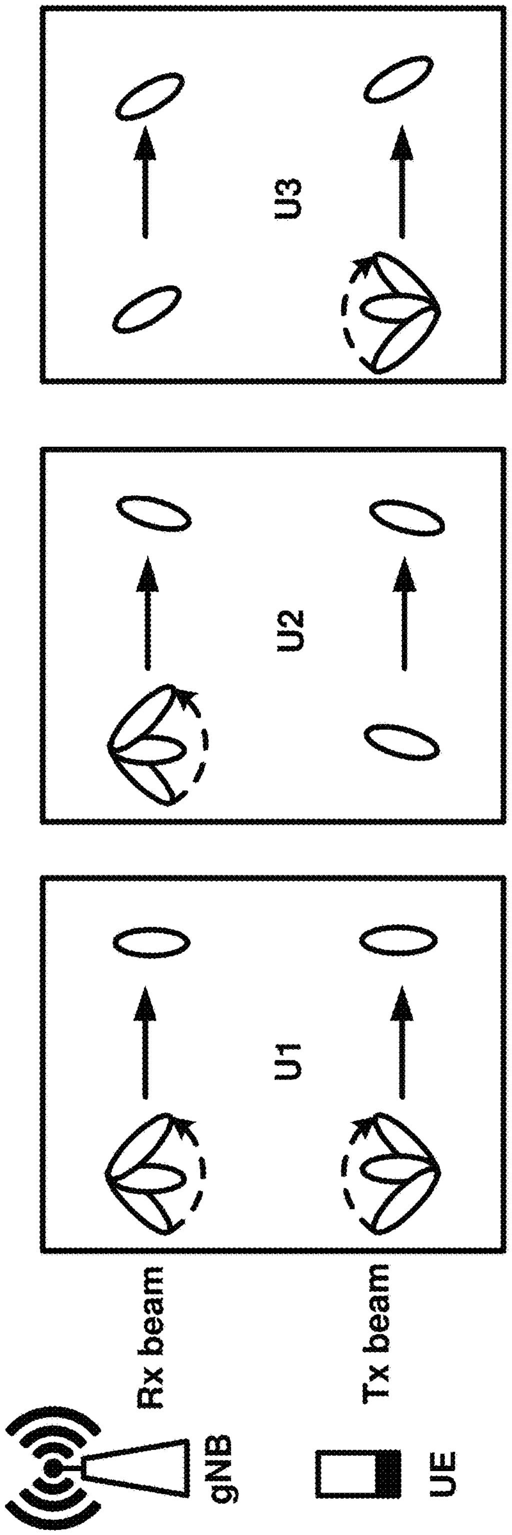

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random-access procedure. A UE in an RRC_IDLE state and/or an RRC_INACTIVE state may initiate the random-access procedure to request a connection setup to a network. The UE may initiate the random-access procedure from an RRC_CONNECTED state. The UE may initiate the random-access procedure to request uplink resources (e.g., for uplink transmission of an SR when there is no PUCCH resource available) and/or acquire uplink timing (e.g., when uplink synchronization status is non-synchronized). The UE may initiate the random-access procedure to request one or more system information blocks (SIBs) (e.g., other system information such as SIB2, SIB3, and/or the like). The UE may initiate the random-access procedure for a beam failure recovery request. A network may initiate a random-access procedure for a handover and/or for establishing time alignment for an SCell addition.

Figure 13C:
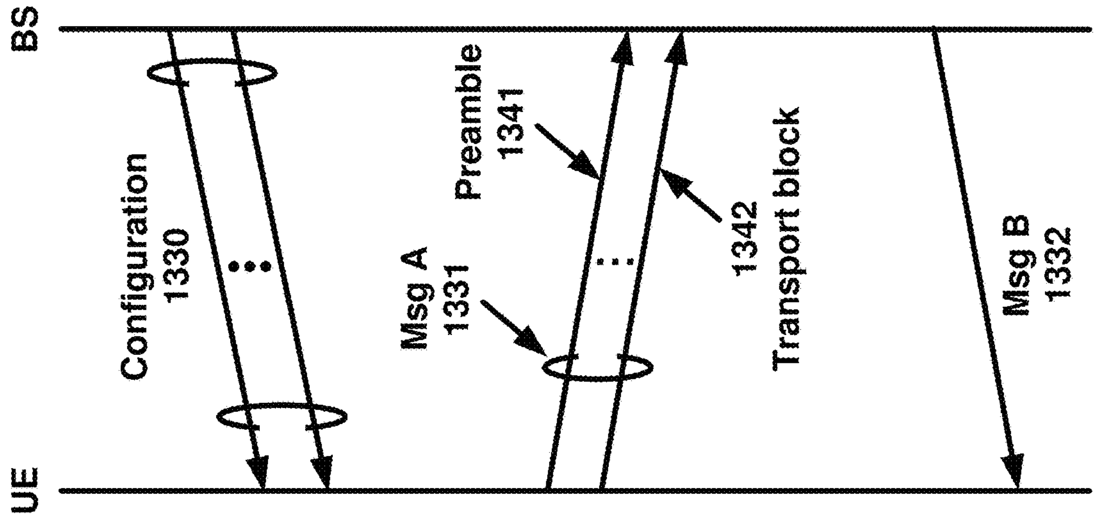
FIG. 13A, FIG. 13B, and FIG. 13C respectively illustrate a four-step contention-based random-access procedure, a two-step contention-free random-access procedure, and another two-step random-access procedure.
Figure 13B:
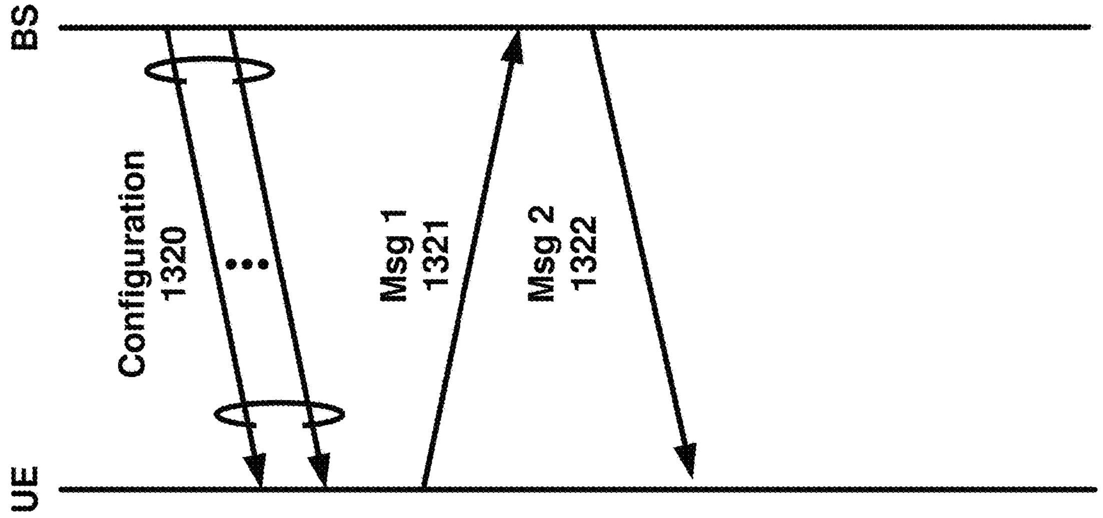
Figure 13A:
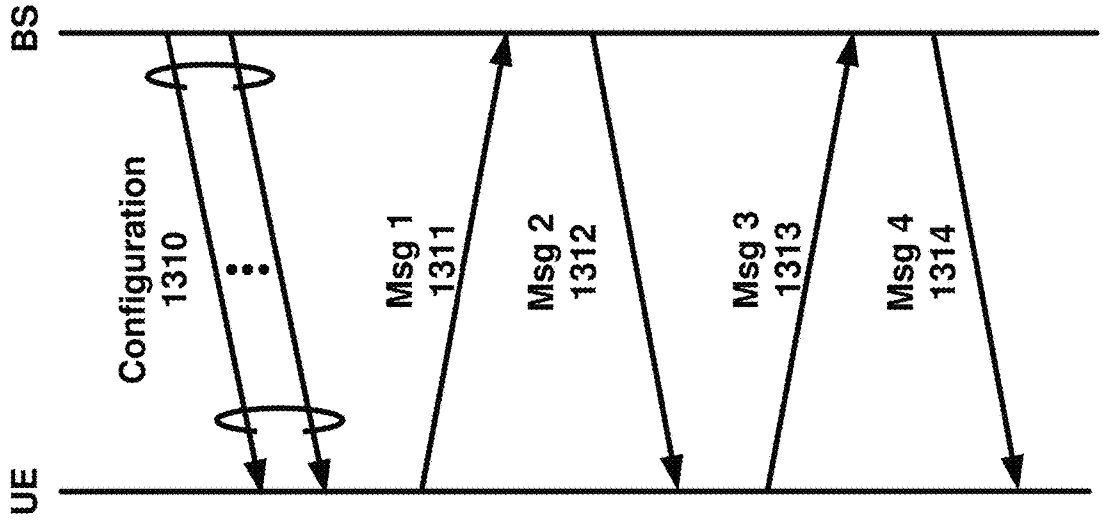

FIG. 13A illustrates a four-step contention-based random-access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random-access preamble). The Msg 2 1312 may include and/or be referred to as a random-access response (RAR).

The configuration message 1310 may be transmitted, for example, using one or more RRC messages. The one or more RRC messages may indicate one or more random-access channel (RACH) parameters to the UE. The one or more RACH parameters may comprise at least one of following: general parameters for one or more random-access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random-access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random-access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random-access procedure. The UE may use random-access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$RA\text{-}RNTI=1+s\_id+14\times t\_id+14\times 80\times f\_id+14\times 80\times 8\times ul\_carrier\_id$, where s_id may be an index of a first OFDM symbol of the PRACH occasion (e.g., $0\leq s\_id<14$), t_id may be an index of a first slot of the PRACH occasion in a system frame (e.g., $0\leq t\_id<80$), f_id may be an index of the PRACH occasion in the frequency domain (e.g., $0\leq f\_id<8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random-access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random-access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random-access procedure is successfully completed.

The UE may be configured with a supplementary uplink (SUL) carrier and a normal uplink (NUL) carrier. An initial access (e.g., random-access procedure) may be supported in an uplink carrier. For example, a base station may configure the UE with two separate RACH configurations: one for an SUL carrier and the other for an NUL carrier. For random-access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random-access procedure (e.g., the Msg 1 1311 and/or the Msg 3 1313) may remain on the selected carrier. The UE may switch an uplink carrier during the random-access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random-access procedure. Similar to the four-step contention-based random-access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random-access procedure may not include messages analogous to the Msg 3 1313 and/or the Msg 4 1314.

The contention-free random-access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random-access procedure illustrated in FIG. 13B, the UE may determine that a random-access procedure successfully completes after or in response to transmission of Msg 1 1321 and reception of a corresponding Msg 2 1322. The UE may determine that a random-access procedure successfully completes, for example, if a PDCCH transmission is addressed to a C-RNTI. The UE may determine that a random-access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random-access procedure. Similar to the random-access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random-access procedure in FIG. 13C for licensed spectrum and/or unlicensed spectrum. The UE may determine, based on one or more factors, whether to initiate the two-step random-access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random-access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random-access RNTI (RA-RNTI) may indicate a random-access response (RAR). A DCI having CRC parity bits scrambled with a cell RNTI (C-RNTI) may indicate a dynamically scheduled unicast transmission and/or a triggering of PDCCH-ordered random-access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
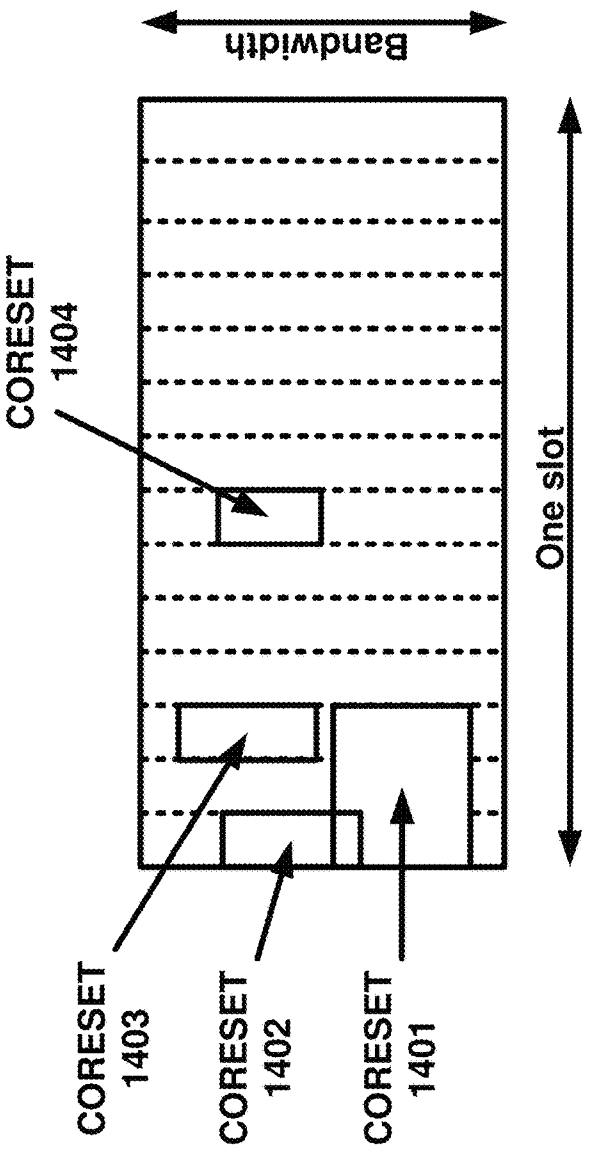
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
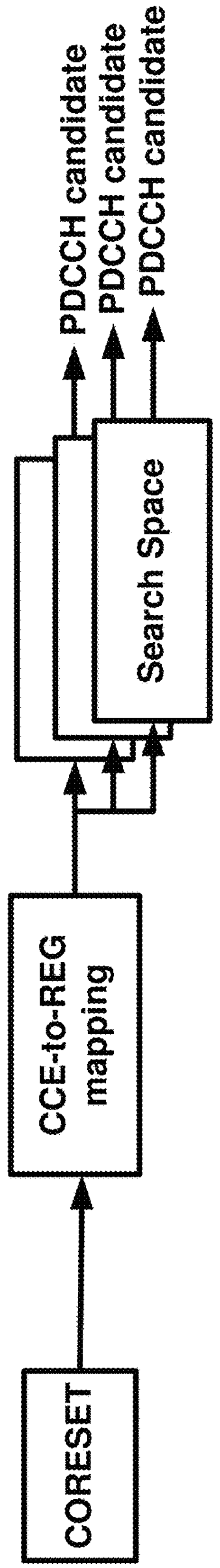
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
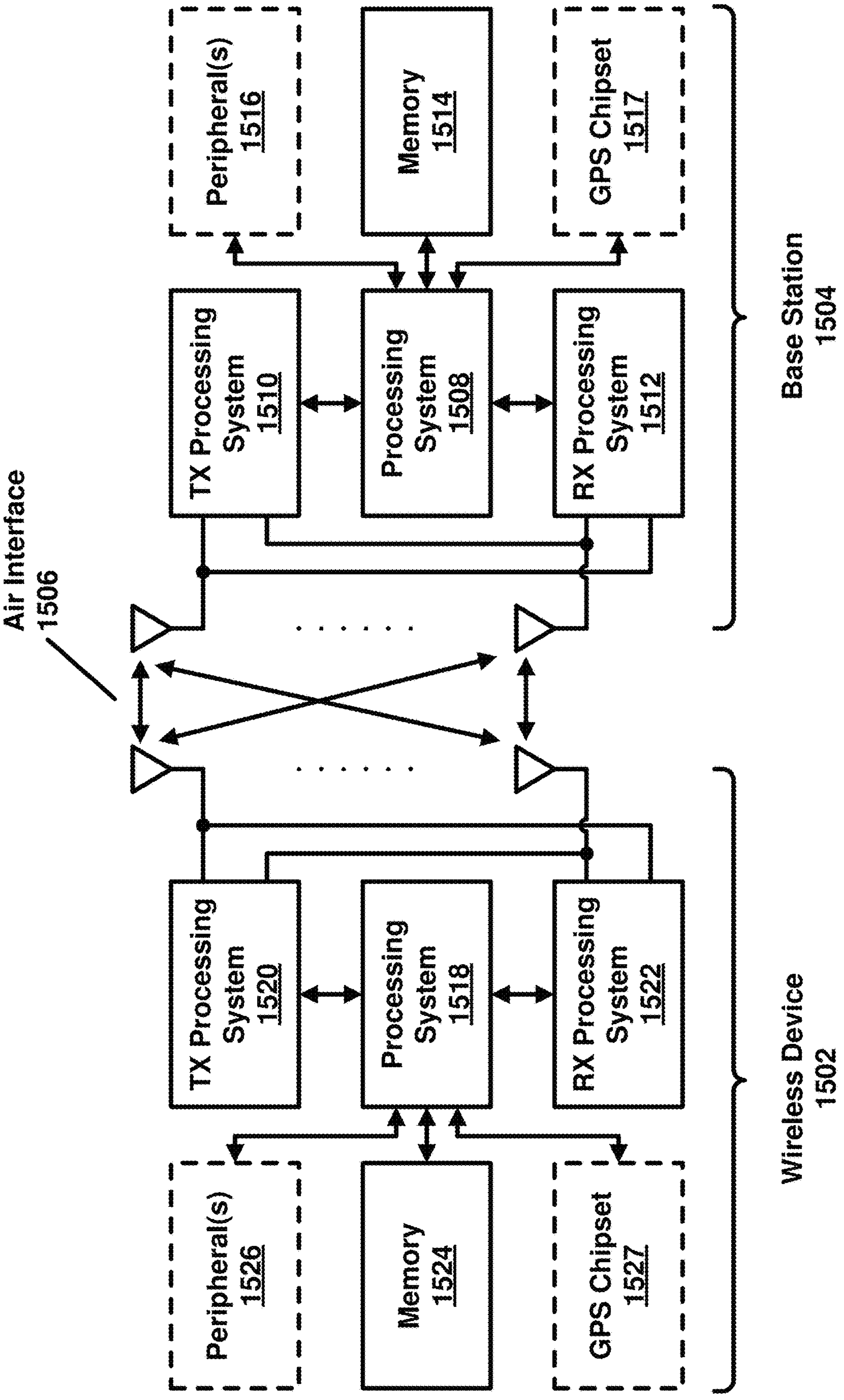
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
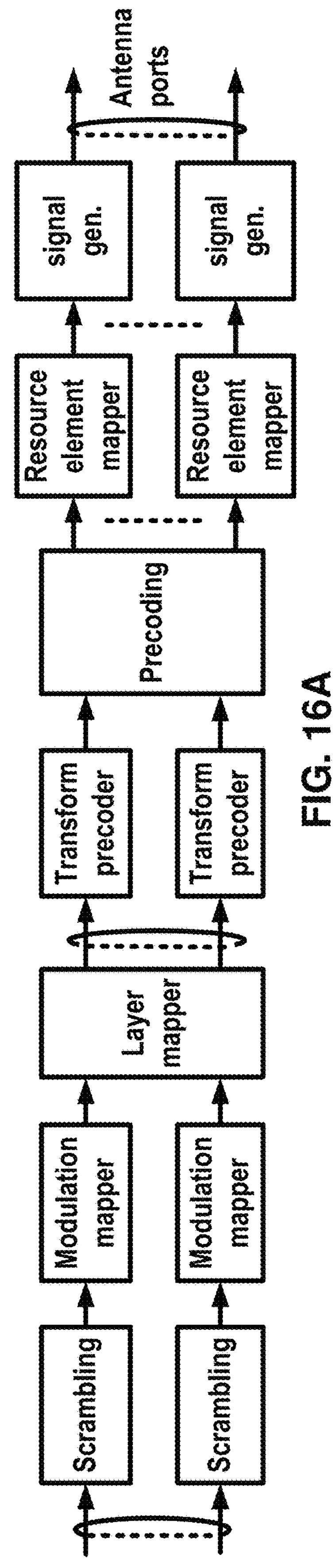
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

Figure 16B:
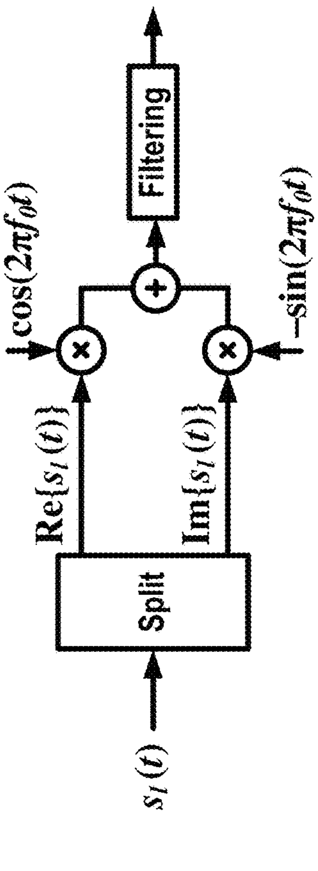

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random-access Channel (PRACH) baseband signal. Filtering may be employed prior to transmission.

Figure 16D:
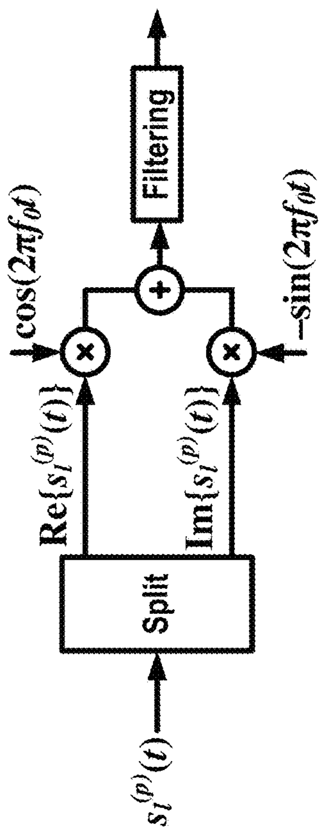
Figure 16C:
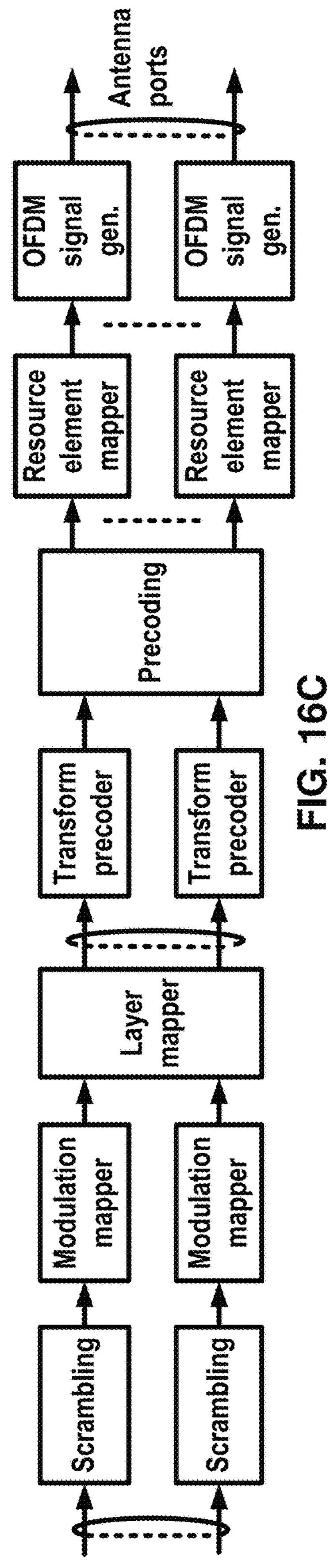

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random-access response window timer may be used for measuring a window of time for receiving a random-access response. In an example, instead of starting and expiry of a random-access response window timer, the time difference between two time stamps may be used. When a timer is restarted, a process for measurement of time window may be restarted. Other example implementations may be provided to restart a measurement of a time window.

Figure 17:
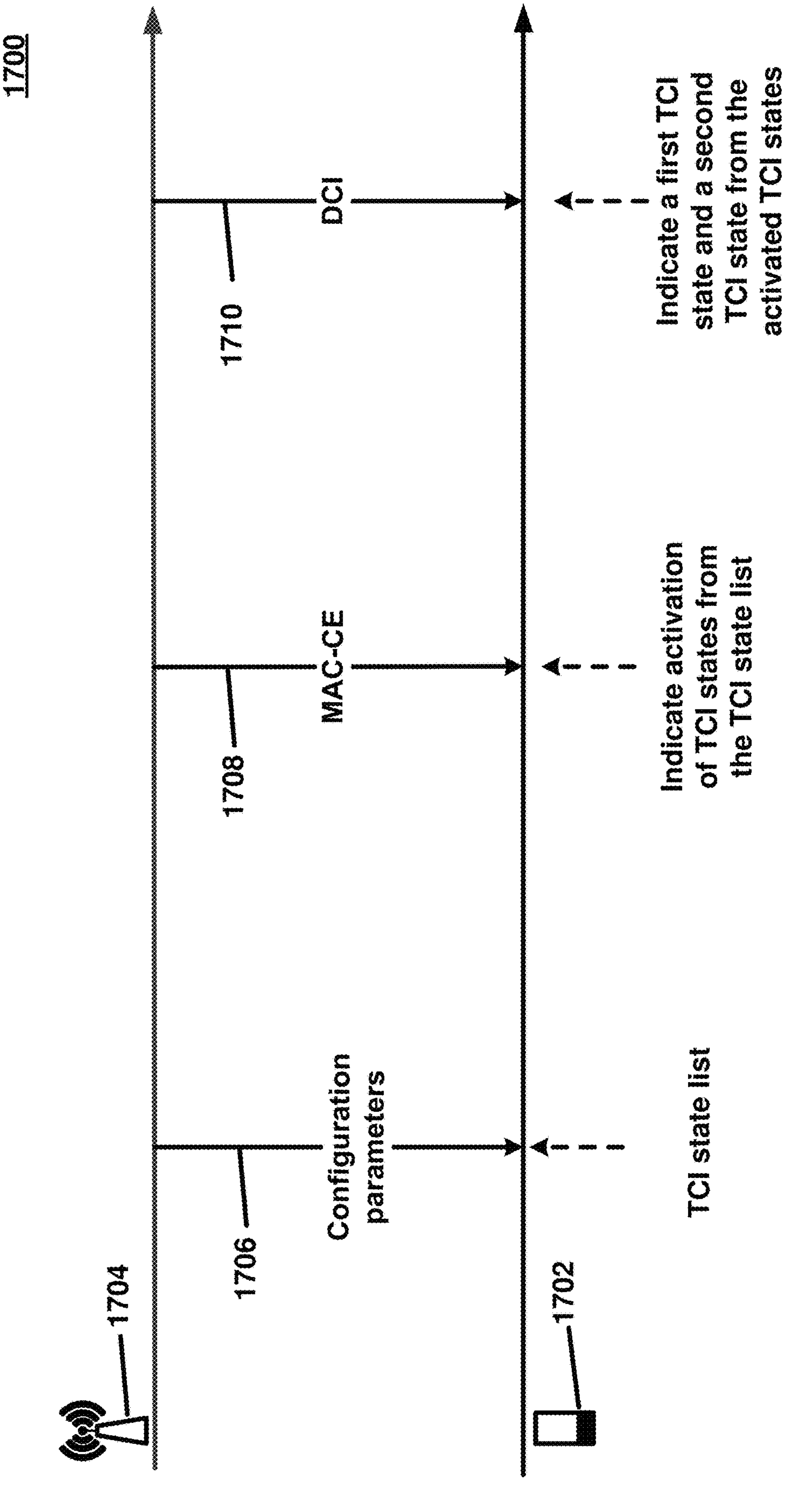
FIG. 17 illustrates a procedure that may be used to enable uplink transmission using a TCI state.

FIG. 17 illustrates a procedure 1700 that may be used to enable uplink transmission, using a TCI state, from a wireless device 1702 to a base station 1704. As shown in FIG. 17, procedure 1700 may include steps 1706, 1708, 1710, and 1712.

Step 1706 may include base station 1704 transmitting to wireless device 1702 one or more configuration parameters that comprise or indicate a list of TCI states. The one or more configuration parameters may configure wireless device 1702 with the list of TCI states.

In an implementation, the one or more configuration parameters comprise a higher layer parameter PDSCH-Config. Wireless device 1702 may use the TCI states configured within/by PDSCH-Config to decode a PDSCH according to a detected PDCCH with a DCI intended for wireless device 1702 and a given cell (e.g., a given serving cell, a given non-serving/candidate/target cell). A number of TCI states in the list may depend on a UE capability parameter maxNumberConfiguredTCIstatesPerCC. Each TCI state (e.g., TCI-State) may contain/comprise/include/indicate/have respective parameters for configuring a quasi co-location (QCL) relationship between one or more downlink reference signals and DM-RS port(s) of a PDSCH, a DM-RS port of a PDCCH, or CSI-RS port(s) of a CSI-RS resource. The QCL relationship may be configured by a higher layer parameter qcl-Type1 for a first downlink reference signal of the one or more downlink reference signals. The QCL relationship may be configured by a higher layer parameter qcl-Type2 for a second downlink reference signal of the one or more downlink reference signals. When two downlink reference signals comprising a first downlink reference signal and a second downlink reference signal are indicated by a TCI state, QCL types of the two downlink reference signals may not be the same, regardless of whether the first downlink reference signal and the second downlink reference signal are the same or different. A QCL type corresponding to a downlink reference signal of the one or more downlink reference signals may be given by a higher layer parameter qcl-Type in a higher layer parameter QCL-Info and may take one of the following values:

| |
|---|
| 'typeA': {Doppler shift, Doppler spread, average delay, delay spread} |
| 'typeB': {Doppler shift, Doppler spread} |
| 'typeC': {Doppler shift, average delay} |
| 'typeD': {Spatial Rx parameter} |

In an implementation, the one or more configuration parameters comprise a higher layer parameter dl-OrJointTCI-StateList, which may be comprised in PDSCH-Config. dl-OrJointTCI-StateList may comprise or indicate up to 128 TCI-State configurations, for example. A TCI state in the list of TCI states may provide/indicate a reference signal for a QCL for i) a DM-RS of a PDSCH, ii) a DM-RS of a PDCCH in a BWP/cell, and/or iii) a CSI-RS. A TCI state in the list of TCI states may provide/indicate a reference signal for determining an uplink transmission spatial filter for i) a dynamic-grant PUSCH, ii) a configured-grant based PUSCH, iii) a PUCCH resource in a BWP/cell, and/or, iv) an SRS.

In an implementation, the one or more configuration parameters comprise a higher layer parameter ul-TCI-StateList, which may be comprised in the parameter BWP-UplinkDedicated. ul-TCI-StateList may comprise or indicate up to 64 TCI-UL State configurations. A TCI state (e.g., TCI-UL-State or a TCI state configuration) in the list of TCI states may contain/include/have/provide/comprise a parameter for configuring a reference signal, if applicable, for determining uplink transmission spatial filter for i) dynamic-grant PUSCH transmissions, ii) configured-grant based PUSCH transmissions, iii) PUCCH transmissions via a PUCCH resource in a cell, and SRS transmissions.

Returning to FIG. 17, step 1708 may include base station 1704 transmitting a control/activation command (e.g., DCI, MAC-CE) to wireless device 1702. The control/activation command may indicate a first TCI state and a second TCI state of the list of TCI states. The first/second TCI state may be a joint TCI state or an DL TCI state, depending on the list of TCI states (dl-OrJointTCI-StateList or ul-TCI-StateList) configured in step 1706. The control/activation command may comprise one or more parameter TCI-State(s) or TCI-UL-State(s) indicating the first TCI state and the second TCI state.

The control/activation command may be used to map up to a number of TCI states and/or pairs of TCI states (e.g., up to 8 TCI states and/or pairs of TCI states), with one TCI state for downlink channels/signals and/or one TCI state for uplink channels/signals, to codepoint(s) of a DCI field ‘Transmission Configuration Indication’ for one cell or for a set of cells/downlink BWPs, and/or up to a number of sets of TCI states (e.g., up to 8 sets of TCI states). Each set of the number of sets may be comprised of up to a number of TCI state(s) for downlink and uplink signals/channels (e.g., up to two TCI state(s)), or up to a number of TCI state(s) (e.g., up to two TCI state(s)) for downlink channels/signals and up to a number of TCI state(s) (e.g., up to two TCI state(s) for uplink channels/signals to codepoint(s) of a DCI field ‘Transmission Configuration Indication’ for one cell or for a set of cells/downlink BWPs, and if applicable, for one cell or for a set of cells/uplink BWPs. When a set of TCI state IDs are activated, by the activation command, for a set of cells/downlink BWPs and if applicable, for a set of cells/uplink BWPs, where the applicable list of cells may be determined, by wireless device 1702, by an indicated cell in the activation command, the (same) set of TCI state IDs may be applied by wireless device 1702 to/for all downlink and/or uplink BWPs in the indicated cells (or the applicable list of cells). If the activation command maps TCI-State(s) and/or TCI-UL-State(s) to only one (or to a single) TCI codepoint, wireless device 1702 may apply the (indicated) TCI-State(s) and/or TCI-UL-State(s) to one cell or to a set of cells/downlink BWPs, and if applicable, to one cell or to a set of cells/uplink BWPs once the indicated mapping for the one single TCI codepoint is applied by the wireless device.

When wireless device 1702 supports two TCI states in a codepoint of the DCI field ‘Transmission Configuration Indication’, wireless device 1702 may receive an activation command (e.g., MAC-CE, DCI) used to map up to 8 combinations of one or two TCI states to codepoint(s) of the DCI field ‘Transmission Configuration Indication’. Wireless device 1702 may not expect to receive more than 8 TCI states in the activation command.

In an example, when a parameter tci-PresentInDCI (of the one or more configurations parameters) is set as ‘enabled’ or a parameter tci-PresentDCI-1-2 (of the one or more configuration parameters) is configured for a CORESET, the DCI transmitted in step 1708 (e.g., DCI format 1_1/1_2) may provide/indicate TCI state(s) (e.g., TCI-State(s) and/or TCI-UL-State(s)) for a cell or for all cells in a cell list configured by a simultaneous TCI update parameter (e.g., simultaneousU-TCI-UpdateList1, simultaneousU-TCI-UpdateList2, simultaneousU-TCI-UpdateList3, simultaneousU-TCI-UpdateList4). The DCI format may be with or without a downlink assignment. The simultaneous TCI update parameter may be a higher layer parameter (e.g., RRC parameter).

When wireless device 1702 transmits an uplink transmission (e.g., a PUCCH transmission, a PUSCH transmission) with a positive HARQ-ACK corresponding to the DCI providing/indicating the indicated TCI state(s) (e.g., TCI-State(s) and/or TCI-UL-State(s)), and if the indicated TCI State(s) is/are different from previously indicated TCI state(s), the indicated TCI State(s) may be applied, by wireless device 1702, starting from a first/starting/earliest slot that is at least a number of symbols after the last symbol of the uplink transmission. The first/starting/earliest slot and the number of symbols may be both determined, by wireless device 1702, based on an active BWP with the smallest subcarrier spacing among BWP(s) of the cells applying the indicated TCI-State(s) that are active at the end of the uplink transmission carrying/with the positive HARQ-ACK. The number of symbols may be indicated/provided to wireless device 1702 by RRC messages (e.g., one or more configuration parameters).

Figure 18B:
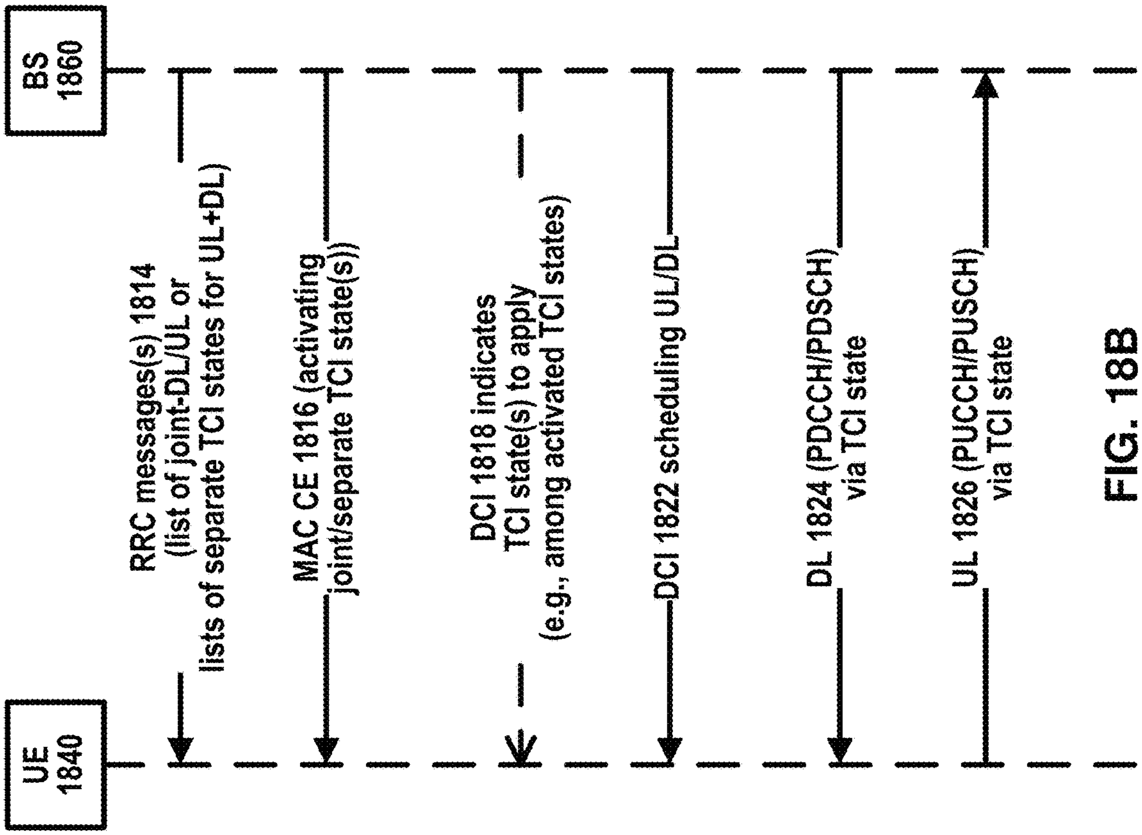
FIGS. 18A and 18B are signal flow diagrams illustrating aspects of transmission configuration indicator (TCI) state indication according to the present disclosure.
Figure 18A:
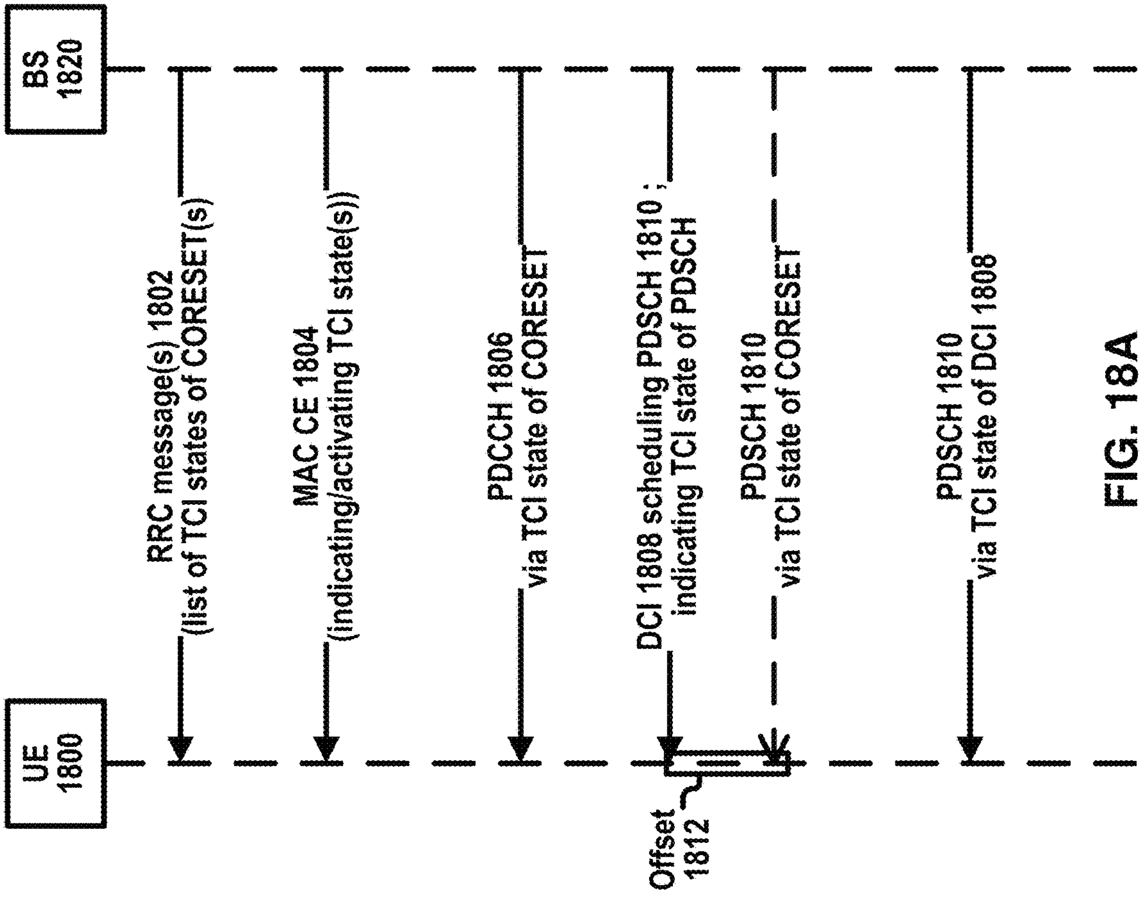

FIGS. 18A and 18B illustrate examples procedures for beam indication based on TCI states. FIG. 18A illustrates an example of a wireless device 1800 receiving, from a base station 1820, channel-specific beam indications for separate downlink physical channels, such as the PDCCH and the PDSCH. FIG. 18B illustrates an example of a wireless device 1840 receiving, from a base station 1860, beam indications applicable (jointly) to multiple physical channels (i.e., common among physical channels), such as TCI states for downlink receptions and/or uplink transmissions. This approach of using a TCI state for multiple physical channels as illustrated in FIG. 18B may be referred to as a unified TCI framework.

As illustrated in FIG. 18A, wireless device 1800 receives one or more RRC messages 1802 from base station 1820. One or more RRC messages 1802 may indicate one or more TCI states for one or more CORESETs. For example, RRC messages 1802 may comprise a list of TCI states (e.g., a list of IDs of TCI states) for CORESETs of wireless device 1800.

Each TCI state may indicate one or more reference signals. For example, each TCI state may comprise one or more IDs of one or more reference signals. The one or more reference signals of a TCI state may be used for channel estimation (including beam determination) such that a signal that is quasi co-located (QCL'd) with the reference signal of a TCI state may experience the same channel conditions (e.g., distortions) and properties as the reference signal of the TCI state and therefore the effects of the channel on the signal may be inferred from the effects of the channel on the reference signal as the reference signal is a known sequence (e.g., a pilot signal).

A TCI state may indicate which, so-called, large-scale channel properties may be inferred from the QCL association between a signal and a reference signal of a TCI state. To do so, each of the one or more reference signals of a TCI state may be associated with a QCL type. In an example, there may be four QCL types, such as QCL-Type A, QCL-Type B, QCL-Type C, and QCL-Type D. QCL-Type A may be used to estimate Doppler shift, Doppler spread, average delay, and delay spread. QCL-Type B may be used to estimate Doppler shift and Doppler spread. QCL-Type C may be used to estimate average delay and Doppler shift. QCL-Type D may be used for spatial domain parameters (e.g., one or more parameters for spatial domain reception filters used to receive downlink signals).

A reference signal of a TCI state with a QCL type of QCL-Type D may be used for beam determination. For example, when a signal is QCL'd with a reference signal of a TCI state with QCL-Type D, wireless device 1800 may determine (e.g., assume or infer) that base station 1820 applies the same spatial (domain) filter to both the signal and the reference signal of the TCI states. By being able to determine (e.g., assume or infer) the spatial domain (transmission) filter applied by base station 1820 to a signal (from the spatial domain filter applied to the QCL'd reference signal), wireless device 1800 may apply a spatial domain (reception) filter suitable to receive the signal.

Returning to FIG. 18A, wireless device 1800 receives one or more RRC messages 1802 that indicate TCI states. For example, one or more RRC messages 1802 may comprise a list of TCI states of a CORESET (e.g., a list of IDs of TCI states). Wireless device 1800 may use the TCI states in the list for receiving PDCCHs on the CORESETs. The TCI states indicated by one or more RRC messages 1802 may be referred to as configured TCI states or RRC-configured TCI states.

FIG. 18A illustrates that wireless device 1800 receives MAC CE 1804 from base station 1820. MAC CE 1804 may indicate, or activate, one or more TCI states configured by one or more RRC messages 1802. For example, MAC CE 1804 may indicate a (e.g., single) TCI state for one or more CORESETs (e.g., for PDCCH receptions via the one or more CORESETs). As another example, MAC CE 1804 may activate a plurality of TCI states that may be used (applied) for PDCCH receptions via CORESETs. The TCI states indicated by MAC CE 1804 may be referred to as activated TCI states or MAC-CE activated TCI states.

Wireless device 1800 may determine one or more spatial (domain) filter parameters based on a reference signal of the TCI state. For example, FIG. 18A illustrates that wireless device 1800 receives PDCCH 1806, of a CORESET, via a TCI state of the CORESET.

For PDSCH reception, a DCI may be used to indicate which TCI state, among the (MAC-CE) activated TCI states (e.g., for the CORESETs), wireless device 1800 is to use (apply) for receiving PDSCH receptions (e.g., data, transport blocks, code block groups of a transport block). As illustrated, wireless device 1800 receives DCI 1808. DCI 1808 schedules a PDSCH transmission and indicates which TCI state, among the activated TCI states, wireless device 1800 is to use (apply) for receiving the PDSCH transmission. A TCI state indicated by a DCI may be referred to as an indicated TCI state. Similarly, a TCI state indicated by a MAC CE that indicates a single TCI state may be referred to as an indicated TCI state.

Although DCI 1808 indicates a TCI state to use for receiving the scheduled PDSCH reception, wireless device 1800 may apply a different TCI state depending on an offset (e.g., in scheduling) between receiving DCI 1808 and the PDSCH reception. For example, DCI 1808 may schedule PDSCH reception 1810 within an offset 1812. Offset 1812 may be referred to as a scheduling offset. Offset 1812 may be a duration or a number of symbols. Offset 1812 may be based on a UE-capability of wireless device 1800.

Based on base station 1820 scheduling, via DCI 1808, the PDSCH reception 1810 within offset 1812, wireless device 1800 applies the TCI state of the CORESET. That is, wireless device 1800 applies the TCI state used to receive PDCCH 1806 (e.g., and does not apply the TCI state indicated by DCI 1808 for receiving PDSCH reception 1810).

Within offset 1812, wireless device 1800 may be unable to (successfully) decode DCI 1808, update the spatial filtering, and/or retune RF chains in time for receiving PDSCH reception 1810. By using the TCI state of the CORESET used to receive PDCCH 1806 (instead of the TCI state indicated in DCI 1808 for receiving the PDSCH reception 1810), this allows wireless device 1800 to receive PDSCH reception 1810 within offset 1812.

On the other hand, when, e.g., PDSCH 1810 is scheduled after offset 1812, wireless device 1800 may apply the TCI state indicated by DCI 1808 for receiving PDSCH reception 1810. For example, FIG. 18A illustrates that wireless device 1800 receives, from base station 1820, PDSCH reception 1810 via the TCI state indicated by DCI 1808. As another example, in response to DCI 1808 not comprising a field indicating a TCI state (any TCI state) for PDSCH reception 1810 (e.g., based on a DCI format of DCI 1808, such as DCI 1_0), wireless device 1800 may apply the TCI state of the CORESET for PDSCH reception 1810.

In the example illustrated in FIG. 18A, base station 1820 may transmit separate beam indications for the PDCCH and the PDSCH, along with separate beam indications for each PDSCH transmission. FIG. 18B illustrates an example of a unified TCI state framework. Under the unified TCI state framework, a single TCI state (or a set of TCI states) may be indicated for each of the downlink physical channels, such as a single TCI state for both PDCCH and PDSCH transmissions. A TCI state that is applied to both the PDCCH and PDSCH may be referred to as a downlink TCI state or a joint-downlink TCI state (joint may refer to a TCI state being jointly applied to different physical channels). For uplink beam indications under the unified TCI state framework, the network may indicate a TCI state (or a set of TCI states) for each of the uplink physical channels, such as a single TCI state for both PUCCH and PUSCH transmissions. A TCI state that is applied to both the PUCCH and PUSCH may be referred to as an uplink TCI state or a joint-uplink TCI state.

In addition to providing TCI states that are (jointly) applied to each of the physical channels in the downlink or uplink, the unified TCI state framework may also be used to indicate a single TCI state (or a set of TCI states) for both downlink and uplink. That is, the TCI state is used for each of the physical channels of the downlink and uplink, such as the PDCCH, PDSCH, PUCCH, and PUSCH. A TCI state applicable to both downlink and uplink, the TCI state may be referred to as a joint TCI state, a joint DL/UL TCI state, or a common TCI state. A TCI state applicable to the unified TCI state framework, the TCI state may be referred to as a unified TCI state.

Returning to FIG. 18B, wireless device 1840 receives, from base station 1860, one or more RRC messages 1814. One or more RRC messages 1814 indicates a plurality of TCI states. The plurality of TCI states may be a plurality of unified TCI states. As an example, one or more RRC messages 1814 may comprise a list of the plurality of TCI states. The list of the plurality of TCI states may be a list of joint (downlink-and-uplink) TCI states, which may be applied to both the downlink and uplink (e.g., each of the downlink and uplink physical channels). The list of joint TCI states may be a list of downlink TCI states (or joint-downlink TCI states), and the absence of a (separate) list of uplink TCI states may imply that the list of downlink TCI states is applicable to both the downlink and uplink (physical channels). In another example, one or more RRC messages 1814 may comprise separate lists of TCI states for downlink and uplink. For example, the list of the plurality of TCI states may comprise a list of downlink TCI states and a list of uplink TCI states. Additionally or alternatively, one or more RRC messages 1814 may comprise a parameter indicating that the TCI states are joint (e.g., TCI states are applicable for both downlink and uplink) or separate (e.g., TCI states are applicable to downlink or uplink).

As another example, one or more RRC messages 1814 may indicate one (e.g., a single) TCI state instead of a plurality of TCI states. In response to one or more RRC messages 1814 indicating one TCI state, wireless device 1840 may (e.g., start to) apply the TCI state without additional signaling via MAC CE and/or DCI.

Similar to the TCI states indicated by one or more RRC messages 1802 of FIG. 18A, the plurality of TCI states indicated by one or more RRC messages 1814 may be referred to as configured TCI states or RRC-configured TCI states.

There may be two mechanisms for indicating which TCI state, among the plurality of TCI states configured by one or more RRC messages 1814, to use (apply) to transmissions between wireless device 1840 and base station 1860. In a first mechanism, wireless device 1840 receives a MAC CE 1816. MAC CE 1816 indicates a (e.g., single) TCI state, or multiple TCI states, among the plurality of TCI states indicated by one or more RRC messages 1814 (i.e., among the (RRC-)configured TCI states). For example, a field of MAC CE 1816 may indicate a (e.g., single) value (e.g., a single value or a single codepoint) that is associated with one TCI state or more TCI states (e.g., one codepoint associated with two TCI states) among the plurality of TCI states indicated by one or more RRC messages 1814.

MAC CE 1816 may indicate a TCI state to be applied to downlink and uplink. For example, MAC CE 1816 may indicate, or comprise, an ID of a TCI state among TCI states in a list of downlink TCI states (joint-downlink TCI states). As another example, MAC CE 1816 may indicate separate TCI states for downlink and uplink. For example, MAC CE 1816 may indicate an ID of a TCI from the TCI states in a list of downlink TCI states (joint-downlink TCI states) and an ID of a TCI state from TCI states in a (separate) list of uplink TCI states. To indicate the one or more TCI states, MAC CE 1816 may comprise a field and a value of the field may correspond to an ID of the TCI state. In addition, MAC CE 1816 may have an indicator associated with the field (e.g., in the same octet) that indicates whether the indicated TCI state is an uplink TCI or a downlink TCI state (e.g., the ID of the TCI state is from the list of downlink TCI states or from the list of uplink TCI states configured by one or more RRC messages 1814).

In a second mechanism for indicating which TCI state to use (apply), both MAC CE and DCI signaling is involved. As illustrated in FIG. 18B, wireless device 1840 receives MAC CE 1816. MAC CE 1816 may indicate activation of a plurality of TCI states. For example, fields of MAC CE 1816 may indicate a plurality of values (e.g., codepoints) that are associated with the plurality of TCI states (e.g., each codepoint being associated one or more TCI states) among the plurality of TCI states indicated by one or more RRC messages 1814. The TCI states activated by MAC CE 1816 may be referred to as activated TCI states. Wireless device 1840 may receive DCI 1818. DCI 1818 may indicate a TCI state among the TCI states activated by MAC CE 1816. Based on DCI 1818 indicating the TCI state among the (MAC-CE) activated TCI states, wireless device 1840 applies the (DCI-)indicated TCI state for receiving transmissions on physical channels.

Similar to MAC CE 1816, DCI 1818 may indicate one or more TCI states. For example, DCI 1818 may indicate a TCI state for downlink receptions (e.g., from among the plurality of TCI states activated by MAC CE 1816). DCI 1818 may indicate a TCI state for uplink transmissions (e.g., from among the plurality of TCI states activated by MAC CE 1816). As example of indicating a TCI state, DCI 1818 may comprise a field to indicate the one or more TCI states. The field may be referred to as a TCI state field. A value (e.g., a codepoint) of the TCI state field of DCI 1818 may be associated with one or more TCI states. For example, a value of the TCI state field may indicate a TCI state to be applied to downlink transmission, a value of the TCI state field may indicate a TCI state to be applied to uplink transmissions, and/or a value of the TCI state field may indicate (both) a TCI to be applied to downlink transmissions and a TCI state to be applied to uplink transmissions. One or more RRC messages 1814 may indicate the association between the values (e.g., codepoints) of the TCI state field of DCI 1818 and the IDs of the plurality of TCI states (configured by one or more RRC messages 1814 and activated by MAC CE 1816).

A TCI state indicated by MAC CE 1816 and/or DCI 1818 may be referred to as an updated TCI state, and the indicating by MAC CE 1816 and/or DCI 1818 may be referred to as updating the (current) TCI state. That is, by indicating a TCI state for downlink and/or uplink, MAC CE 1816 (in the first mechanism) may be said to update the (indicated) TCI state. Similarly, when MAC CE 1816 indicates activation of TCI states and DCI 1818 indicates a TCI state for downlink and/or uplink, DCI 1818 may be said to update the (indicated) TCI state.

After the TCI state is indicated by MAC CE 1816 and/or DCI 1818, wireless device 1840 applies the TCI state to receive downlink receptions and/or transmit uplink transmissions. That is, the (indicated) TCI state may remain as the TCI state that wireless device 1840 applies to (subsequent) downlink receptions and uplink receptions (e.g., until the TCI state is indicated, or updated, by a subsequent MAC CE and/or DCI).

Returning to FIG. 18B, wireless device 1840 receives a DCI 1822 from base station 1860. DCI 1822 schedules one or more downlink transmissions and/or schedules (or triggers) one or more uplink transmissions. Wireless device 1840 receives downlink transmission 1824 via the TCI state (indicated by MAC CE 1816 and/or DCI 1818). In addition, wireless device 1840 transmits uplink transmission 1826 via the TCI state (indicated by MAC CE 1816 and/or DCI 1818).

Figures 19A, 19B, 19C:
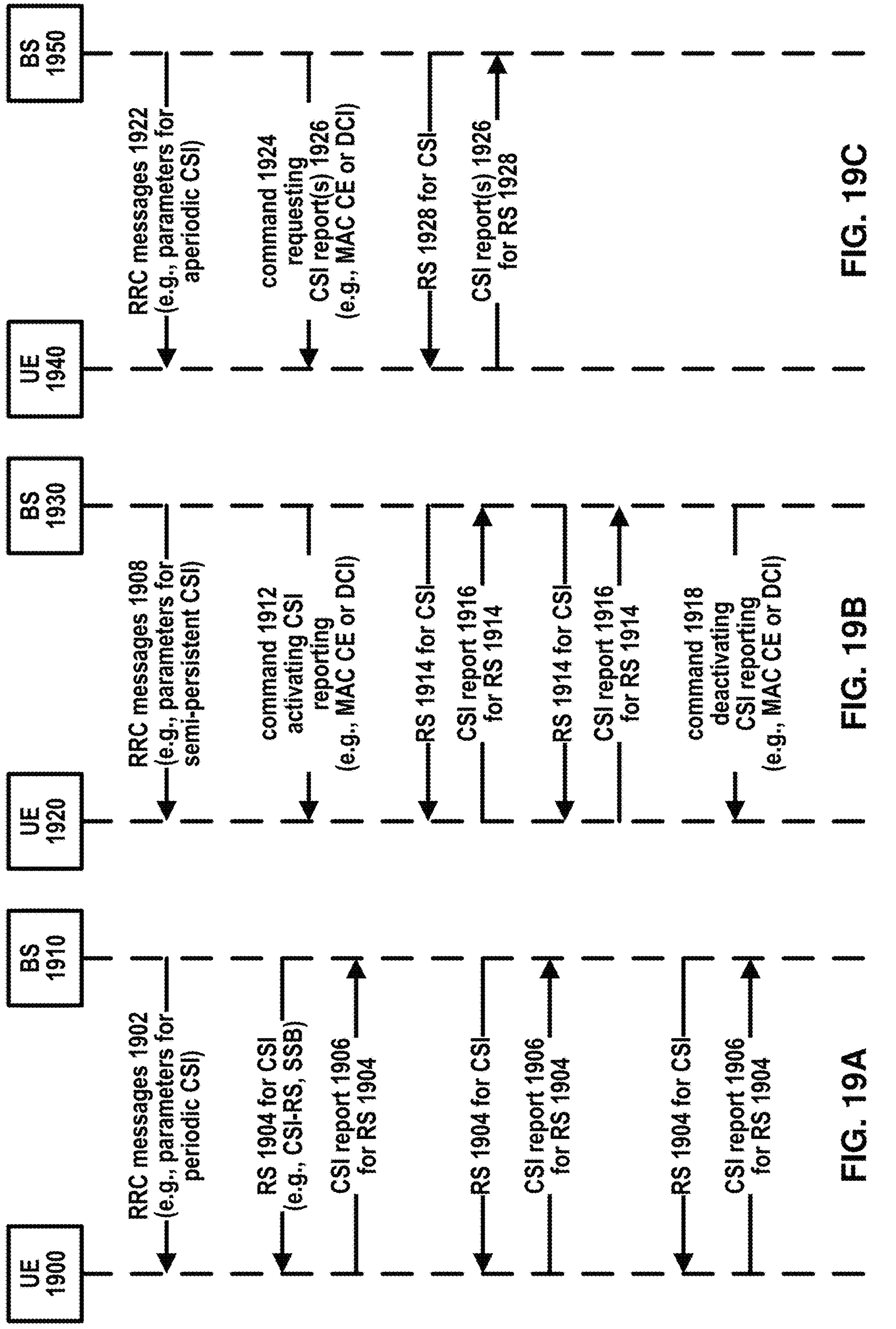
FIGS. 19A, 19B, and 19C are signal flow diagrams illustrating aspects of channel state information (CSI) reporting, triggered by the network, according to the present disclosure.

FIGS. 19A, 19B, and 19C illustrate example procedures for CSI reporting triggered by the network (e.g., a base station). FIG. 19A illustrates an example of periodic CSI reporting in which a wireless device 1900 periodically transmits CSI reports to a base station 1910. FIG. 19B illustrates an example of semi-persistent CSI reporting in which a wireless device 1920, after receiving an activation command from a base station 1930, periodically transmits CSI reports to base station 1930 until wireless device 1920 receives a deactivation command from base station 1930. FIG. 19C illustrates an example of aperiodic CSI reporting in which a wireless device 1940 receives, from a base station 1950, a request to transmit one or more aperiodic CSI reports to base station 1950 (e.g., a plurality of aperiodic CSI reports may be requested, which are not periodically transmitted).

FIG. 19A illustrates wireless device 1900 receives, from base station 1910, one or more RRC messages 1902. One or more RRC messages 1902 may indicate, or comprise, parameters for periodic CSI reporting. The parameters for periodic CSI reporting may comprise, for example, one or more CSI reporting configuration parameters, such as a CSI report configuration and/or a resource configuration of reference signals (e.g., resources of reference signals).

One or more RRC messages 1902 may indicate a periodicity for CSI reporting. This may be referred to as a report periodicity type. The periodicity may indicate that report periodicity type is periodic or semi-persistent. In FIG. 19A, the one or more parameters for periodic CSI reporting, in one or more RRC messages 1902, indicate that the periodicity for CSI reporting is periodic (e.g., the periodicity is set to periodic).

The one or more parameters for periodic CSI reporting (e.g., in the CSI report configuration), of one or more RRC messages 1902, may indicate one or more quantities to measure and report. A quantity to measure and report may be referred to as a report quantity, a quantity, or a radio link quality. The report quantity of the one or more configuration parameters for periodic CSI reporting may indicate to report one or a combination of any one of the following report quantities: channel quality indicator (CQI), a rank indicator (RI), a precoder-matrix indicator (PMI), a (e.g., strongest) layer indicator (LI or SLI), and/or a layer-1 RSRP (L1-RSRP).

The one or more parameters for periodic CSI reporting, of one or more RRC messages 1902, may indicate the (downlink) reference signals that wireless device 1900 measures to report the report quantity. For example, one or more parameters may indicate a reference signal from reference signals in a reference signal configuration. The reference signals and configurations of reference signals may be referred to as resource sets (e.g., of reference signals) and configuration of resource sets (e.g., for reference signals). The types of reference signals indicated by the one or more parameters may be CSI-RSs and/or SSBs. For example, the reference signal configuration may be a (non-zero power) CSI-RS resource set, which configures a set of CSI-RSs or a set of SSBs for CSI. The set of CSI-RSs may be one or more CSI-RSs (e.g., one CSI-RS may be configured in the set) and the set of SSBs may be one or more SSBs (e.g., one SSB may be configured in the set).

As with CSI reports, there may be three types of periodicities of (downlink) reference signals that may be measured and reported. A reference signal may be a periodic reference signal, a semi-persistent reference signal, or an aperiodic reference signal. A semi-persistent reference signal is a reference signal with a periodicity that may be (e.g., dynamically) stopped or skipped based on signaling.

The CSI reporting periodicity and the periodicity of the reference signal may be different from each other. For example, periodic CSI reporting may be reported for periodic reference signals. Semi-persistent CSI reporting may be reported for periodic reference signals and/or semi-persistent reference signals. Aperiodic CSI reporting may be reported for periodic reference signals, semi-persistent reference signals, and/or aperiodic reference signals.

In periodic CSI reporting, wireless device 1900 may not receive any signaling to begin reporting CSI (other than one or more RRC messages 1902) from base station 1910. That is, there is no (trigger) condition for periodic CSI reporting. For example, FIG. 19A illustrates that, after wireless device 1900 receives one or more RRC messages 1902, wireless device 1900 receives (e.g., starts receiving) a reference signal 1904 from base station 1910. Reference signal 1904 may be a periodic reference signal (e.g., periodic CSI-RS or SSB), as explained above. One or more RRC messages 1908 may indicate reference signal 1904 to be used for the periodic CSI reporting (e.g., from a reference signal configuration). Wireless device the transmits a CSI report 1906 based on reference signal 1904 to base station 1910. CSI report 1906 may comprise the report quantity indicated by the one or more parameters for periodic CSI reporting in one or more RRC messages 1902. Wireless device 1900 may measure (e.g., a radio link quality) of reference signal 1904 based on the report quantity indicated by one or more RRC messages 1902.

As illustrated in FIG. 19A, wireless device 1900 periodically transmits CSI report 1906 to base station 1910. While the same CSI report 1906 is illustrated (with the same type of report quantity), a value of the report quantity may change with each transmission of CSI report 1906 based on reference signal 1904.

FIG. 19B illustrates an example of semi-persistent CSI reporting. As illustrated, wireless device 1920 receives one or more RRC messages 1908 from base station 1930. One or more RRC messages 1908 comprise parameters for semi-persistent CSI reporting. One or more RRC messages 1908 may indicate, or comprise, the same parameters discussed above one or more RRC messages 1902 in FIG. 19A. For example, one or more RRC messages 1908 may indicate a periodicity for CSI reporting. The report periodicity type in one or more RRC messages 1908 is semi-persistent (instead of periodic as in one or more RRC messages 1902). In addition, the report periodicity type may indicate one of two types of semi-persistent CSI reporting. For example, the report periodicity type may indicate semi-persistent CSI reporting on PUCCH or semi-persistent CSI reporting on PUSCH. In FIG. 19B, the report periodicity type is semi-persistent on PUSCH.

Like one or more RRC messages 1902, one or more RRC messages 1908 may indicate a report quantity and (downlink) reference signals for the semi-persistent CSI reporting (on PUCCH or PUSCH). The parameters for semi-persistent CSI reporting may indicate a periodic reference signal or a semi-persistent reference signal for wireless device 1920 to measure and report to base station 1930.

Semi-persistent CSI reporting is similar to periodic CSI reporting except that signaling is involved to activate and deactivate the CSI reporting. As illustrated, wireless device 1920 receives a command 1912 indicating activation of the (semi-persistent) CSI reporting. Command 1912 may be an activation command. For example, command 1912 may be a MAC CE indicating activation of the semi-persistent CSI reporting (e.g., on PUCCH) or a DCI indicating activation of semi-persistent CSI reporting (e.g., on PUSCH). After receiving command 1912, wireless device 1920 may (start) receiving a reference signal 1914 for CSI reporting (e.g., CSI-RS or SSB). As illustrated, wireless device 1920 does not receive (e.g., measure) reference signal 1914 until (after) wireless device 1920 receives command 1912 from base station 1930, After base station 1930 indicates activation of semi-persistent CSI reporting via command 1912, wireless device 1920 (periodically) transmits a CSI report 1916 for reference signal 1914. CSI report 1916 indicates the reporting quantity of reference signal 1914. Similar to (periodic) CSI report 1906 of FIG. 18A, the reporting quantity in CSI report 1916 may change over time based on measurements on reference signal 1914.

Wireless device 1920 (continues) periodically transmitting CSI report 1916 until a deactivation command is received in semi-persistent CSI reporting. As illustrated, wireless device 1920 receives a command 1918 from base station 1930. Command 1918 indicates deactivation of the (semi-persistent) CSI reporting. Command 1918 may be a deactivation command. For example, command 1918 may be a MAC CE indicating deactivation of the semi-persistent CSI reporting (e.g., on PUCCH) or a DCI indicating deactivation of semi-persistent CSI reporting (e.g., on PUSCH). After receiving command 1918 indicating to deactivate (semi-persistent) CSI reporting, wireless device 1920 may stop transmitting (and measuring) CSI report 1916 of reference signal 1914.

FIG. 19C illustrates an example of aperiodic CSI reporting. As illustrated, wireless device 1940 receives one or more RRC messages 1922 from base station 1950. One or more RRC messages 1922 comprises parameters for aperiodic CSI reporting.

One or more RRC messages 1922 may indicate, or comprise, the same parameters discussed above one or more RRC messages 1902 in FIG. 19A for periodic CSI reporting and/or one or more RRC messages 1908 for semi-persistent CSI reporting. For example, one or more RRC messages 1922 may indicate a periodicity for CSI reporting. The report periodicity type in one or more RRC messages 1922 is aperiodic (instead of periodic or semi-persistent).

Like one or more RRC messages 1902 for periodic CSI reporting and one or more RRC messages 1908 for semi-persistent CSI reporting, one or more RRC messages 1922 may indicate a report quantity and (downlink) reference signals for the aperiodic CSI reporting (e.g., on PUSCH). The parameters for aperiodic CSI reporting may indicate one or more reference signals for aperiodic CSI reporting. The types of reference signals for aperiodic CSI reporting may be periodic reference signals, semi-persistent reference signals, and/or aperiodic reference signals. The reference signals used for aperiodic CSI reports may be CSI-RSs and/or SSBs.

For aperiodic CSI reporting, a base station 1950 may transmit a DCI indicating a request for one or more aperiodic CSI reports. The request may be a CSI request field of the DCI. One or more RRC messages 1922 may indicate an association between reference signals or reference signal resource sets) and one or more bits of a CSI request field of a DCI. This allows base station 1950 to (dynamically) request (or trigger) wireless device 1940 to transmit a CSI report for one or more of the reference signals (or reference signal resource sets). In addition, one or more RRC messages 1922 may indicate a size of the CSI request field of the DCI for requesting aperiodic CSI reports (e.g., a trigger size). The size of CSI request field may be 0, 1, 2, 3, 4, 5 or 6 bits depending on the size indicated by a parameter in (the parameters for aperiodic CSI reporting of) one or more RRC messages 1922.

After receiving one or more RRC messages 1922 in FIG. 19C, wireless device 1940 receives a command 1924 from base station 1950. Command 1924 requests wireless device 1940 to transmit one or more aperiodic CSI reports 1926 of one or more reference signals 1928. Command 1924 may be a DCI. One or more aperiodic CSI reports 1926 may be a plurality of aperiodic CSI reports.

The parameters for aperiodic CSI reporting in one or more RRC messages 1922 do not comprise uplink resources for transmitting aperiodic CSI reports 1926. Instead, command 1924 indicates uplink resources (e.g., comprises an uplink grant) for one or more CSI reports 1926. As illustrated, wireless device 1940 transmits one or more CSI reports 1926 for one or more reference signals 1928. Wireless device 1940 transmits the one or more CSI reports 1926 on the PUSCH.

Figures 20A, 20B, 20C:
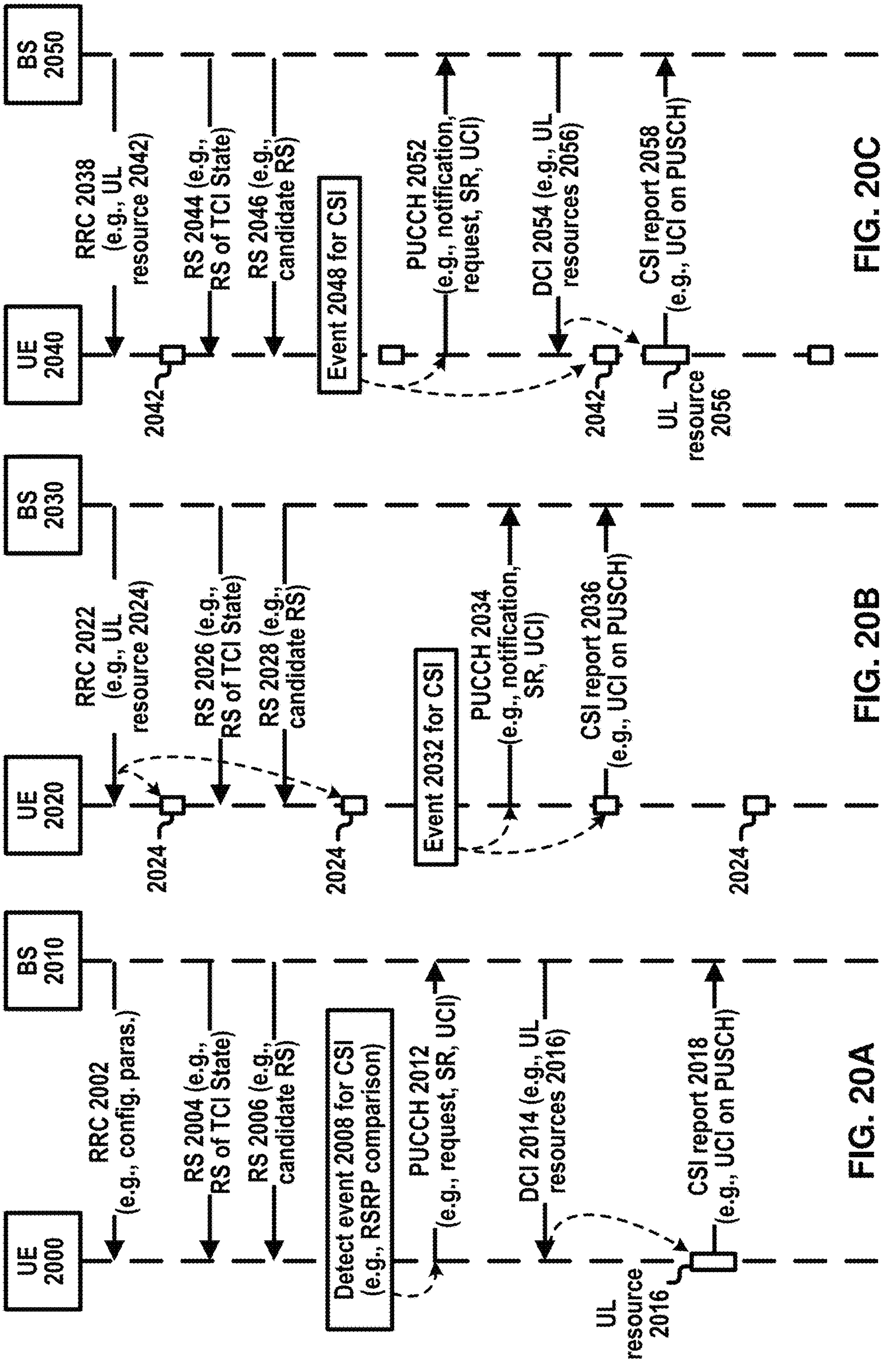
FIGS. 20A, 20B, and 20C are signal flow diagrams illustrating aspects of CSI reporting, triggered by a wireless device, according to the present disclosure.

FIGS. 20A, 20B, and 20C illustrate example procedures for CSI reporting triggered (initiated) by the wireless device independently of the network. In periodic CSI reporting, semi-persistent CSI reporting, and aperiodic CSI reporting as illustrated in FIGS. 19A, 19B, and 19C, respectively, the network acts as a scheduler of CSI reporting and triggers the wireless device to transmit CSI reports. In the CSI reporting illustrated in FIGS. 20A, 20B, and 20C, the wireless device initiates (and triggers) CSI reporting. The example procedures in FIGS. 20A, 20B, and 20C may be used to provide the network with CSI for use in updating a (current) TCI state, such as a TCI state used in the unified TCI framework (e.g., for downlink, uplink, and/or both downlink and uplink) as illustrated in FIG. 18B.

In the present disclosure, CSI reporting triggered by a wireless device may be referred to as event-driven CSI reporting, event-based CSI reporting, UE-initiated CSI reporting, UE-initiated beam reporting, or UE-initiated beam management. Similarly, a procedure for CSI reporting triggered by the wireless device may be referred to as an event-driven CSI reporting procedure, an event-based CSI reporting procedure, a UE-initiated CSI reporting procedure, a UE-initiated beam reporting procedure, or a UE-initiated beam management procedure. A CSI report, based on CSI reporting triggered by the wireless device, may be referred to as an event-driven CSI report, an event-based CSI report, a UE-initiated CSI report, a UE-initiated beam report, or a UE-initiated beam management report. Furthermore, the terms "event-driven," "event-based," "event-triggered," "UE-initiated," "UE-triggered," "terminal-initiated," and "terminal-triggered" may be used to refer to CSI reporting triggered by a wireless device and CSI reports based on the same.

FIG. 20A illustrates a first mode (also known as mode-A) of UE-initiated CSI reporting in which a wireless device 2000 uses (dynamic) uplink grants to transmit UE-initiated CSI reporting to a base station 2010. FIG. 20B illustrates a second mode (also known as mode-B) of UE-initiated CSI reporting in which a wireless device 2020 uses preconfigured uplink resources for reporting UE-initiated CSI reports to a base station 2030. FIG. 20C illustrates a scenario in which a wireless device 2040 and a base station 2050 use a combination of the first mode of FIG. 20A (using dynamic uplink grants) and the second mode of FIG. 20B (using preconfigured uplink resources) for transmitting UE-initiated CSI reporting.

As illustrated in FIG. 20A, wireless device 2000 receives one or more RRC messages 2002 from base station 2010. One or more RRC messages 2002 may indicate, or comprise, one or more CSI reporting configuration parameters for CSI reporting (e.g., UE-initiated CSI reporting).

The one or more CSI reporting configuration parameters, in one or more RRC messages 2002, may comprise a report configuration type parameter. The report configuration type parameter may indicate that the CSI reporting, of the one or more CSI reporting configuration parameters, is based on wireless device 2000 detecting an event. For example, the report configuration type parameter may be set to event-triggered (or UE-initiated).

The event may be, for example, a result from a comparison of a radio link quality of a reference signal to a reference signal of a TCI state. The event may be, for example, a result from a comparison of a threshold value to a reference signal of a TCI state. The reference signal of the TCI state may be referred to as a current reference signal or a reference signal of a current TCI state (e.g., a TCI state that has been indicated by a MAC CE for downlink and/or uplink or a TCI state that has been activated by a MAC CE and indicated by a DCI, as discussed in connection with FIG. 18B). A QCL type of the reference signal of the TCI, used for the comparison, may be QCL-Type D. The reference signal that wireless device 2000 compares to the current reference signal of the TCI state, for detecting the event, may be referred to a candidate reference signal.

In an example, the event may be that the radio link quality of the candidate reference signal is a threshold value better than a radio link quality of a reference signal of a TCI state. For example, the event may be that the radio link quality of the candidate reference signal is better (e.g., higher) than a radio link quality of a current reference signal of a TCI state by a threshold value. That is, the amount that the radio link quality of the candidate reference signal is better (e.g., higher or greater than) the radio link quality of the current reference signal of the TCI state may be greater than, or equal to, a threshold value. For example, the event may be that a radio link quality of a current reference signal of a TCI state is lower/worse than a threshold value One or more RRC messages 2002 may indicate the threshold value for detecting the event. In another example, the threshold value may be preconfigured (e.g., predetermined without being signaled). The threshold value may be an RSRP value, an RSRP offset, an SINR value, or an SINR offset. Similarly, the radio link quality may be a RSRP, a layer-1 RSRP, or a signal to interference-and-noise ratio (SINR). The radio link quality may be referred to as a report quantity. One or more RRC messages 2002 may indicate in the radio link quality to report (e.g., a report quantity).

The one or more CSI reporting configuration parameters may comprise a CSI resource parameter indicating a list of candidate reference signals. The list of candidate reference signals may be for CSI reporting triggered by the wireless device based on detecting the event. The list of candidate reference signals may be referred to as a list of candidate reference signals for UE-initiated CSI reporting or a reference signal resource set for UE-initiated CSI reporting.

In an example, the list of candidate reference signals may be a (e.g., UE-specific or dedicated) list of reference signals for CSI reporting triggered by wireless device 2000. In another example, the list of candidate reference signals may be for a cell (e.g., common among wireless devices in the cell). In another example, the list of reference signals for CSI reporting may be reference signals of TCI states indicated (e.g., configured) by one or more RRC messages 2002. In another example, the list of reference signals for CSI reporting may be reference signals of TCI states activated by a MAC CE.

The one or more CSI reporting configuration parameters, indicated by one or more RRC messages 2002, may comprise an ID of a reference signal (resource) configuration. The reference signal configuration may be a CSI resource configuration ID. The reference signal configuration may indicate a list of one or more CSI-RS resource sets. The reference signals of the one or more CSI-RS resource sets may be CSI-RSs or SSBs.

The one or more CSI reporting configuration parameters may indicate PUCCH resources. The one or more CSI reporting configuration parameters may indicate a PUCCH resource among PUCCH resources of an uplink BWP. For example, the one or more CSI reporting configuration parameters, of one or more RRC messages 2002, may comprise an ID of a PUCCH resource among (IDs of) PUCCH resources of an uplink BWP.

In the first mode, the one or more CSI reporting configuration parameters may not indicate uplink resources for (transmitting) the CSI reporting. That is, the one or more CSI reporting configuration parameters may not indicate the uplink resources (e.g., PUSCH resources) for transmitting CSI reports triggered by wireless device 2000 based on detecting an event. The absence of an indication of the uplink resources to be used for transmitting CSI reports triggered by wireless device 2000 may (implicitly) indicate that the CSI reporting configuration parameters are for a first mode of CSI reporting in which the uplink resources must be requested from base station 2010 (e.g., a request for a dynamic grant).

The one or more CSI reporting configuration parameters may comprise a parameter indicating that CSI reporting, triggered by wireless device 2000 based on detecting the event (e.g., UE-initiated or event-driven CSI reporting), is enabled or activated. In an embodiment, the parameter may indicate that CSI reporting is enabled, or activated, for a cell. In another embodiment, the parameter may indicate that CSI reporting is enabled, or activated, for an uplink BWP. Additionally or alternatively to the implicit indication, the parameter (or another parameter) may (explicitly) indicate a mode that is being configured among the first mode and the second mode.

The one or more CSI reporting configuration parameters may comprise one or more timer values of one or more timers for detecting the event. Each of the one or more timers may be associated with at least one candidate reference signal among the one or more candidate reference signals.

The one or more CSI reporting configuration parameters may comprise one or more maximum count values of one or more counters of a number of times the event is detected, for one or more candidate reference signals. Each of the one or more counters may be incremented (e.g., up to an associated maximum count value among the one or more maximum count values) in response to receiving an indication (e.g., from a PHY layer of wireless device 2000) that the one or more candidate reference signals satisfy the event. Each of the one or more counters may be associated with a (respective) candidate reference signal.

The one or more CSI reporting configuration parameters may comprise, or indicate, one or more configuration parameters of an SR (e.g., an SR configuration for the SR). The one or more configuration parameters of the SR may indicate a PUCCH resource, from among PUCCH resources in an uplink BWP, configured for the SR. The one or more configuration parameters of the SR indicate a periodicity and offset of the SR.

After receiving one or more RRC messages 2002, wireless device 2000 receives a reference signal 2004, of a TCI state, from base station 2010. Reference signal 2004 is a current reference signal of a TCI (an indicated TCI state by MAC CE and/or DCI for downlink and/or uplink). As illustrated, wireless device 2000 receives a reference signal 2006. Reference signal 2006 is a candidate reference signal for CSI reporting triggered by wireless device 2000. Reference signal 2006 may be from a list of candidate reference signals in one or more RRC messages 2002. As another example, reference signal 2006 may be a reference signal of a TCI state among the (e.g., MAC CE) activated TCI states (other than reference signal 2004). In yet another example, reference signal 2006 may be a reference signal of a TCI state among the (e.g., RRC) configured TCI states.

In an example, reference signal 2004 of the TCI state may be a reference signal (e.g., CSI-RS) indicated by the TCI state. A configuration of the TCI state may comprise a reference signal identifier/index indicating/identifying the reference signal 2004 of the TCI state.

In an example, reference signal 2004 of the TCI state may be a source reference signal (e.g., SSB) that is quasi co-located with a reference signal indicated by the TCI state. A configuration of the TCI state may comprise a reference signal identifier/index indicating/identifying the reference signal. The reference signal may be quasi co-located with the reference signal 2004.

FIG. 20A illustrates that wireless device 2000 detects an event 2008 for CSI reporting (e.g., that triggers CSI reporting). For example, as an example of event 2008, wireless device 2000 may detect that a radio link quality (e.g., L1-RSRP, L1-SINR) of reference signal 2006 is a threshold value better than (e.g., greater than by at least a threshold value) than a radio link quality of reference signal 2004 of the TCI state. For example, as an example of event 2008, wireless device 2000 may detect that a radio link quality (e.g., L1-RSRP, L1-SINR) of reference signal 2004 of the TCI state is lower/worse than a threshold value.

Based on detecting event 2008 for CSI reporting, wireless device 2000 transmits PUCCH transmission 2012. Wireless device 2000 may transmit PUCCH transmission 2012 via one or more PUCCH resources indicated by one or more RRC messages 2002. For example, PUCCH transmission 2012 may be transmitted via the PUCCH resource indicated by one or more RRC messages 2002.

PUCCH transmission 2012 requests uplink resources for transmitting a CSI report. The uplink resources may be PUSCH resources. As one example, PUCCH transmission 2012 may be SR. In another example, PUCCH transmission 2012 may comprise a SR. A PUCCH format of PUCCH transmission 2012 may be PUCCH format 0 or PUCCH format 1. In yet another example, PUCCH transmission 2012 may be a UCI.

After transmitting PUCCH transmission 2012, wireless device 2000 receives DCI 2014 from base station 2010. DCI 2014 indicates uplink resources 2016 for transmitting CSI reporting based on wireless device 2000 detecting event 2008. For example, DCI 2014 may comprise an uplink grant indicating uplink resources 2016. Uplink resources 2016 may be PUSCH resources.

After receiving DCI 2014, wireless device 2000 transmits a CSI report 2018 via uplink resources 2016. For example, CSI report 2018 may be a UCI (e.g., CSI report 2018 may be a type of UCI). Wireless device 2000 may transmit the UCI on uplink resources 2016. The UCI (e.g., CSI report 2018) may be multiplexed on uplink resources 2016 (indicated by DCI 2014).

CSI report 2018 may comprise one or more radio link qualities and/or IDs of reference signals. For example, CSI report 2018 may comprise a radio link quality of (candidate) reference signal 2006. In another example, CSI report 2018 may comprise an ID of reference signal 2006. In another example, CSI report 2018 may comprise a radio link quality of (current) reference signal 2004 of the (indicated or current) TCI state. In yet another example, CSI report 2018 may comprise a plurality of radio link qualities of a plurality of candidate reference signals.

The number of radio link qualities and/or reference signals indicated in CSI report 2018 may be one, greater than one, or less than or equal to a maximum number of radio link qualities for CSI reporting (e.g., one or more RRC messages 2002 may comprise a parameter indicating the maximum number of radio link qualities for CSI reporting triggered by wireless device 2000).

The one or more radio link qualities indicated by CSI report 2018 may be absolute values, or differential values, of one or more radio link qualities of reference signals. The radio link qualities may be RSRP values, L1-RSRP values, and/or SINR values.

In an example, wireless device 2000 may monitor, detect, and/or report one or more events among a plurality of events for reporting CSI. A first event may be that a radio link quality of a candidate reference signal is a threshold value better than a radio link quality of a current reference signal of a TCI state. A second event may be that a radio link quality of a candidate reference signal is worse than a threshold. A third event may be that a radio link quality of a candidate reference signal is better than a threshold. A fourth event may be that a radio link quality of a reference signal, of a TCI state indicated by a control command, is worse than a first threshold and a radio link quality of at least one candidate reference signal is better than a second threshold. A fifth event may be that a difference between a radio link quality of a reference signal, of a TCI state indicated by a control command (e.g., DCI or MAC CE), and a radio link quality of at least one candidate reference signal is lower than a threshold. A sixth event may be that a radio link quality of the reference signal, of the TCI state indicated by the control command, is not among a number of candidate reference signals with a highest radio link qualities. A seventh event may be that a radio link quality of at least one candidate reference signal is a threshold value better than a reference signal of a TCI state, indicated by a control command, with a worst radio link quality among reference signals of TCI states indicated by the control command. An eighth event may be that a radio link quality of at least one candidate reference signal is a threshold value better than a reference signal of a TCI state, indicated by a control command, with a highest radio link quality among reference signals of TCI states indicated by the control command. A ninth event may be that a radio link quality of a number of candidate reference signals become a threshold value better than the reference signal of the TCI state indicated by the control command. A tenth event may be that a radio link quality of at least one candidate reference signal becomes a threshold value better than a reference signal configured by one or more RRC messages. An eleventh event may be that a radio link quality of a reference signal, of a TCI state indicated by a control command, is worse than a first threshold. The one or more events may comprise any one or any combination of the first, second, third, fourth, fifth, sixth, seventh, eighth, ninth, tenth, and eleventh events. Furthermore, wireless device 2000 may monitor, detect, and/or report events other than those listed above.

CSI report 2018 may comprise an ID of the event. The ID of the event may be referred to as an event ID. Each of the events among a plurality of events may be associated with an event ID. For example, a first value of the event ID may indicate that the first event is detected (or satisfied). A second value of the event ID may indicate that the second event is detected. A third value of the event ID may indicate that the third event is detected. A fourth value of the event ID may indicate that the fourth event is detected. A fifth value of the event ID may indicate that the fifth event is detected. A sixth value of the event ID may indicate that the sixth event is detected. A seventh value of the event ID may indicate that the seventh event is detected. An eighth value of the event ID may indicate that the eighth event is detected. A ninth value of the event ID may indicate that the ninth event is detected. A tenth value of the event ID may indicate that the tenth event is detected.

Additionally or alternatively, PUCCH transmission 2012 may comprise, or indicate, an event ID. As an example of (implicitly) indicating an event ID, a set of PUCCH resources for PUCCH transmission 2012 may be associated with an event ID among the plurality of event IDs. Based on receiving PUCCH transmission 2012 via the set of PUCCH resources, base station 2010 may determine (e.g., infer) that the PUCCH transmission 2012 is for the associated event ID.

One or more RRC messages 2002 may comprise a list of the plurality of events and/or event IDs of the plurality of events. Each of the event IDs in CSI report 2018 (and/or PUCCH transmission 2012) may be associated with a respective reference signal (e.g., of a candidate reference signal or a reference signal of a TCI state) in CSI report 2018 (and/or PUCCH transmission 2012).

FIG. 20B illustrates a second mode of CSI reporting in which wireless device 2020 uses preconfigured uplink resources for reporting CSI, to base station 2030, based on wireless device 2020 detecting an event based on a radio link quality of a reference signal. The procedure, messages, and parameters in second mode illustrated in FIG. 20B may be the same as those discussed above in the first mode illustrated in FIG. 20A and the specific differences between the procedure, messages, and parameters in the second mode for CSI reporting based on preconfigured uplink resources will be discussed below.

As illustrated, wireless device 2020 receives one or more RRC messages 2022. One or more RRC messages 2022 may comprise, or indicate, the one or more CSI reporting configuration parameters (and other parameters) of one or more RRC messages 2002 (from FIG. 20A).

In contrast to the one or more CSI reporting configuration parameters of one or more RRC messages 1902, the one or more CSI reporting configuration parameters of one or more RRC messages 2022 indicate uplink resources 2024 for (transmitting) CSI reporting triggered by wireless device 2020. Uplink resources 2024 may be PUSCH resources or PUCCH resources for transmitting CSI reporting triggered by the wireless device 2020. Uplink resources 2024 may be PUSCH resources of a configured uplink grant (e.g., Type 1 configured uplink grant).

Base station 2030 may transmit the one or more CSI reporting configuration parameters of one or more RRC messages 2022 to wireless device 2020 based on receiving a UE-capability message from wireless device 2020 indicating that wireless device 2020 supports the second mode.

The presence of an indication of uplink resources 2024 may indicate to wireless device 2020 that the one or more CSI reporting configuration parameters, of one or more RRC messages 2022, are for the second mode of CSI reporting. In another example, the one or more CSI reporting configuration parameters of one or more RRC messages 2022 may comprise a parameter indicating that one or more CSI reporting configuration parameters are for reporting (e.g., UE-initiated) CSI on preconfigured uplink resources (e.g., the second mode). The parameter may indicate that the (e.g., UE-initiated) CSI reporting on preconfigured uplink resources is enabled or activated. Additionally or alternatively, the parameter (or another parameter) may (explicitly) indicate a mode that is being configured among the first mode and the second mode.

One or more RRC messages 2022 may indicate a periodicity of uplink resources 2024 (e.g., a configured (uplink) grant). The periodicity of uplink resources 2024 is illustrated in FIG. 20B. Before transmitting CSI reporting, wireless device 2020 transmits a notification to base station 2030. For example, FIG. 20B illustrates that wireless device 2020 receives a reference signal 2026. Similar to reference signal 2004 of FIG. 20A, reference signal 2026 is a (current) reference signal of a TCI state. Wireless device 2020 receives a reference signal 2028. Similar to reference signal 2006 of FIG. 20A, reference signal 2028 is a candidate reference signal.

After receiving reference signal 2026 and reference signal 2028, wireless device 2020 detects an event 2032 for CSI reporting (e.g., that triggers CSI reporting). Event 2032 may be the same as event 2008 of FIG. 20A. For example, for event 2032, wireless device 2020 may detect that a radio link quality (e.g., L1-RSRP, L1-SINR) of reference signal 2028 is a threshold value better than (e.g., greater than by at least a threshold value) than a radio link quality (e.g., L1-RSRP) of reference signal 2026 of the TCI state. For example, for event 2032, wireless device 2020 may detect that a radio link quality (e.g., L1-RSRP, L1-SINR) of reference signal 2026 of the TCI state is lower/worse than a threshold value.

Based on detecting event 2032 for (UE-initiated) CSI reporting, wireless device 2020 transmits PUCCH transmission 2034 to base station 2030. Wireless device 2000 may transmit PUCCH transmission 2012 via one or more PUCCH resources indicated by one or more RRC messages 2022. As discussed above, one or more RRC messages 2022 indicate uplink resources 2024 for transmitting CSI reporting triggered by wireless device 2020. In the second mode, PUCCH transmission 2034 notifies that CSI reporting is to be transmitted on uplink resources 2024.

Similar to PUCCH transmission 2012, PUCCH transmission 2034 may be SR. In another example, PUCCH transmission 2034 may comprise a SR. A PUCCH format of PUCCH transmission 2034 may be PUCCH format 0 or PUCCH format 1. In yet another example, PUCCH transmission 2034 may be a UCI.

After transmitting PUCCH transmission 2034, wireless device 2020 transmits a CSI report 2036 via uplink resources 2024. CSI report 2036 may be a UCI. For example, wireless device 2020 may transmit the UCI on the uplink resources 2024. The UCI (e.g., CSI report 2036) may be multiplexed on uplink resources 2024 (on PUSCH). CSI report 2036 may indicate, or comprise, the same information as CSI report 2018 of FIG. 20A.

The (advance) notification, provided by PUCCH transmission 2034, may enable the network (e.g., base station 2030) to indicate (e.g., allocate) uplink resources 2024 to multiple wireless devices and reassign uplink resources 2024 prior to the (notified) CSI reporting is transmitted. In order to reassign uplink resources 2024 or otherwise prevent a collision (interference) from occurring on uplink resources 2024 when uplink resources 2024 are configured to multiple wireless devices, base station 2030 may transmit a reconfiguration (e.g., via RRC message with modified values for the parameters of one or more RRC messages 2022). In another example, the network uses a combination of the first mode and the second mode as discussed below in FIG. 20C.

FIG. 20C illustrates a scenario in which wireless device 2040 and base station 2050 use a combination of the first mode of FIG. 20A (using dynamic uplink grants) and the second mode of FIG. 20B (using preconfigured uplink resources) for reporting CSI triggered by wireless device 2040.

As illustrated, wireless device 2040 receives one or more RRC messages 2038. One or more RRC messages 2038 indicate uplink resources 2042 for transmitting CSI reporting triggered by wireless device 2040 (similar to one or more RRC messages 2022 and uplink resources 2024). After receiving one or more RRC messages 2038, wireless device 2040 receives a reference signal 2044, which may be a (current) reference signal of an (indicated) TCI state (similar to reference signal 2004 and reference signal 2026). Wireless device 2040 receives a reference signal 2046, which may be a candidate reference signal (similar to reference signal 2006 and reference signal 2028).

Based on (measurements of radio link qualities of) reference signal 2044 and reference signal 2046, wireless device 2040 detects an event 2048 for CSI reporting (e.g., that triggers UE-initiated CSI reporting). Event 2048 may be the same as event 2008 and/or event 2032 of FIGS. 20A and 20B, respectively.

Based on detecting event 2048, wireless device 2040 transmits a PUCCH transmission 2052 to base station 2050. Like PUCCH transmission 2034, PUCCH transmission notifies base station 2050 that CSI reporting is to be transmitted on uplink resources 2042.

In the example in FIG. 20C, base station 2050 may determine, after receiving PUCCH transmission 2052, that another wireless device is to transmit on uplink resources 2042. Additionally or alternatively, base station 2050 may determine that another wireless device is to perform a transmission on other radio resources (uplink or downlink) that may interfere (or collide) with the CSI reporting that wireless device 2040 intends to transmit using uplink resources 2042.

After receiving PUCCH transmission 2052, base station 2050 transmits a DCI 2054. DCI 2054 may indicate (alternative) uplink resources in order to avoid inference. For example, as illustrated, DCI 2054 indicates uplink resources 2056. Uplink resources 2056 may be the same as uplink resources 2016. For example, DCI 2054 may comprise an uplink grant indicating uplink resources 2056. Uplink resources 2056 may be PUSCH resources.

Based on receiving DCI 2054, wireless device 2040 transmits a CSI report 2058 via uplink resource 2056. Wireless device 2040 may transmit CSI report 2058 on uplink resources 2056 instead of transmitting CSI report 2058 on the preconfigured uplink resources (i.e., uplink resources 2042). For example, based on receiving DCI 2054, wireless device 2040 may cancel (or skip) transmitting CSI report 2058 on the preconfigured resources.

As described above, in UE-initiated beam reporting (UEIBR) (which may be referred to herein, interchangeably, as event-driven CSI/beam reporting, UE-initiated CSI reporting, event-triggered CSI reporting, or UE-triggered CSI/beam reporting), a wireless device may be configured with a list/set of candidate (or new) reference signals for use by the wireless device to detect an event that triggers a beam report (which may be referred to herein, interchangeably, as a channel state information (CSI) report) by the wireless device. The wireless device may receive the list/set of candidate reference signals via one or more configuration messages (e.g., RRC). In an example, when a radio link quality of at least one candidate reference signal of the list/set of candidate reference signals becomes better than a radio link quality of a current reference signal by a threshold value (e.g., a layer 1 received signal received power (L1-RSRP) (or a layer 1 signal-to-interference-plus-noise ratio (L1-SINR) of at least one candidate reference signal>threshold+L1-RSRP (or an L1-SINR) of the current reference signal), the wireless device triggers UEIBR. In an example, when a radio link quality of a current reference signal becomes lower/worse than a threshold value (e.g., L1-RSRP (or an L1-SINR) of the current reference signal<threshold value), the wireless device triggers UEIBR. The current reference signal may correspond to a current beam used by the wireless device. The current beam may be a beam corresponding to a TCI state indicated to the wireless device (the indicated TCI state). In an example, the TCI state may indicate the current reference signal. The one or more configuration parameters may indicate, for the TCI state (or for configuration of the TCI state), a reference signal index/identifier indicating/identifying the current reference signal (e.g., CSI-RS, TRS (tracking reference signal). The current reference signal may be implicitly derived from a quasi-co-location reference signal (QCL RS) of the indicated TCI state. The one or more configuration parameters may indicate, for the TCI state (or for configuration of the TCI state), a reference signal index/identifier indicating/identifying a reference signal (e.g., CSI-RS, TRS) that is quasi co-located with the current reference signal (e.g., SS/PBCH block). The wireless device may be configured with a value of the threshold via RRC, for example. The wireless device may implement a first mode/option (as illustrated in FIG. 20A), a second mode/option (as illustrated in FIG. 20B), or a combination of the first mode/option and the second mode/option for UEIBR. The first mode/option, which may be referred to as mode A, may include the wireless device requesting an uplink resource to transmit a UE-initiated beam report and transmitting the UE-initiated beam report via a dynamically indicated uplink resource. The second mode/option, which may be referred to as mode B, may include the wireless device using a pre-configured uplink resource to transmit a UE-initiated beam report. As would be understood by a person of skill in the art, a UE-initiated beam report may be referred, interchangeably, as a UE-initiated CSI report, an event-driven CSI/beam report, or a UE-triggered CSI/beam report, for example).

Figure 21:
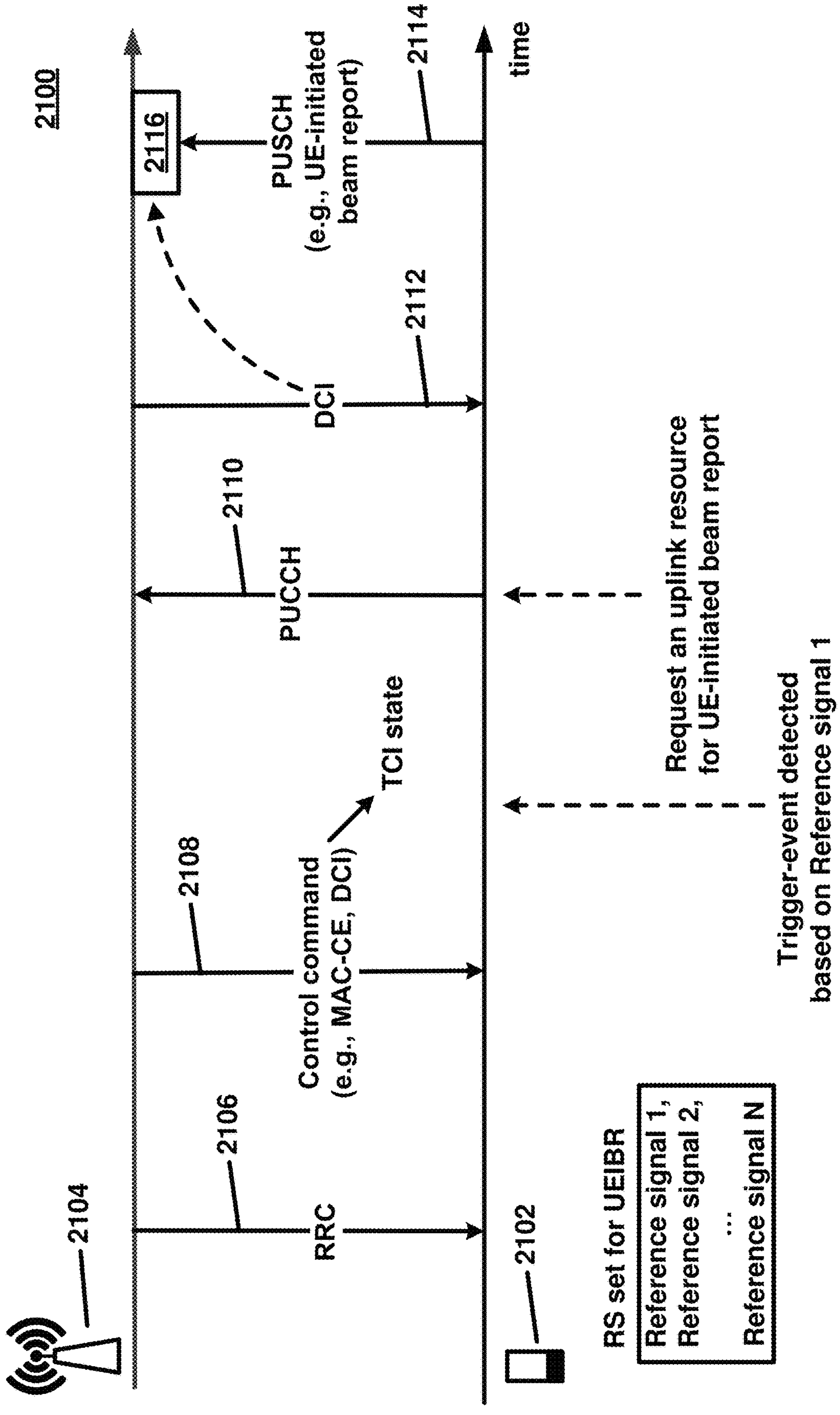
FIG. 21 shows an example that illustrates a procedure according to the first mode/option for user equipment (UE)-initiated beam reporting (UEIBR).

FIG. 21 shows an example 2100 that illustrates a procedure according to the first mode/option (mode-A) for UEIBR. As shown in FIG. 21, example 2100 may begin with a wireless device 2102 receiving, in step 2106, one or more configuration parameters (e.g., RRC) from a base station 2104. The one or more configuration parameters may comprise/indicate a candidate reference signal (RS) set (or a list/set of candidate reference signals) for UEIBR. The candidate RS set may comprise/indicate one or more candidate reference signals, e.g., 1, 2, . . . , N. In an implementation, the one or more candidate reference signals are explicitly configured in one RS resource set associated with a CSI reporting configuration. Additionally, the one or more configuration parameters may comprise/indicate one or more parameters (e.g., a threshold value, a maximum count value, etc.) for use by wireless device 2102 to detect a trigger-event (an event that triggers a CSI report according to UEIBR). The candidate RS set may be a CSI-RS resource set, an SSB resource set, or a CSI-SSB resource set (comprising both CSI-RS and SSB resources).

Figure 24:
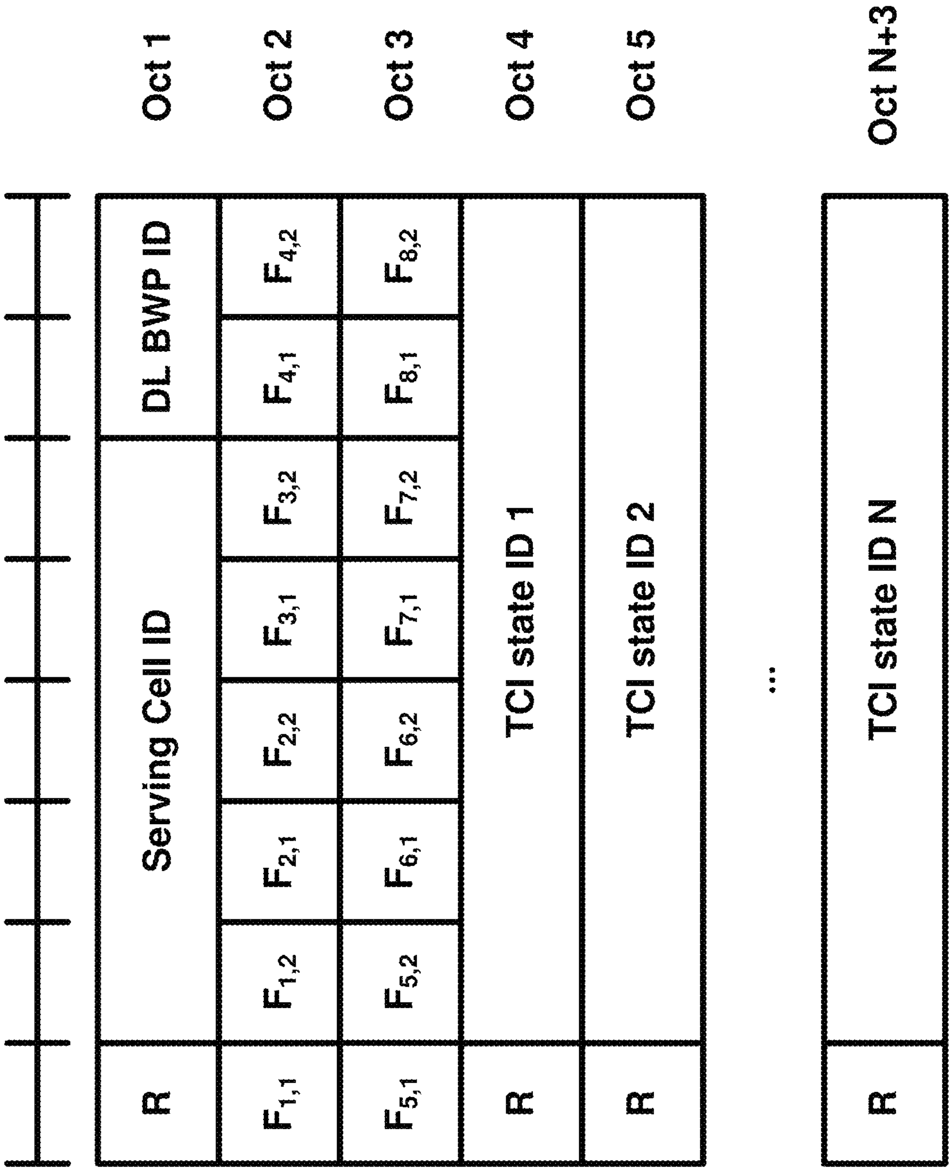
FIG. 24 illustrates an example medium access control (MAC) control element (CE).

The one or more configuration parameters may further comprise/indicate a list/set of TCI states. After receiving the one or more configuration parameters in step 2106, wireless device 2102 may receive an activation command that activates one or more TCI states of the list/set of TCI states. The activation command may be a MAC CE. For example, the MAC CE may be an "Enhanced Unified TCI States Activation/Deactivation MAC CE for Joint TCI States" as illustrated in FIG. 24. For example, the MAC CE may be an "Enhanced Unified TCI States Activation/Deactivation MAC CE for Separate TCI States". As shown in FIG. 24, the MAC CE may include a "Serving Cell ID" field, a "DL BWP ID" field, a plurality of "Fi,j" fields (i=1 up to 8, j=1, 2), and one or more "TCI state ID" fields. The "Serving Cell ID" field indicates the identity of the Serving Cell for which the MAC CE applies. The "DL BWP ID" field indicates a DL BWP for which the MAC CE applies as the codepoint of the DCI bandwidth part indication field. An "Fi,j" field (of the plurality of "Fi,j" fields) indicates for the TCI state ID field associated with the codepoint i of the DCI Transmission Configuration Indication field whether the j-th TCI state is present or not, where j=1, 2. If the "Fi,j" field is set to 1, it indicates that the j-th joint/downlink TCI state for codepoint i is present. If the "Fi,j" field is set to 0, it indicates that the j-th joint/downlink TCI state for codepoint i is absent. The codepoint to which a TCI state is mapped is determined by its ordinal position among all the TCI state ID fields. A "TCI state ID" field (of the one more TCI state ID fields) indicates a 7-bits long TCI state ID.

For example, FIG. 25 illustrates an example MAC CE 2500 that activates a plurality of TCI states of a list/set of TCI states. As shown in FIG. 25, in MAC CE 2500, the fields "F1,1" and "F1,2" are both set to 1 indicating presence of a first TCI state (j=1) (e.g., the TCI state with TCI state ID 8) and a second TCI state (j=2) (e.g., the TCI state with TCI state ID 4) associated with the codepoint i=1 of the DCI Transmission Configuration Indication field (TCI codepoint 001). Similarly, the fields "F4, 1" and "F4,2" are both set to 1 indicating presence of a first TCI state (j=1) (e.g., the TCI state with TCI state ID 7) and a second TCI state (j=2) (e.g., the TCI state with TCI state ID 6) associated with the codepoint i=4 of the DCI Transmission Configuration Indication field (TCI codepoint 100). For the fields "F2,1" and "F2,2", the field "F2,1" is set to 1 and the field "F2,2" is set to 0 indicating presence of a first TCI state (j=1) (e.g., the TCI state with TCI state ID 9) and absence of a second TCI state (j=2) associated with the codepoint i=2 of the DCI Transmission Configuration Indication field (TCI codepoint 010). Conversely, for the fields "F3,1" and "F3,2", the field "F3,1" is set to 0 and the field "F3,2" is set to 1 indicating absence of a first TCI state (j=1) and presence of a second TCI state (j=2) (e.g., the TCI state with TCI state ID 2) associated with the codepoint i=3 of the DCI Transmission Configuration Indication field (TCI codepoint 011). The fields "F5,1," "F5,2," "F6,1," "F6,0," "F7,1," "F7,2," "F8, 1,", and "F8,2," are all set to 0 indicating absence of TCI states associated with the TCI codepoints i=5, 6, 7, and 8. The TCI states which TCI state IDs are present in MAC CE 2502 are activated by MAC CE 2502. It is noted that if only one or two TCI states are identified in MAC CE 2502, the identified one or two TCI states are considered "indicated" by MAC CE 2502. In an implementation, when a first TCI state and a second TCI state are indicated for/to a cell, a pair of fields "Fk,1" and "Fl,2" (k,l=1 to 8) are both set 1 indicating presence of the first TCI state (j=1) and the second TCI state (j=2) in MAC CE 2502. The first TCI state which presence is indicated by the field "Fk,1" is considered a default TCI state among the first TCI state and the second TCI state. In another embodiment, the second TCI state which presence is indicated by the field "Fl,2" is considered the default TCI state among the first TCI state and the second TCI state.

Returning to FIG. 21, in step 2108, wireless device 2102 may receive from base station 2104 a control command (e.g., MAC CE or DCI). The control command may indicate a TCI state. The TCI state may be a unified TCI state (or a joint/downlink/uplink TCI state) or a joint/downlink TCI state. The indicated TCI state may be for use by wireless device 2102 for both downlink (e.g., PDSCH, PDCCH) and/or uplink transmissions (e.g., PUSCH, PUCCH). Specifically, wireless device 2102 may determine a current beam, based on the indicated TCI state, for receiving downlink transmissions and/or for transmitting uplink transmissions. The indicated TCI state may be one of a list/set of TCI states configured (e.g., in step 2106) to wireless device 2102. The indicated TCI state may be one of the one or more TCI states activated (e.g., by MAC CE 2502) to wireless device 2102. In an implementation, where the control command is a MAC CE (such as MAC CE 2502), the control command may indicate a TCI state of the list/set of configured TCI states. For example, the MAC CE may include one or two TCI states in one TCI codepoint only, with the one or two included TCI states being considered as indicated to wireless device 2102.

In another implementation, where the control command is a DCI, the control command may indicate an activated TCI state, of the set of configured TCI states. The activated TCI state may be a TCI state of the one or more TCI states, among the list/set of configured TCI states, activated by another command (e.g., a MAC CE such as MAC CE 2502) that follows step 2106. The DCI may include a Transmission Configuration Indication (TCI) field indicating a TCI codepoint from among the TCI codepoints having one or two TCI states associated with them in the activation command (e.g., the MAC CE) (i.e., the TCI codepoints having one or two activated TCI states associated with them). For example, referring to the example of FIG. 25, the TCI field of a first DCI may indicate the TCI codepoint 001 associated with a first TCI state corresponding to TCI state ID 8 and a second TCI state corresponding to TCI state ID 4. As the TCI codepoint 001 is associated with both a first and a second TCI state, the first DCI is considered to indicate to wireless device 2102 the TCI state with TCI state ID 8 as a first TCI state and the TCI state with TCI state ID 4 as a second TCI state. A later second DCI may have a TCI field indicating TCI codepoint 010, which is associated with only a first TCI state corresponding to TCI state ID 9. As the TCI codepoint 010 is associated with a first TCI state only, the second DCI is considered to indicate to wireless device 2102 the TCI state with TCI state ID 9 as the first TCI state and the TCI state with TCI state ID 4 as the second TCI state (i.e., the second DCI only updates the first TCI state). A later third DCI may have a TCI field indicating TCI codepoint 011, which is associated with only a second TCI state corresponding to TCI state ID 2. As the TCI codepoint 011 is associated with a second TCI state only, the third DCI is considered to indicate to wireless device 2102 the TCI state with TCI state ID 9 as the first TCI state and the TCI state with TCI state ID 2 as the second TCI state (i.e., the third DCI only updates the second TCI state). A later fourth DCI may have a TCI field indicating TCI codepoint 100, which is associated with a first TCI state corresponding to TCI state ID 7 and a second TCI state associated with a second TCI state corresponding to TCI state ID 6. As the TCI codepoint 100 is associated with both a first and a second TCI state, the fourth DCI is considered to indicate to wireless device 2102 the TCI state with TCI state ID 7 as a first TCI state and the TCI state with TCI state ID 6 as a second TCI state.

Returning to FIG. 21, after step 2108, wireless device 2102 may monitor a radio link quality (e.g., L1-RSRP) of each candidate reference signal of the candidate RS set. Wireless device 2102 may compare the monitored radio link quality of each candidate reference signal to a radio link quality of a current reference signal. The current reference signal may correspond to the current beam used by wireless device 2102.

Wireless device 2102 may be configured to detect a trigger-event (an event that triggers a CSI report according to UEIBR) when the radio link quality of at least one candidate reference signal of the candidate RS set becomes better than the radio link quality of the current reference signal by a threshold value (e.g., L1-RSRP of at least one candidate reference signal>threshold+L1-RSRP of the current reference signal). Wireless device 2102 may be configured, after detecting a trigger-event, to trigger a UE-initiated (or event driven) beam report. The UE-initiated beam report may comprise a UE-initiated (or event driven) CSI report. In example 2100, wireless device 2102 may detect a trigger-event based on the radio link quality of a first candidate reference signal (e.g., reference signal 1) of the candidate RS set becoming better than the radio link quality of the current reference signal by the threshold value. Based on detecting the trigger-event, wireless device 2102 may trigger a UE-initiated beam report that indicates the first candidate reference signal.

Wireless device 2102 may be configured to detect a trigger-event (an event that triggers a CSI report according to UEIBR) when the radio link quality of the current reference signal becomes/is worse/lower than a threshold value (e.g., L1-RSRP of the current reference signal<threshold). Wireless device 2102 may be configured, after detecting a trigger-event, to trigger a UE-initiated (or event driven) beam report. The UE-initiated beam report may comprise a UE-initiated (or event driven) CSI report. Based on detecting the trigger-event, wireless device 2102 may trigger a UE-initiated beam report.

In accordance with the first mode/option of UEIBR, wireless device 2102 may be configured, after triggering a UE-initiated beam report, to transmit a first uplink transmission to base station 2104 to request a resource for a second uplink transmission to carry/multiplex the UE-initiated beam report. In an implementation, as illustrated in step 2110 of example 2100, the first uplink transmission may comprise a PUCCH transmission. The first uplink transmission may comprise a request that requests the resource for the second uplink transmission. The request may have a format similar to a scheduling request (SR) or may be based on a new uplink control information (UCI) type. The requested resource may be a PUSCH and/or a PUCCH resource.

In response to the first uplink transmission in step 2110, wireless device 2102 may receive, in step 2112, a DCI indicating an uplink resource 2116 for the second uplink transmission. Uplink resource 2116 may comprise a PUSCH and/or a PUCCH resource. After receiving the DCI in step 2112, wireless device 2102 may transmit, in step 2114, the second uplink transmission via uplink resource 2116. The second uplink transmission may comprise/carry (or may be multiplexed with) the UE-initiated beam report indicating the first candidate reference signal. In an implementation, the DCI triggers transmission of the second uplink transmission via a PUSCH resource scheduled/indicated by the DCI. For example, the DCI may be a DCI format 0_1/0_2/0_3 that comprises a CSI request field that indicates a CSI trigger state associated with UE-initiated beam report configuration(s). In response to the DCI, wireless device 2102 transmits the UE-initiated beam report in a second PUSCH resource scheduled/indicated by the DCI.

Figure 22:
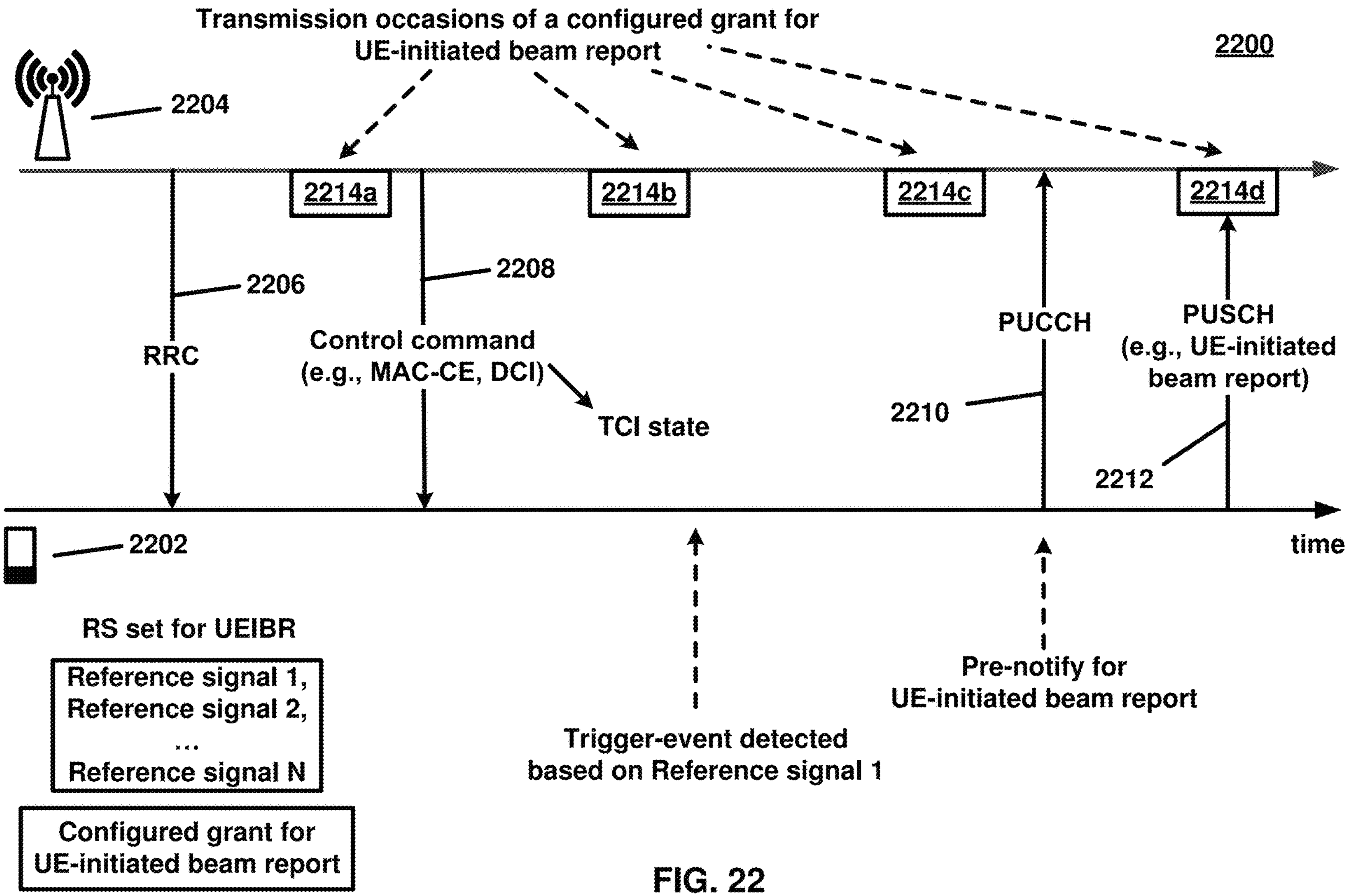
FIG. 22 shows an example that illustrates a procedure according to a second mode/option for UEIBR.

FIG. 22 shows an example 2200 that illustrates a procedure according to a second mode/option (mode-B) for UEIBR. As shown in FIG. 22, example 2200 may begin with a wireless device 2202 receiving, in step 2206, one or more configuration parameters (e.g., RRC) from a base station 2204. The one or more configuration parameters may comprise/indicate a candidate reference signal (RS) set (or a list/set of candidate reference signals) for UEIBR. The candidate RS set may comprise/indicate one or more candidate reference signals, e.g., 1, 2, . . . , N. In an implementation, the one or more candidate reference signals are explicitly configured in one RS resource set associated with a CSI reporting configuration. The candidate RS set may be a CSI-RS resource set, an SSB resource set, or a CSI-SSB resource set (comprising both CSI-RS and SSB resources). Additionally, the one or more configuration parameters may comprise/indicate one or more parameters (e.g., a threshold value, a maximum count value, etc.) for use by wireless device 2202 to detect a trigger-event (an event that triggers a CSI report according to UEIBR). Further, in accordance with the second mode/option for UEIBR, the one or more configuration parameters may comprise/indicate a pre-configured uplink resource (e.g., a PUSCH resource of a configured grant (CG) or a Type-1 CG) for use by wireless device 2202 to transmit UE-initiated beam reports to base station 2204. In example 2200, the one or more configuration parameters may comprise/indicate parameters (e.g., periodicity, timeDomainOffset, timeDomainAllocation, startSymbolandLength, etc.) for wireless device 2202 to determine transmission occasions 2214_a_-2214_d_ of the pre-configured uplink resource to transmit UE-initiated beam reports.

The one or more configuration parameters may further comprise/indicate a list/set of TCI states. After receiving the one or more configuration parameters in step 2206, wireless device 2202 may receive an activation command that activates one or more TCI states of the list/set of TCI states. The activation command may be a MAC CE. For example, the MAC CE may be an "Enhanced Unified TCI States Activation/Deactivation MAC CE for Joint TCI States" as illustrated in FIG. 24. For example, the MAC CE may be an "Enhanced Unified TCI States Activation/Deactivation MAC CE for Separate TCI States".

In step 2208, wireless device 2202 may receive from base station 2204 a control command (e.g., MAC CE or DCI). The control command may indicate a TCI state. The TCI state may be a unified TCI state or a joint downlink/uplink TCI state. The indicated TCI state may be for use by wireless device 2202 for both downlink (e.g., PDSCH, PDCCH) and uplink transmissions (e.g., PUSCH, PUCCH). Specifically, wireless device 2202 may determine a current beam, based on the indicated TCI state, for receiving downlink transmissions and for transmitting uplink transmission. The indicated TCI state may be one of a list/set of TCI states configured (e.g., in step 2206) to wireless device 2202. The indicated TCI state may be one of the one or more TCI states activated (e.g., by MAC CE 2502) to wireless device 2202. In an implementation, where the control command is a MAC CE (such as MAC CE 2502), the control command may indicate a TCI state of the list/set of configured TCI states. For example, the MAC CE may include one or two TCI states in one TCI codepoint only, with the one or two included TCI states being considered as indicated to wireless device 2202. In another implementation, where the control command is a DCI, the control command may indicate an activated TCI state of the one or more (activated) TCI states among the list/set of configured TCI states. The activated TCI state may a TCI state of the one or more TCI states activated by another command (e.g., a MAC CE such as MAC CE 2502) that follows step 2206. As described above with reference to FIG. 21, the DCI may include a TCI field indicating a TCI codepoint from among the TCI codepoints having one or two TCI states associated with them in the activation command (e.g., the MAC CE) (i.e., the TCI codepoints having one or two activated TCI states associated with them).

After step 2208, wireless device 2202 may monitor a radio link quality (e.g., L1-RSRP) of each candidate reference signal of the candidate RS set. Wireless device 2202 may compare the monitored radio link quality of each candidate reference signal to a radio link quality of a current reference signal. The current reference signal may correspond to the current beam used by wireless device 2202.

Wireless device 2202 may be configured to detect a trigger-event (an event that triggers a CSI report according to UEIBR) when the radio link quality of at least one candidate reference signal of the candidate RS set becomes better than the radio link quality of the current reference signal by a threshold value (e.g., L1-RSRP of at least one candidate reference signal>threshold+L1-RSRP of the current reference signal). Wireless device 2202 may be configured, after detecting a trigger-event, to trigger a UE-initiated (or event driven) beam report. The UE-initiated beam report may comprise a UE-initiated (or event driven) CSI report. In example 2200, wireless device 2202 may detect a trigger-event based on the radio link quality of a first candidate reference signal (e.g., reference signal 1) of the candidate RS set becoming better than the radio link quality of the current reference signal by the threshold value. Based on detecting the trigger-event, wireless device 2202 may trigger a UE-initiated beam report that indicates the first candidate reference signal.

Wireless device 2202 may be configured to detect a trigger-event (an event that triggers a CSI report according to UEIBR) when the radio link quality of the current reference signal is/becomes lower/worse than a threshold value (e.g., L1-RSRP of the current reference signal<threshold). Wireless device 2202 may be configured, after detecting a trigger-event, to trigger a UE-initiated (or event driven) beam report. The UE-initiated beam report may comprise a UE-initiated (or event driven) CSI report. Based on detecting the trigger-event, wireless device 2202 may trigger a UE-initiated beam report.

In accordance with the second mode/option of UEIBR, wireless device 2202 may be configured, after triggering a UE-initiated beam report, to transmit a first uplink transmission to base station 2204 to notify of a second uplink transmission that will carry (or be multiplexed with) the UE-initiated beam report. In an implementation, as illustrated in step 2210, the first uplink transmission may comprise a PUCCH transmission via a PUCCH resource. The PUCCH resource may be indicated to wireless device 2202 in the one or more configuration parameters. In an embodiment, the PUCCH resource is associated in a one-to-one mapping/association with the pre-configured uplink resource used for the second uplink transmission. In an embodiment, a one-to-one mapping/association exists between transmission occasions of the PUCCH resource and respective transmission occasions of the pre-configured uplink resource. In an implementation, a (e.g., only one) periodic PUCCH resource (corresponding to a first uplink channel) for use for the first uplink transmission is associated with the CSI report configuration for UE-initiated/event-driven beam reporting. The PUCCH transmission for the first uplink transmission may thus be performed via the periodic PUCCH resource (or via the first uplink channel). The first uplink transmission may comprise a notification that indicates a transmission occasion, of the pre-configured uplink resource, that will be used by wireless device 2202 for the second uplink transmission. The notification may have a format similar to an SR or may be based on a new uplink control information (UCI) type. In example 2200, the notification may indicate transmission occasion 2214*d*, of the pre-configured uplink resources, for the second uplink transmission.

After notifying the second uplink transmission, wireless device 2202 may transmit, in step 2212, the second uplink transmission via transmission occasion 2214*d*. The second uplink transmission may comprise/carry (or may be multiplexed with) the UE-initiated beam report indicating the first candidate reference signal. In an example, transmission occasion 2214*d* may be a starting/earliest/first available transmission occasion, among the transmission occasions of the pre-configured uplink resource, that occurs after the first uplink transmission. In an example, transmission occasion 2214*d* may be a starting/earliest/first available transmission occasion, among the transmission occasions of the pre-configured uplink resource, that occurs after a last/final repetition of the first uplink transmission. In an embodiment, transmission occasion 2214*d* may be a first available transmission occasion of the pre-configured uplink resource X symbols after wireless device 2202 transmits the last symbol of the first uplink transmission (comprising the notification of the second uplink transmission). In an example, transmission occasion 2214*d* may be a starting/earliest/first available transmission occasion, among the transmission occasions of the pre-configured uplink resource, that occurs a time duration/gap/delay/offset after the first uplink transmission. In an example, transmission occasion 2214*d* may be a starting/earliest/first available transmission occasion, among the transmission occasions of the pre-configured uplink resource, that occurs a time duration/gap/delay/offset after a last/final repetition of the first uplink transmission. In an example, the one or more configuration parameters may indicate the time duration/gap/delay/offset. In an example, the wireless device may transmit, to the base station, a UE capability information message indicating the time duration/gap/delay/offset. The time duration/gap/delay/offset may be in units of symbols. In an implementation, a (e.g., only one) pre-configured uplink resource (corresponding to a second uplink channel) for use for the second uplink transmission is associated with the CSI report configuration for UE-initiated/event-driven beam reporting. The second uplink transmission may thus be performed via the pre-configured uplink resource (or via the second uplink channel). In an implementation, a one-to-one mapping exists between the pre-configured uplink resource (of the second uplink channel) and the periodic PUCCH resource (of the first uplink channel). In an implementation, the periodic PUCCH resource (or the first uplink channel) has the same periodicity (in msec) as the pre-configured uplink resource (or the second uplink channel). In implementation, the periodic PUCCH resource (or the first uplink channel) may be on the same cell as or on a different cell than the pre-configured uplink resource (or the second uplink channel). The pre-configured uplink resource may be a Type-1 Configured Grant (CG) PUSCH. In a first option (Option-1), as a Type-1 CG PUSCH, the pre-configured resource may carry uplink data (UL-SCH) and/or other UCI (e.g., HARQ-ACK, periodic/semi-persistent CSI reports) in addition to the UE-initiated beam report. In a second option (Option-2), the pre-configured uplink resource may be a dedicated Type-1 CG PUSCH for carrying the UE-initiated beam report (i.e., the pre-configured uplink resource cannot carry uplink data (UL-SCH) or other UCI). In a third option (Option-3), as a Type-1 CG PUSCH, the pre-configured uplink resource may carry other UCI, but not uplink data (UL-SCH), in addition to the UE-initiated beam report.

As described above, in both the first mode/option and the second mode/option for UEIBR, the wireless device may be configured to detect a trigger-event, and to trigger a UE-initiated beam report, for example, when the radio link quality of at least one candidate reference signal of the candidate RS set becomes better than the radio link quality of the current reference signal by a threshold value (e.g., L1-RSRP of at least one candidate reference signal>threshold+L1-RSRP of the current reference signal) or when the radio link quality of the current reference signal is/becomes lower/worse than a threshold value. However, as measurements obtained from layer-1 (e.g., L1-RSRP) can be highly volatile (e.g., due to fast fading caused by multipath interference and other factors), without filtering, the above-described trigger condition may result in the network reacting directly to short-term variations, leading to an undesirable ping-pong effect, e.g., with frequent TCI state updates, TCI state activations, or beam updates. To reduce this ping-pong effect, it is proposed that UEIBR utilizes a similar triggering mechanism as used in existing beam failure recovery (BFR) procedures. More specifically, it is proposed that a trigger-event be detected, and a UE-initiated beam reporting be triggered, when a number of consecutive layer-1 measurements exceeds a network-configured maximum value. This allows to smooth out rapid fluctuations, which reduces unnecessary/frequency beam reporting and ensures that the beam report provide a more stable view of beam quality.

Figure 23:
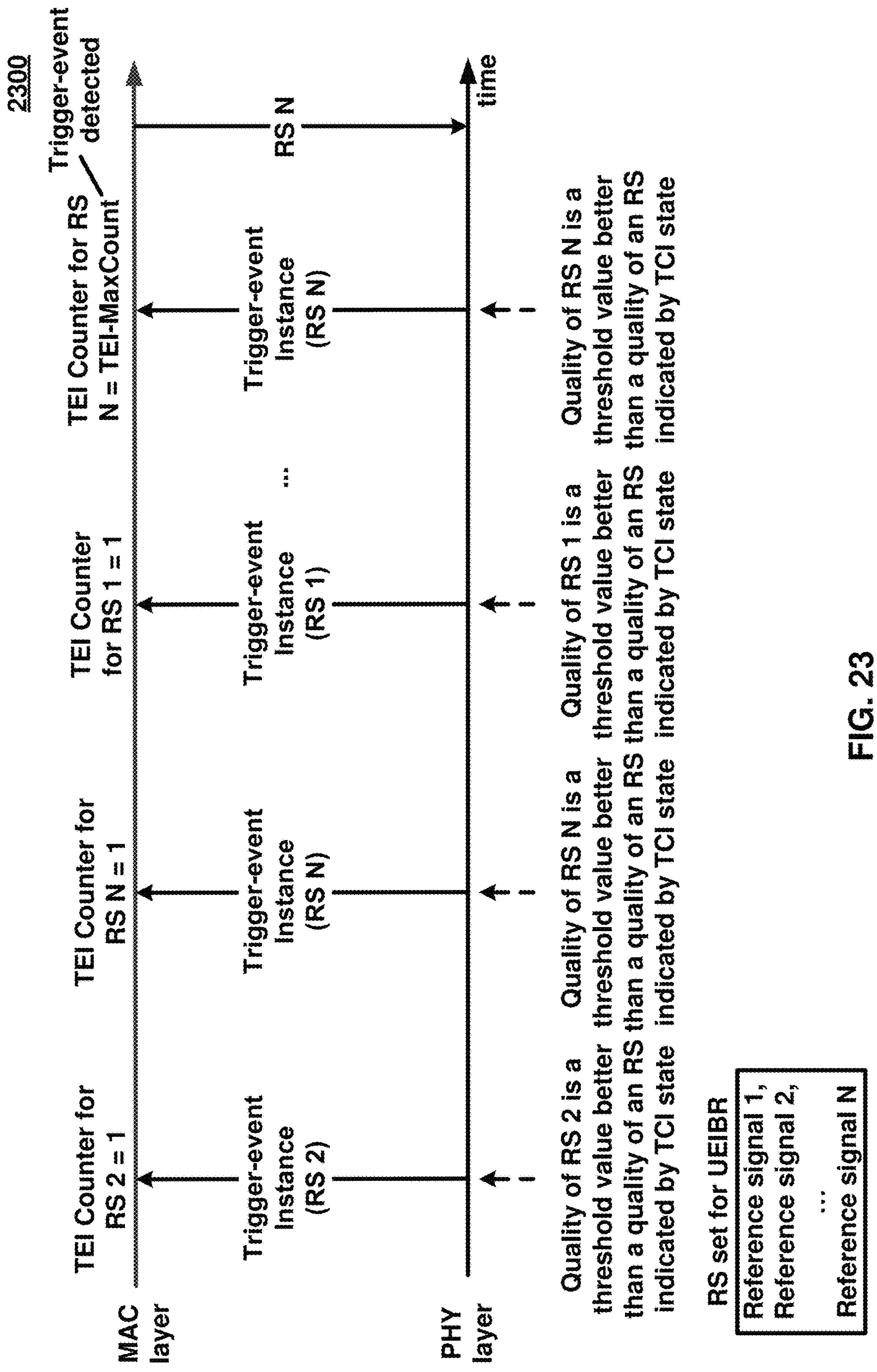
FIG. 23 illustrates an example procedure which may be used by a wireless device to trigger a UE-initiated beam report.

FIG. 23 illustrates an example procedure 2300 which may be used by a wireless device to trigger a UE-initiated beam report according to an embodiment. The wireless device may be an embodiment of wireless device 1702, 2102, or 2202, for example.

In an embodiment, before using procedure 2300, the wireless device may receive, from a base station, one or more configuration parameters (e.g., RRC) for use by the wireless device for UEIBR. The one or more configuration parameters may comprise/indicate one or more of:

A list/set of (candidate) reference signals (or reference signal indexes).

One or more time window values/lengths (e.g., trigger-event detection time window values/lengths, eventDetectionTimeWindowLength). In an embodiment, the one or more configuration parameters may comprise/indicate a respective time window value/length for each reference signal in the list/set of reference signals. In another embodiment, the one or more configuration parameters may comprise/indicate a single time window value/length for all reference signals in the list/set of reference signals.

One or more maximum/minimum TEI counter values (e.g., trigger-event instance maximum counter values, eventInstanceCount, eventInstanceMaxCount). In an embodiment, the one or more configuration parameters may comprise/indicate a respective maximum/minimum TEI counter value for each reference signal in the list/set of reference signals. In another embodiment, the one or more configuration parameters may comprise/indicate a single maximum/minimum TEI counter value for all reference signals in the list/set of reference signals.

One or more threshold values (e.g., eventThreshold). In an embodiment, the one or more configuration parameters may comprise/indicate a respective threshold value for each reference signal in the list/set of reference signals. In another embodiment, the one or more configuration parameters may comprise/indicate a single threshold value for all reference signals in the list/set of reference signals. In another embodiment, the one or more configuration parameters may comprise/indicate a single threshold value for the current reference signal.

In an embodiment, the above-described one or more configuration parameters may be configured using a CSI report configuration (e.g., CSI-ReportConfig, UEIBR-ReportConfig) in an RRC message. The CSI report configuration may comprise one or more of:

One or more event-detection/triggeringInstanceMaxCount parameters (e.g., eventInstanceCount, eventInstanceMaxCount) for indicating the one or more maximum TEI counter values. In an embodiment, the CSI report configuration may indicate an event-detection/triggeringInstanceMaxCount parameter per serving cell, per reference signal (RS) per serving cell, or per candidate RS set (or per CSI-RS set, or per RS set or per candidate RS set for trigger-event detection).

One or more event-detection/triggeringTimeWindow parameters (e.g., eventDetectionTimeWindowLength) for indicating the one or more time window values/lengths. In an embodiment, the CSI report configuration may indicate an event-detection/triggeringTimeWindow (or an eventDetectionTimeWindowLength) parameter per serving cell, per reference signal (RS) per serving cell, per candidate RS set (e.g., CSI-RS set, RS set, candidate RS set for trigger-event detection), or per RS of an candidate RS set.

One or more rsrp-Threshold-UEIBR parameters (e.g., eventThreshold) for indicating the one or more threshold values. In an embodiment, the CSI report configuration may indicate an rsrp-Threshold-UEIBR parameter per serving cell, per reference signal (RS) per serving cell, or per candidate RS set.

One or more sinr-Threshold-UEIBR parameters for indicating the one or more SINR threshold values. In an embodiment, the CSI report configuration may indicate an sinr-Threshold-UEIBR parameter per serving cell, per reference signal (RS) per serving cell, or per candidate RS set.

A candidateBeamRS-List parameter (or csi-RS-ResourceSetList or nzp-CSI-RS-ResourceSetList or csi-SSB-ResourceSetList or eventDetectionResourcesToAddModList or eventDetectionSet1, resourcesForChannelMeasurement, resourcesForChannel, nzp-CSI-RS-ResourceSet, csi-SSB-ResourceSet, newBeamResourceSet, candidateBeamResourceSet) for indicating the list/set of (candidate) reference signals. The list/set of (candidate) reference signals indicated by the candidateBeamRS-List parameter may be for a serving cell or for a first candidateRS set of a serving cell.

A candidateBeamRS-List2 (or csi-RS-ResourceSetList2 or nzp-CSI-RS-ResourceSetList2 or csi-SSB-ResourceSetList2 or eventDetectionSet2, or resourcesForChannelMeasurement, resourcesForChannel2, nzp-CSI-RS-ResourceSet, csi-SSB-ResourceSet2, newBeamResourceSet2, candidateBeamResourceSet2 and the like) for indicating a list/set of (candidate) reference signals for a second candidate RS set of a serving cell.

a CSI resource parameter (e.g., resourcesForChannelMeasurement, resourcesForChannel, nzp-CSI-RS-ResourcesForInterference, csi-IM-ResourcesForInterference, or CSI-ResourceConfigId) for indicating the list/set of (candidate) reference signals. This parameter may be used alternatively with the candidateBeamRS-List parameter to indicate the list/set of reference signals.

a report configuration type parameter set that indicates a time domain reporting configuration. In the case of UEIBR, the report configuration type parameter may be set to a first value (e.g., 'event triggered' or 'UE-initiated').

a CSI resource configuration identifier/index (e.g., CSI-ResourceConfigId) identifying a CSI resource configuration (e.g., CSI-ResourceConfig) indicating a list of channel state information reference signal (CSI-RS) resource sets (e.g., csi-RS-ResourceSetList). The CSI resource configuration (e.g., CSI-ResourceConfig) may comprise the candidateBeamRS-List parameter (or csi-RS-ResourceSetList or nzp-CSI-RS-ResourceSetList) indicating the list/set of (candidate) reference signals. The list of CSI-RS resource sets may correspond to (or indicate) or may be a part of the list/set of (candidate) reference signals. In an embodiment, when the report configuration type parameter is set to 'event-triggered' or 'UE-initiated', the list of CSI-RS resource sets may comprise a single CSI-RS resource set. In an embodiment, when the report configuration type parameter is set to 'event-triggered' or 'UE-initiated' and groupBasedBeamReporting is not configured in the CSI report configuration (e.g., CSI-ReportConfig), the list of CSI-RS resource sets may comprise a single CSI-RS resource set. In an embodiment, when the report configuration type parameter is set to 'event-triggered' or 'UE-initiated' and groupBasedBeamReporting is configured in the CSI report configuration (e.g., CSI-ReportConfig), the list of CSI-RS resource sets may comprise two CSI-RS resource sets (e.g., two NZP CSI-RS resource sets). A first CSI-RS resource set of the two CSI-RS resource sets may comprise/indicate the list/set of (candidate) reference signals for the first ED-RS set. A second CSI-RS resource set of the two CSI-RS resource sets may comprise/indicate the list/set of (candidate) reference signals for the second ED-RS set.

In an embodiment, the wireless device may be provided, for each BWP of a serving cell, a set $\bar{q}_0$ of CSI-RS resource configuration indexes and/or SS/PBCH block indexes by the parameter candidateBeamRS-List (or the CSI resource parameter) for radio link quality measurements for UEIBR on the BWP of the serving cell. The set $\bar{q}_0$ may correspond to the list/set of (candidate) reference signals.

In another embodiment, for each BWP of a serving cell, the wireless device may be provided at least two candidate RS sets of CSI-RS resource configuration indexes and/or SS/PBCH block indexes by the parameters candidateBeamRS-List and candidateBeamRS-List2, respectively. A first candidate RS set of the at least two candidate RS sets may be associated with a first indicated TCI state and a second candidate RS set of the at least two candidate RS sets may be associated with a second indicated TCI state. In an embodiment, the first/second TCI state may be indicated by MAC CE or DCI. The first TCI state may be associated with a first TRP and the second TCI state may be associated with a second TRP. The wireless device may use the first candidate RS set for UEIBR for the first TRP, and may use the second candidate RS set for UEIBR for the second TRP.

After receiving the one or more configuration parameters, the wireless device may implement example procedure 2300. Specifically, a lower (e.g., PHY) layer of the wireless device may assess/determine a first radio link quality of a first reference signal of the list/set of reference signal to determine if the first radio link quality of the first reference signal satisfies a condition. In an embodiment, the condition may comprise the first radio link quality of the first reference signal being better than a second radio link quality of a second reference signal. In another embodiment, the condition may comprise the first radio link quality of the first reference signal being better, by a threshold value, than the second radio link quality of a second reference signal. The second reference signal may correspond to a current beam used by the wireless device. The current beam may be a beam corresponding to a last TCI state indicated to the wireless device. The TCI state may be indicated as described above with reference to FIG. 17 (e.g., using MAC CE in step 1708 or using DCI in step 1710). The current reference signal may be implicitly derived from a QCL RS (or QCL RS with QCL-Type D) of the indicated TCI state. In an embodiment, the second reference signal may be a CSI-RS. In an embodiment, the first radio link quality of the first reference signal being better than the second radio link quality of the second reference signal may comprise an L1-RSRP measurement of the first reference signal being greater than an L1-RSRP measurement of the second reference signal by a threshold value. In another embodiment, the first radio link quality of the first reference signal being better than the second radio link quality of the second reference signal may comprise a signal-to-interference-plus-noise ratio (SINR) of the first reference signal being greater than an SINR of the second reference signal by a threshold value.

In an embodiment, the lower layer may assess the radio link quality of each reference signal of the list/set of reference signal to determine if the radio link quality of the reference signal satisfies the condition. The lower layer may transmit to an upper (e.g., MAC, RRC) layer of the wireless device a TEI indication, indicating a reference signal (or an index thereof) of the list/set of reference signals, when the radio link quality of that reference signal satisfies the condition. For example, as shown in FIG. 23, the lower layer may transmit to the upper layer: a first TEI indication, for reference signal RS 2, after determining that a radio link quality of the RS 2 satisfies the condition (e.g., is better than the radio link quality of the current reference signal by the threshold value); a second TEI indication, for reference signal RS N, after determining that a radio link quality of reference signal RS N meets the condition; a third TEI indication, for reference signal RS 1, after determining that a radio link quality of reference signal RS 1 meets the condition; and a k-th TEI indication, for reference signal RS N, after determining that a radio link quality of reference signal RS N meets the condition.

In an embodiment, as described above, the wireless device may be provided, for each BWP of a serving cell, the first candidate RS set of CSI-RS resource configuration indexes and/or SS/PBCH block indexes or at least two candidate RS sets of CSI-RS resource configuration indexes and/or SS/PBCH block indexes by the parameters candidateBeamRS-List and candidateBeamRS-List2, respectively. As such, the physical layer of the wireless device may assess the radio link quality according to the candidate RS set(s) of resource configurations against a threshold and radio link quality(ies) of SS/PBCH block(s) or CSI-RS resource configuration(s) configured with qcl-Type set to 'typeD' in the indicated TCI state or in the two indicated TCI states. For a first candidate RS set, the UE assesses the radio link quality according to the first candidate RS set of resource configurations against a threshold and radio link quality of an SS/PBCH block or a CSI-RS resource configuration configured with qcl-Type set to 'typeD' in the indicated TCI state (e.g., TCI-State). For the at least two candidate RS sets comprising a first candidate RS set and a second candidate RS set, the UE assesses the radio link quality according to the first candidate RS set and the second candidate RS set of resource configurations against respective thresholds (or the threshold) and radio link qualities of SS/PBCH blocks or CSI-RS resource configurations configured with qcl-Type set to 'typeD' in a first indicated TCI state (e.g., TCI-State) and a second indicated TCI state (e.g., TCI-State), respectively.

In an embodiment, for each reference signal in the list/set of reference signals, on receiving the very first TEI indication for the reference signal from the lower layer, the upper layer (e.g., MAC) starts a time window (e.g., eventDetectionTimeWindowLength), for the reference signal, and increments to 1 a TEI counter used for counting TEI indications for the reference signal. In an embodiment, the upper layer starts the time window based on a time window value/length (e.g., the time window may be configured to count down from the time window value/length to zero or to count up from zero to the time window value/length). As described above, the time window value/length may be configured to the wireless device using RRC. The time window value/length may be associated with the reference signal or may be common for one or more or all reference signals of the list/set of reference signals. At every subsequent TEI indication for the reference signal received from the lower layer, the upper layer increments the TEI counter associated with the reference signal. If the time window associated with the reference signal expires, the upper layer resets the TEI counter associated with the reference signal to zero. If the TEI counter associated with the reference signal reaches the trigger-event instance maximum counter value associated with the reference signal within the time window, the upper layer detects a trigger-event for the reference signal and triggers a UE-initiated beam report for the reference signal. In an embodiment, after triggering a UE-initiated beam report for the reference signal, the upper layer may send to the lower layer an indication of the reference signal (or an index thereof) for transmission in a UE-initiated beam report to the base station. For example, as shown in FIG. 23, the upper layer may detect a trigger-event when a TEI counter for reference signal RS N reaches a trigger-instance maximum counter value. The upper layer may send to the lower layer an indication of reference signal RS N. In an example, when the upper layer detects a trigger-event for the reference signal, a TEI counter for a second reference signal in the list/set of reference signals may not reach a trigger-event instance maximum counter value associated with the second reference signal.

After receiving the one or more configuration parameters, the wireless device may implement example procedure 2300. Specifically, a lower (e.g., PHY) layer of the wireless device may assess/determine a first radio link quality (e.g., L1-RSRP, L1-SINR) of a first reference signal satisfies a condition. In an embodiment, the condition may comprise the first radio link quality of the first reference signal being worse/lower than a threshold value. The first reference signal may correspond to a current beam used by the wireless device. The current beam may be a beam corresponding to a last TCI state indicated to the wireless device. The TCI state may be indicated as described above with reference to FIG. 17 (e.g., using MAC CE in step 1708 or using DCI in step 1710). The current reference signal may be implicitly derived from a QCL RS (or QCL RS with QCL-Type D) of the indicated TCI state. In an embodiment, the first reference signal may be a CSI-RS.

In an embodiment, the lower layer may assess a first radio link quality of the first reference signal to determine if the first radio link quality of the first reference signal satisfies the condition. The lower layer may transmit to an upper (e.g., MAC, RRC) layer of the wireless device a TEI indication when the first radio link quality of that first reference signal satisfies the condition. For example, the lower layer may transmit to the upper layer: a first TEI indication after determining that a second radio link quality of the first reference signal satisfies the condition (e.g., is worse/lower than the threshold value); a second TEI indication after determining that the second radio link quality of the first reference signal meets the condition; a third TEI indication after determining that a third radio link quality of the first reference signal meets the condition; and a k-th TEI indication after determining that a fourth radio link quality of the first reference signal meets the condition.

In an embodiment, on receiving the very first TEI indication for the first reference signal from the lower layer, the upper layer (e.g., MAC) starts a time window (e.g., eventDetectionTimeWindowLength), and increments to 1 a TEI counter used for counting TEI indications. In an embodiment, the upper layer starts the time window based on a time window value/length (e.g., the time window may be configured to count down from the time window value/length to zero or to count up from zero to the time window value/length). As described above, the time window value/length may be configured to the wireless device using RRC. At every subsequent TEI indication for the first reference signal received from the lower layer, the upper layer increments the TEI counter. If the time window expires, the upper layer resets the TEI counter associated with the first reference signal to zero. If the TEI counter reaches the trigger-event instance maximum counter value within the time window, the upper layer detects a trigger-event and triggers a UE-initiated beam report. In an embodiment, after triggering a UE-initiated beam report, the upper layer may send to the lower layer an indication for transmission in a UE-initiated beam report to the base station. For example, the upper layer may detect a trigger-event when a TEI counter for the first reference signal reaches a trigger-instance maximum counter value.

In an embodiment, the upper layer (e.g., MAC) of the wireless device may implement a counter variable EDI_COUNTER (e.g., TEI counter or event instance counter) for counting TEI indications from the lower layer. EDI_COUNTER may be implemented per serving cell, per reference signal (RS) per serving cell, per candidateRS set of a serving Cell, or per RS of a candidate RS setof a serving cell.

In an embodiment, for each serving cell configured for UEIBR, if a TEI indication for an RS in a candidate RS set is received from the lower layer, the upper layer may:

start or restart a time window (e.g., eventDetection/triggeringTimer, eventDetectionTimeWindowLength) of the RS in the candidate RS set;

increment an EDI_COUNTER of the RS in the candidate RS set by 1; and if the EDI_COUNTER of the RS in the candidate RS set>=event-detection/triggeringInstanceMaxCount within the time window:

trigger a UE-initiated CSI reporting (or an event-based CSI reporting or PUCCH transmission, e.g., in 2110 and 2210) for the RS in the candidate RS set of the serving cell; or indicate, to the physical layer, the RS in the candidate RS set of the serving cell for an UE-initiated CSI reporting, or instruct the physical layer to transmit/signal a UE-initiated CSI report indicating/for the RS (or a PUCCH transmission, e.g., in 2110 and 2210 on one valid PUCCH resource).

On receiving the indication from the upper layer, the lower layer may trigger/initiate a CSI/beam report (e.g., UE-initiated CSI report, UE-initiated beam report, UE-initiated CSI reporting procedure, event-based/trigged CSI report, event-based/trigged CSI reporting procedure, and the like) for the reference signal and transmit a first uplink transmission for the reference signal.

In an embodiment, based on the first mode/option of UEIBR, the first uplink transmission requests an uplink resource (e.g., PUSCH/PUCCH resource) for a second uplink transmission to carry the CSI/beam report for the reference signal. In an implementation, the first uplink transmission may comprise a PUCCH transmission. The first uplink transmission may comprise a request that requests the resource for the second uplink transmission. The request may have a format similar to an SR or may be based on a new UCI type. The requested resource may be a PUSCH and/or a PUCCH resource. In response to the first uplink transmission, the wireless device may receive a DCI indicating an uplink resource for the second uplink transmission. The uplink resource for the second uplink transmission may comprise a PUSCH and/or a PUCCH resource. After receiving the DCI, the wireless device may transmit the second uplink transmission via the uplink resource for the second uplink transmission. The second uplink transmission may comprise/carry (or be multiplexed with) the UE-initiated beam report for the reference signal.

In another embodiment, based on the second mode/option of UEIBR, the first uplink transmission notifies of a second uplink transmission that will carry/comprise the CSI/beam report for the reference signal. In an implementation, the first uplink transmission may comprise a PUCCH transmission. The first uplink transmission may comprise a notification that indicates an uplink resource, of pre-configured uplink resources, that will be used by the wireless device for the second uplink transmission. The notification may have a format similar to an SR or may be based on a new UCI type. After notifying the second uplink transmission, the wireless device may transmit the second uplink transmission via the uplink resource indicated in the first uplink transmission.

Figure 26:
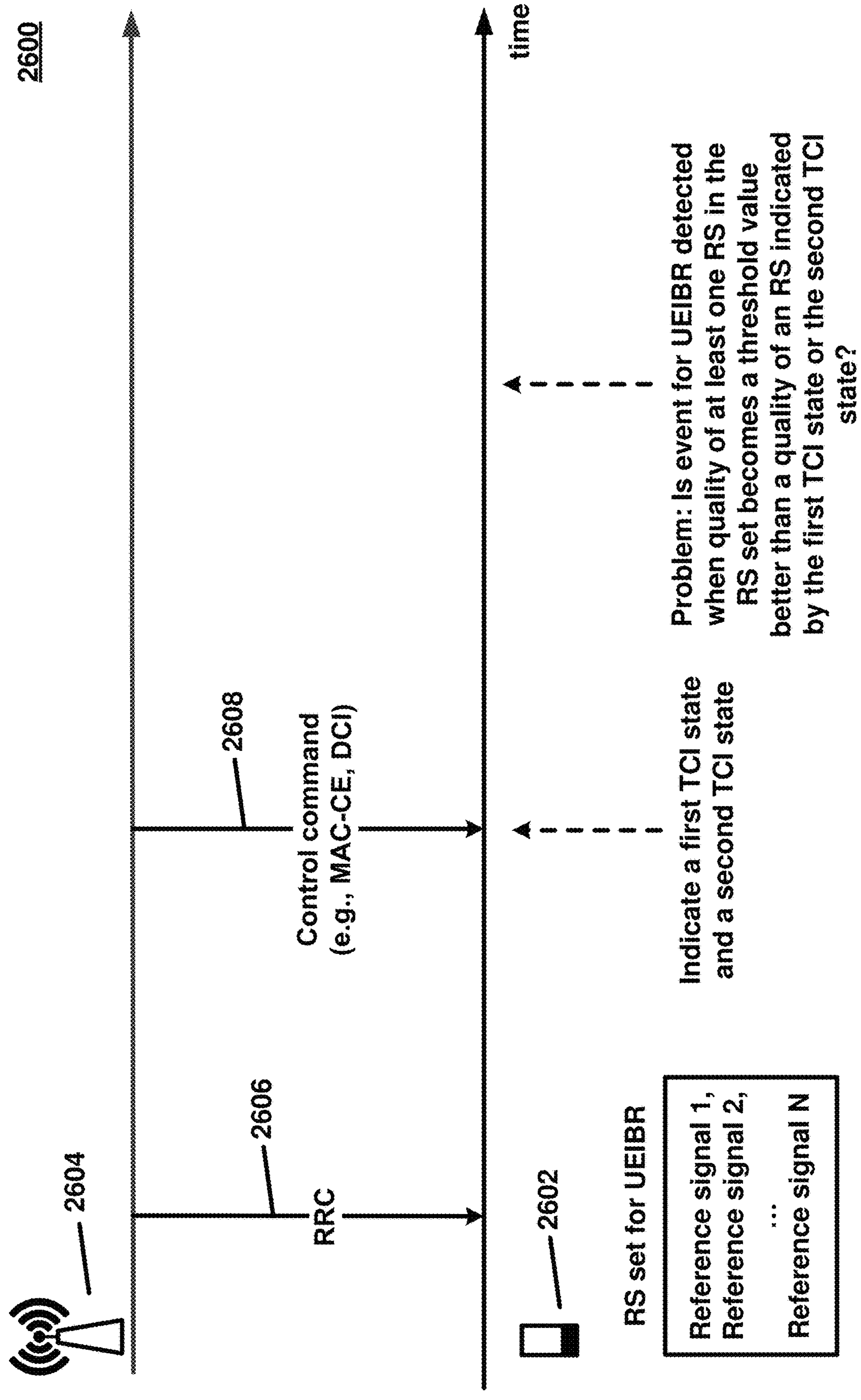
FIG. 26 illustrates an example procedure which may be used by a wireless device to trigger a UE-initiated beam report.

As mentioned above, it is envisioned that UEIBR may be extended to multiple TRPs. With new UE capability, a wireless device may be expected to transmit UE-initiated/triggered beam/CSI reports for at least a first TRP and a second TRP (per TRP or for multiple TRPs simultaneously). While existing technologies support the wireless device being indicated with two (joint/downlink) TCI states (e.g., a first joint/downlink TCI state for the first TRP and a second joint/downlink TCI state for the second TRP), a problem may arise when existing UEIBR is extended to multiple TRPs. This problem is illustrated in example 2600 of FIG. 26. As shown, example 2600 may begin with a wireless device 2602 receiving, in step 2606, one or more configuration parameters (e.g., RRC) from a base station 2604. The one or more configuration parameters may comprise/indicate a candidate reference signal (RS) set (or a list/set of candidate reference signals) for UEIBR. The candidate RS set may comprise/indicate one or more candidate reference signals, e.g., 1, 2, . . . , N. The candidate RS set may be a CSI-RS resource set, an SSB resource set, or a CSI-SSB resource set (comprising both CSI-RS and SSB resources). Additionally, the one or more configuration parameters may comprise/indicate one or more parameters (e.g., a threshold value (e.g., eventThreshold), a maximum count value (e.g., eventInstanceCount), a time window (e.g., eventDetectionTimeWindowLength), etc.) for use by wireless device 2602 to detect a trigger-event (an event that triggers a CSI report according to UEIBR). The one or more configuration parameters may further comprise/indicate a list/set of TCI states.

After receiving the one or more configuration parameters in step 2606, in step 2608, wireless device 2602 may receive, from base station 2604, a control command (e.g., MAC CE or DCI) that indicates a first TCI state and a second TCI state. The first TCI state may be for a first TRP and the second TCI state may be for a second TRP. The first TCI state and the second TCI state may be joint/downlink TCI states. The indicated first and second TCI states may be of the list/set of TCI states configured (e.g., in step 2606) to wireless device 2602. In an implementation, where the control command is a DCI, the indicated first and second TCI states may be two of a plurality of TCI states activated (e.g., by a prior MAC CE similar to MAC CE 2502) to wireless device 2602. In another implementation, where the control command is a MAC CE (such as MAC CE 2502), the control command may indicate the first TCI state and the second TCI state of the list/set of configured TCI states. For example, the MAC CE may include/indicate two TCI states comprising the first TCI state and the second TCI state in (or associated with) one TCI codepoint only.

After receiving the control command indicating the first TCI state and the second TCI state, wireless device 2602 may apply the first TCI state and/or the second TCI state to the list/set of candidate reference signals for UEIBR by wireless device 2602. Specifically, wireless device 2602 may trigger a UE-initiated beam/CSI report when the radio link quality of at least one candidate reference signal of the list/set of candidate reference signals becomes better, by a threshold value, than the radio link quality of: the current reference signal indicated by the first TCI state or the current reference signal indicated by the second TCI state. Alternatively, wireless device 2602 may trigger a UE-initiated beam/CSI report when the radio link quality of the current reference signal indicated by the first TCI state or of the current reference signal indicated by the second TCI state is/becomes lower/worse than a threshold value. However, according to existing UEIBR, when wireless device 2602 is indicated two TCI states, wireless device 2602 may on its own determine to apply the first TCI state or the second TCI state for UEIBR. Wireless device 2602 may make this determination without an indication from base station 2604, and base station 2604 may not be aware of the determination made by wireless device 2602. As a consequence, when base station 2604 receives a UE-initiated beam/CSI report from wireless device 2602, base station 2604 may not determine the TCI state applied by wireless device 2602 for the UE-initiated beam/CSI report. Base station 2604 may thus not determine whether to update the current reference signal indicated by the first TCI state or the current reference signal indicated by the second TCI state. Base station 2604 may apply a default rule, e.g., which includes updating the current reference signal indicated by the first TCI state. However, this update may be faulty if wireless device 2602 applied the second TCI state for the UE-initiated beam/CSI report and may degrade the quality of communication via the first TCI state and/or the second TCI state.

Embodiments of the present disclosure, as further described below, address this problem of existing technologies. In an aspect, a wireless device receives one or more RRC messages comprising one or more configuration parameters of a cell, where the one or more configuration parameters comprise a first parameter indicating a TCI state (or which TCI state), among a first TCI state and a second TCI state, to apply to a first set of reference signals for beam/CSI reporting triggered/initiated by the wireless device. After receiving the one or more RRC messages, the wireless device receives a control command indicating the first TCI state and the second TCI state. The control command may be a MAC CE or DCI. In an embodiment, the wireless device triggers/initiates a beam/CSI report based on a first radio link quality of at least one reference signal in the first set of reference signals being/becoming better/higher, by a threshold value, than a second radio link quality of a reference signal indicated by the TCI state indicated by the first parameter. In another embodiment, the wireless device triggers/initiates a beam/CSI report based on the second radio link quality of the reference signal indicated by the TCI state being lower/worse than a threshold value. As such, the one or more configuration parameters indicate an association between the configured first set of reference signals for beam/CSI reporting triggered/initiated by the wireless device and one of two TCI states (the first TCI state and the second TCI state) indicated to the wireless device. The wireless device may thus apply only the appropriate TCI state, of the two indicated TCI states, to the configured first set of reference signals and may trigger beam/CSI reports for the appropriate TCI state only.

Figure 27:
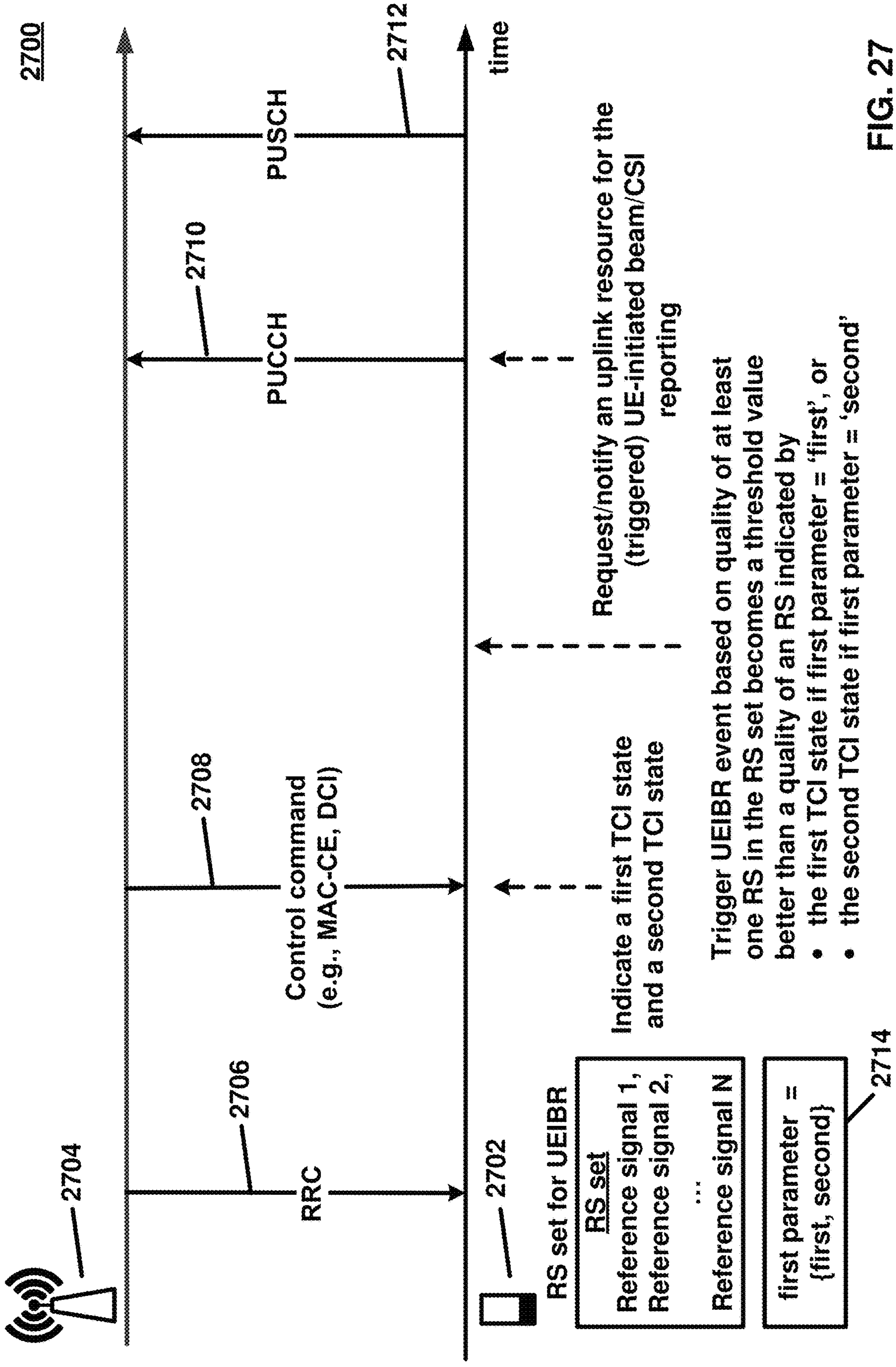
FIG. 27 illustrates an example procedure which may be used by a wireless device to trigger a UE-initiated beam report according to an embodiment.

FIG. 27 illustrates an example procedure 2700 which may be used by a wireless device to trigger a UE-initiated beam report according to an embodiment. Example procedure 2700 may be used to implement the first mode/option (mode-A) or the second mode/option (mode-B) for UEIBR. As shown in FIG. 27, example procedure 2700 may begin with a wireless device 2702 receiving, in step 2706, one or more configuration parameters (e.g., RRC) from a base station 2704. The one or more configuration parameters may comprise/indicate a first list/set of candidate reference signals (or candidate RS set) for UEIBR. The first list/set of candidate reference signals may comprise/indicate one or more candidate reference signals, e.g., 1, 2, . . . , N. The candidate RS set may be a CSI-RS resource set, an SSB resource set, or a CSI-SSB resource set (comprising both CSI-RS and SSB resources).

In an embodiment, the one or more configuration parameters comprise one or more first CSI reporting configuration parameters (e.g., CSI-AssociatedReportConfigInfo, CSI-ReportConfig) of a CSI report configuration. The one or more first CSI reporting configuration parameters may comprise a first CSI resource parameter (e.g., resourcesForChannelMeasurement, resourcesForChannel, CSI-ResourceConfig, nzp-CSI-RS-ResourceSet, csi-SSB-ResourceSet, newBeamResourceSet, candidateBeamResourceSet, and the like) indicating the first list/set of reference signals.

In an embodiment, the first list/set of reference signals may comprise one or more CSI reference signals (CSI-RSs). The one or more first CSI reporting configuration parameters may indicate 'repetition' for the first list/set of reference signals comprising the one or more CSI-RSs. In an embodiment, based on the one or more first CSI reporting configuration parameters indicating 'repetition' for the first list/set of reference signals comprising the one or more CSI-RSs, the one or more CSI-RSs are transmitted, by base station 2704, with a same downlink spatial domain transmission filter. In another embodiment, the first list/set of reference signals may comprise one or more SSBs.

In an embodiment, the one or more configuration parameters indicate a list of TCI states. In an implementation, the one or more configuration parameters comprise a downlink-or-joint TCI state list parameter (e.g., dl-OrJointTCI-State-ToAddModList, dl-OrJointTCI-StateList) indicating the list of TCI states.

In an embodiment, the list of TCI states indicates a transmission configuration that includes quasi co-location (QCL) relationships between at least one of: one or more downlink reference signals (RSs) in a reference signal (RS) set and physical downlink shared channel (PDSCH) demodulation reference signal (DMRS) ports, one or more downlink RSs in an RS set and physical downlink control channel (PDCCH) DMRS ports, and one or more downlink RSs in an RS set and CSI-RS ports. In an embodiment, each TCI state in the list of TCI states indicates/provides a respective reference signal for quasi co-location for at least one of: a DMRS of a PDSCH in a bandwidth part (BWP) of the cell; a DMRS of a PDCCH in a BWP of the cell; and a CSI-RS in a BWP of the cell.

In an embodiment, the one or more configuration parameters comprise a unified TCI type parameter (e.g., unifiedTCI-StateType). In an embodiment, based on the unified TCI type parameter (e.g., unifiedTCI-StateType) being set to 'joint', the list of TCI states indicates a transmission configuration that includes QCL relationships between at least one of: one or more downlink RSs in an RS set and a physical uplink shared channel (PUSCH); one or more downlink RSs in an RS set and a physical uplink control channel (PUCCH); and one or more downlink RSs in an RS set and a sounding reference signal (SRS). In an embodiment, each TCI state in the list of TCI states indicates/provides a respective reference signal for determining an uplink transmission spatial filter and/or a transmission power for at least one of: a dynamic-grant based PUSCH in a BWP of the cell; a configured-grant based PUSCH in a BWP of the cell; a PUCCH resource in a BWP of the cell; and an SRS in a BWP of the cell.

In an embodiment, the one or more configuration parameters indicate an association between the first list/set of reference signals and a TCI state, of two TCI states (hereinafter "first and second TCI states") indicated to wireless device 2702. In an embodiment, the association indicates which one of the indicated first and second TCI states wireless device 2702 is to apply to the first list/set of reference signals for UEIBR by wireless device 2702. In an embodiment, the association is provided by a first parameter (e.g., applyIndicatedTCI-State, applyIndicatedTCI-State-UEIBR), of the one or more configuration parameters, indicating the TCI state, among the indicated first and second TCI states, to apply to the first set of reference signals for UEIBR by wireless device 2702. In an embodiment, the applying of the TCI state indicated by the first parameter comprises comparing radio link qualities of the first list/set of reference signals with a reference signal indicated by the TCI state indicated by the first parameter, to detect a trigger event/condition of UEIBR by wireless device 2702. In an embodiment, when a UE (e.g., wireless device 2702) is configured with dl-OrJointTCI-StateList and is having two indicated TCI states, a higher layer configuration (e.g., applyIndicatedTCI-State, applyIndicatedTCI-State-UEIBR) may be provided for/to a candidate RS set (e.g., CSI-RS resource set, SSB resource set, CSI-SSB resource set) configured with/for UE-initiated CSI reporting to inform that the UE applies the first or the second indicated TCI state to the candidate RS set for detection of the trigger event of the UE-initiated CSI reporting.

In an embodiment, the first parameter may be same as a parameter (e.g., applyIndicatedTCI-State) used to indicate which one of two joint/downlink TCI states to apply for reception of an RS resource (or for reception of each RS resource in a candidate RS set). In an embodiment, when a UE (e.g., wireless device 2702) is configured with dl-OrJointTCI-StateList, is having two indicated TCI states, and a higher layer configuration (e.g., applyIndicatedTCI-State) is provided to a candidate RS set (e.g., CSI-RS resource set, SSB resource set, CSI-SSB resource set) or an RS resource in a candidate RS set configured with/for UE-initiated CSI reporting, the UE may apply the first or the second indicated TCI state to the candidate RS set or to the RS resource in the candidate RS set for detection of the trigger event according to the higher layer configuration (e.g., applyIndicatedTCI-State) provided to the RS resource or to the candidate RS set. In another embodiment, the first parameter may, additionally or alternatively, comprise/indicate a parameter (e.g., TCI parameter) that indicates a serving cell on which an indicated TCI state is applied, where the indicated TCI state is used (e.g., by wireless device 2702) to determine a reference signal associated with a current beam (e.g., used by wireless device 2702).

In an embodiment, the one or more configuration parameters comprise one or more first CSI reporting configuration parameters (e.g., CSI-AssociatedReportConfigInfo, CSI-ReportConfig) of a first CSI report configuration. The one or more first CSI reporting configuration parameters may comprise the first parameter.

As described further below in step 2708, the first and second TCI states may be indicated to wireless device 2702 via a control command, which may comprise a MAC CE or a DCI. The first and second TCI states may be indicated to wireless device 2702 after wireless device 2702 receives the one or more configuration parameters in step 2706. The indicated first and second TCI states may further be updated via a DCI (e.g., via a TCI field of the DCI indicating a TCI codepoint) as described above with reference to FIG. 25. In an embodiment, the indicated first and second TCI states may correspond respectively to a first TRP and a second TRP. In an embodiment, the indicated first and second TCI states may comprise joint TCI states or downlink TCI states.

In an embodiment, a first value (e.g., 0, 'first') of the first parameter indicates to wireless device 2702 to apply the first TCI state, among the first TCI state and the second TCI state, to the first list/set of reference signals for UEIBR by wireless device 2702; and a second value (e.g., 1, 'second') of the first parameter indicates to apply the second TCI state, among the first TCI state and the second TCI state, to the first list/set of reference signals for UEIBR by wireless device 2702. In other words, the TCI state indicated by the first parameter is the first TCI state based on the first parameter being set/equal to the first value and the second TCI state based on the first parameter being set/equal to the second value.

In an embodiment, the first parameter further indicates whether to apply the first TCI state or the second TCI state for reception of the first list/set of reference signals.

In an embodiment, the first parameter applies to (or is associated with) the entirety of the first list/set of reference signals. That is, the first parameter indicates, for each reference signal of the first list/set of reference signals, whether to apply the first TCI state or the second TCI state for reception of the reference signal (of the first list/set of reference signals) and/or for use of the reference signal (of the first list/set of reference signals) to detect a trigger event for UEIBR by wireless device 2702. In an embodiment, a first value (e.g., 0, 'first') of the first parameter indicates to apply the first TCI state, among the first and second TCI states, to each reference signal in the first list/set of reference signals for reception of the reference signal and/or for use of the reference signal to detect a trigger event for UEIBR by wireless device 2702; and a second value (e.g., 1, 'second') of the first parameter indicates to apply the second TCI state, among the first and second TCI states, to each reference signal in the first list/set of reference signals for reception of the reference signal and/or for use of the reference signal to detect a trigger event for UEIBR by wireless device 2702.

In another embodiment, the first parameter applies to a first reference signal of the first list/set of reference signals. A first value (e.g., 0, 'first') of the first parameter (e.g., indicates to apply the first TCI state, among the first and second TCI states, to the first reference signal for reception of the first reference signal and/or for use of the first reference signal to detect a trigger event for UEIBR by wireless device 2702; and a second value (e.g., 1, 'second') of the first parameter indicates to apply the second TCI state, among the first and second TCI states, to the first reference signal for reception of the first reference signal and/or for use of the first reference signal to detect a trigger event for UEIBR by wireless device 2702. In an embodiment, the first parameter applies only to the first reference signal. In an embodiment, a respective first parameter applies to each reference signal of the first list/set of reference signals. That is, the one or more configuration parameters may comprise a respective first parameter for each reference signal of the first list/set of reference signals. For each reference signal of the first list/set of reference signals, its respective first parameter indicates whether to apply the first TCI state or the second TCI state for reception of the reference signal (of the first list/set of reference signals) and/or for use of the reference signal (of the first list/set of reference signals) to detect a trigger event for UEIBR by wireless device 2702.

In an embodiment (not shown in FIG. 27), the one or more configurations parameters do not comprise the first parameter described above. Instead, wireless device 2702 may be configured to apply a default TCI state, among the first and second TCI states, to the first list/set of reference signals for UEIBR by wireless device 2702. In an embodiment, the first TCI state corresponds to a TCI state indicated by a field "Fk,1" (k=1, . . . , 8) (e.g., a field such as the field "Fk,1," "F2,1," or "F4,1," of MAC CE 2502) of a MAC CE that activates two or more TCI states of the list/set of TCI states or that indicates the first and second TCI states; and the second TCI state corresponds to a TCI state indicated by a field "Fl,2" (l=1, . . . , 8) (e.g., a field such as the field "F1,2," "F3,2," or "F4,2," of MAC CE 2502) of the MAC CE, or vice versa. In an embodiment, the default TCI state, among the first and second TCI states, corresponds to the TCI state indicated by the field "Fk,1" of the MAC CE. In another embodiment, the default TCI state, among the first and second TCI states, corresponds to the TCI state indicated by the field "Fl,2" of the MAC CE.

In an embodiment (not shown in FIG. 27), the one or more configuration parameters may further comprise a second CSI reporting configuration comprising one or more second CSI reporting configuration parameters. The one or more second CSI reporting configuration parameters may be for beam/CSI reporting that is non-UE initiated (not for UEIBR). For example, the one or more second CSI reporting configuration may be for periodic or semi-persistent or aperiodic beam/CSI reporting by wireless device 2702. In an embodiment, based on the one or more second CSI reporting configuration parameters not being for UEIBR, the one or more second CSI reporting configuration parameters do not comprise a first parameter as described above. In contrast, based on the one or more first CSI reporting configuration parameters being for UEIBR (or based on the first CSI reporting configuration (identified by a report configuration identifier, e.g., reportConfigId, CSI-ReportConfigId in the one or more first CSI reporting configuration parameters) being configured for UEIBR), the one or more first CSI reporting configuration parameters comprise the first parameter.

In another embodiment (not shown in FIG. 27 and e.g., applicable to group-based CSI reporting), the one or more first CSI reporting configuration parameters (e.g., CSI-AssociatedReportConfigInfo, CSI-ReportConfig) may further comprise a second CSI resource parameter (e.g., resourcesForChannelMeasurement, resourcesForChannel2, nzp-CSI-RS-ResourceSet, csi-SSB-ResourceSet2, newBeamResourceSet2, candidateBeamResourceSet2 and the like) indicating a second list/set of reference signals (e.g., a second candidate RS set) for UEIBR by wireless device 2702. The second candidate RS set may be a CSI-RS resource set, an SSB resource set, or a CSI-SSB resource set (comprising both CSI-RS and SSB resources). In an embodiment, the one or more first CSI reporting configuration parameters may further comprise a second parameter (e.g., applyIndicatedTCI-State2, applyIndicatedTCI-State2-UEIBR), similar to the first parameter, indicating a TCI state, among the first TCI state and the second TCI state, to apply to the second list/set of reference signals for UEIBR by wireless device 2702. In an embodiment, the one or more first CSI reporting configuration parameters comprise the second parameter based on the one or more first CSI reporting configuration parameters comprising: the second CSI resource parameter indicating the second list/set of reference signals; and/or the first parameter. In an embodiment, the one or more first CSI reporting configuration parameters do not comprise the second parameter (or the second parameter is absent in the one or more first CSI reporting configuration parameters) based on/if the one or more first CSI reporting configuration parameters do not comprise: the second CSI resource parameter indicating the second list/set of (candidate) reference signals; and/or the first parameter.

In an embodiment, wireless device 2702 is configured a CSI report configuration (e.g., using the CSI-AssociatedReportConfigInfo information element (IE), or the CSI-ReportConfig IE). The CSI report configuration may comprise the first parameter (e.g., the field applyIndicatedTCI-State-UEIBR, the field applyIndicatedTCI-State) and/or the second parameter (e.g., the field applyIndicatedTCI-State2-UEIBR, the field applyIndicatedTCI-State2). The first parameter (or the second parameter) indicates, for a candidate RS set (or a candidate RS resource set) indicated by the CSI report configuration, if wireless device 2702 (or the UE) applies the first or the second "indicated" downlink TCI state or joint TCI state for event detection (or for triggering UE-initiated CSI reporting). The first parameter is for the candidate RS set indicating/comprising the list/set of reference signals (e.g., ResourcesForChannel), and the second parameter is for the second candidate RS set indicating/comprising the second list/set of reference signals (e.g., ResourcesForChannels2). When the first parameter is absent (or is not configured), wireless device 2702 (or the UE) shall use the first "indicated" DL/joint TCI state for event detection (or for triggering UE-initiated CSI reporting. The first parameter is optionally present in the CSI report configuration if the CSI report configuration identified by a report configuration identifier (e.g., reportConfigId) is configured with/for UE-initiated CSI reporting (or Event-Triggered); otherwise the first parameter is absent. The second parameter is mandatory present in the CSI report configuration if the second candidate RS set (e.g., resourcesForChannel2) is configured and the first parameter is configured/present; otherwise the second parameter is absent.

In an embodiment, wireless device 2702 may receive, e.g., from base station 2704, a UE capability enquiry message (e.g., UECapabilityEnquiry). Based on receiving the UE capability enquiry message, wireless device 2702 may transmit/signal/report, to base station 2704, one or more messages (e.g., UE capability messages, UECapabilityInformation).

In an embodiment, the one or more messages may comprise a capability element/parameter (e.g., mTRP-UEIBR, mTRP-EventTriggered, and the like) which indicates whether wireless device 2702 supports multi-TRP UE-initiated CSI reporting based on two different indicated TCI states. Base station 2704 may configure wireless device 2702 with the one or more configuration parameters described above and including a CSI reporting configuration for multi-TRP UEIBR based on the capability element/parameter (e.g., mTRP-UEIBR, mTRP-EventTriggered, and the like). In an embodiment, the CSI reporting configuration for multi-TRP UEIBR indicates to apply the first indicated TCI state or the second indicated TCI state to a candidate RS set. In another embodiment, the CSI reporting configuration for multi-TRP UEIBR indicates to apply the first indicated TCI state to a first candidate RS set and to apply the second indicated TCI state to a second candidate RS set.

The capability element/parameter may comprise the following parameters:

- a first parameter (e.g., maxUEIBR-RS-resourcesPerTRP-PerBWP) which indicates the maximum number of supported measured RS resources for UE-initiated CSI reporting per TRP per BWP;
- a second parameter (e.g., maxCSI) which indicates the maximum number of component carriers (CCs) per band configured with UE-initiated CSI reporting (including for example at least one of SpCell, and SCell);
- a third parameter (e.g., maxUEIBR-RS-resourcesAcross-TRPsPerBWP) which indicates the supported maximum number of measured RS resources across two TRPs per BWP.

In embodiment, the first parameter (e.g., maxUEIBR-RS-resourcesAcrossTRPsPerBWP) is also counted in the capability parameters max TotalResourcesForOneFreqRange and maxTotalResourcesForAcrossFreqRanges.

In an embodiment, the one or more messages may comprise a capability element/parameter (e.g., tci-TRP-UEIBR) which indicates whether wireless device 2702 supports TRP-specific UEIBR with a unified TCI state framework. Under the unified TCI state framework, a single TCI state (or a set of TCI states) may be indicated for multiple physical channels, such as a single TCI state for both PDCCH and PDSCH transmissions. For example, under the unified TCI state framework, a single joint TCI state may be indicated for multiple downlink receptions (e.g., PDCCH, PDSCH, CSI-RS) and uplink transmissions (e.g., PUSCH, PUCCH, SRS). For example, under the unified TCI state framework, a single downlink TCI state may be indicated for multiple downlink receptions (e.g., PDCCH, PDSCH, CSI-RS) and a single uplink TCI state may be indicated for multiple uplink transmissions (e.g., PUSCH, PUCCH, SRS). In an embodiment, when wireless device 2702 supports this feature, wireless device 2702 also indicates support of multi-TRP UEIBR based on two different indicated TCI states (e.g., mTRP-UEIBR, mTRP-EventTriggered, and the like).

In an embodiment, the one or more first CSI reporting configuration parameters comprise an event type parameter (e.g., eventType) indicating an event type for UEIBR by wireless device 2702. The one or more first CSI reporting configuration parameters may be for UEIBR, for example, based on the one or more first CSI reporting configuration parameters comprising the event type parameter. The one or more second CSI reporting configuration parameters may not be for UEIBR, for example, based on the one or more second CSI reporting configuration parameters not comprising the event type parameter.

In an embodiment, the one or more first CSI reporting configuration parameters comprise a threshold parameter (e.g., eventThreshold) indicating (or set to) a threshold value.

When the event type parameter indicates (or is set to a first value indicating) a first event (e.g., Event 1), the threshold value is compared with/against a radio link quality of the reference signal indicated by the TCI state indicated by the first parameter, to detect a trigger event/condition of UEIBR by wireless device 2702. In an embodiment, a trigger-event instance is determined/generated and a trigger-event is detected when the radio link quality of the reference signal indicated by the TCI state indicated by the first parameter is/becomes worse/lower than the threshold value. In an embodiment, the one or more first CSI reporting configuration parameters comprise: a time window parameter (e.g., eventDetectionTimeWindowLength) indicating (or set to) a time window (or a value of the time window); and/or a count parameter (e.g., eventInstanceCount, eventInstanceMaxCount) indicating a maximum count. In an embodiment, a trigger-event is detected when/based on a total number of trigger-event instances determined/generated with the time window is equal to or greater than the maximum count.

When the event type parameter indicates (or is set to a second value indicating) a second event (e.g., Event 2), the threshold value is used in the comparing of radio link qualities of the first list/set of reference signals with the reference signal indicated by the TCI state indicated by the first parameter, to detect a trigger event/condition of UEIBR by wireless device 2702. In an embodiment, a trigger-event instance is determined/generated and a trigger-event is detected when the radio link quality of at least one reference signal of the first list/set of reference signals is/becomes better/higher, by the threshold value, than the radio link quality of the reference signal indicated by the TCI state indicated by the first parameter. In an embodiment, the one or more first CSI reporting configuration parameters comprise: a time window parameter (e.g., eventDetectionTimeWindowLength) indicating (or set to) a time window (or a value of the time window); and/or a count parameter (e.g., eventInstanceCount, eventInstanceMaxCount) indicating an event instance count (e.g., maximum/minimum count). In an embodiment, a trigger-event is detected when/based on a total number of trigger-event instances determined/generated for the at least one reference signal within the time window being equal to or greater than the event instance count. In other words, the event instance count indicates a minimum number of event instances for which (or that should occur before) wireless device 2702 triggers a UE-initiated CSI report for a reference signal of the set of reference signals.

Returning to FIG. 27, after receiving the one or more configuration parameters in step 2706, wireless device 2702 may receive an activation command (not shown in FIG. 27) that activates a subset of TCI states of the list/set of TCI states. The activation command may be used by wireless device 2702 to map the subset of TCI states to one or more TCI codepoints. The activation command may be a MAC CE such as MAC CE 2502 described above. The TCI states which TCI state IDs are present in the MAC CE are activated by the MAC CE. It is noted that if only one or two TCI state IDs are present in the MAC CE, the one or two TCI states, corresponding to the present one or two TCI states IDs, are considered "indicated" by the MAC CE. That is, the MAC CE both activates and indicates the one or two TCI states.

In step 2708, wireless device 2702 may receive from base station 2704 a control command (e.g., MAC CE or DCI). The control command indicates the first and second TCI states. The first and second TCI states may be joint/downlink TCI states. In an embodiment, the indicated first and second TCI states belong to the list/set of TCI states configured (e.g., in step 2706) to wireless device 2702.

In an embodiment, the indicated first and second TCI states may be two of the subset of TCI states activated by the activation command to wireless device 2102. In an embodiment, the control command may be a DCI that indicates the first and second TCI states. In an embodiment, the DCI may comprise a TCI field. A value of the TCI field may indicate a TCI codepoint, among the one or more TCI codepoints (obtained from the activation command), indicating (or mapped to) the first and second TCI states. In an embodiment, the DCI may be a DCI format 1_1/1_2/1_3.

In another embodiment, the indicated first and second TCI states are indicated by the activation command as described above. For example, the activation command may be a MAC CE with only two TCI states IDs present therein. For example, referring to FIG. 25, the MAC CE may have only fields "F1,1" and "F1,2" set to 1 and the remaining "Fi,j" fields set to zero. That is, the MAC CE maps the first and second TCI states to (only) one TCI codepoint.

Returning to FIG. 27, after step 2708, wireless device 2702 may monitor a radio link quality (e.g., L1-RSRP) of each reference signal of the first list/set of reference signals. Wireless device 2102 may compare the monitored radio link quality of each reference signal of the first list/set of reference signals to a radio link quality of a reference signal indicated by the TCI state, among the indicated first and second TCI states, indicated by the first parameter. As described above, the first parameter may indicate either the first TCI state or the second TCI state of the indicated first and second TCI states. As such, wireless device 2702 may apply the appropriate TCI state, of the indicated first and second TCI states, to the configured first set of reference signals and may trigger beam/CSI reports for the appropriate TCI state only. In another embodiment, after step 2708, wireless device 2702 may be configured to monitor the radio link quality of the reference signal indicated by the TCI state, among the indicated first and second TCI states, indicated by the first parameter. Specifically, wireless device 2702 may be configured to compared the radio link quality of the reference signal indicated by the TCI state indicated by the first parameter to a threshold value. In an embodiment, the reference signal indicated by the TCI state indicated by the first parameter comprises an SSB indicated by the TCI state. The SSB indicated by the TCI state may be quasi co-located with a QCL reference signal (e.g., CSI-RS, TRS) in the TCI state. In an embodiment, the reference signal indicated by the TCI state indicated by the first parameter comprises the SSB indicated by the TCI state based on the first list/set of reference signals being/comprising SSBs. In another embodiment, the reference signal indicated by the TCI state indicated by the first parameter comprises a CSI-RS (or TRS) indicated by the TCI state. The CSI-RS (or TRS) indicated by the TCI state may be a QCL reference signal in the TCI state. In an embodiment, the reference signal indicated by the TCI state indicated by the first parameter comprises the CSI-RS indicated by the TCI state based on the first list/set of reference signals being/comprising CSI-RSs.

In an embodiment, wireless device 2702 may be configured to detect a trigger-event when a first radio link quality of at least one reference signal of the first list/set of reference signals becomes better, by a threshold value, than a second radio link quality of the reference signal indicated by the TCI state indicated by the first parameter (e.g., L1-RSRP of at least one candidate reference signal>threshold+L1-RSRP of the reference signal indicated by the TCI state indicated by the first parameter). Wireless device 2702 may be configured, after detecting a trigger-event, to trigger/initiate a UE-initiated (or event driven) beam report. The UE-initiated beam report may comprise a UE-initiated (or event driven) CSI report. In an embodiment, the triggering/initiating of the UE-initiated (or event driven) beam report is based on a total number of (detected) trigger-event instances for the at least one reference signal being equal to or greater than a maximum count within a time window. In example procedure 2700, wireless device 2102 may detect a trigger-event based on the radio link quality of a first reference signal (e.g., reference signal 1) of the first list/set of reference signals becoming better than the second radio link quality of the reference signal indicated by the TCI state indicated by the first parameter by the threshold value. Based on detecting the trigger-event (or based on a total number of detected trigger-event instances for the first reference signal being equal to or greater than the maximum count within the time window), wireless device 2702 may trigger a UE-initiated beam/CSI report that indicates the first reference signal. In another embodiment (not shown in FIG. 27), wireless device 2702 may be configured to detect a trigger-event when the second radio quality of the reference signal indicated by the TCI state indicated by the first parameter becomes or is lower/worse than a threshold value. Wireless device 2702 may be configured, after detecting a trigger-event, to trigger/initiate a UE-initiated (or event driven) beam report. The UE-initiated beam report may comprise a UE-initiated (or event driven) CSI report. In an embodiment, the triggering/initiating of the UE-initiated (or event driven) beam report is based on a total number of (detected) trigger-event instances being equal to or greater than a maximum count within a time window.

In accordance with the first mode/option of UEIBR, wireless device 2702 may be configured, after triggering a UE-initiated beam/CSI report, to transmit a first uplink transmission to base station 2704 to request a resource for a second uplink transmission to carry/multiplex the UE-initiated beam/CSI report. In an implementation, as illustrated in step 2710 of example 2100, the first uplink transmission may comprise a PUCCH transmission. The first uplink transmission may comprise a request that requests the resource for the second uplink transmission. The request may have a format similar to a scheduling request (SR) or may be based on a new uplink control information (UCI) type. The requested resource may be a PUSCH and/or a PUCCH resource. In response to the first uplink transmission in step 2710, wireless device 2702 may receive a DCI (not shown in FIG. 27) indicating an uplink resource for the second uplink transmission. The uplink resource may comprise a PUSCH and/or a PUCCH resource. After receiving the DCI, wireless device 2702 may transmit, in step 2712, the second uplink transmission via the uplink resource. The second uplink transmission may comprise/carry (or may be multiplexed with) the UE-initiated beam/CSI report indicating the first reference signal. In an implementation, the DCI triggers transmission of the second uplink transmission via a PUSCH resource scheduled/indicated by the DCI. For example, the DCI may be a DCI format 0_1/0_2/0_3 that comprises a CSI request field that indicates a CSI trigger state associated with UE-initiated beam report configuration(s). In response to the DCI, wireless device 2702 transmits the UE-initiated beam/CSI report in a second PUSCH resource scheduled/indicated by the DCI.

In accordance with the second mode/option of UEIBR, wireless device 2702 may be configured, after triggering a UE-initiated beam/CSI report, to transmit a first uplink transmission to base station 2704 to notify of a second uplink transmission that will carry (or be multiplexed with) the UE-initiated beam/CSI report. In an implementation, as illustrated in step 2710, the first uplink transmission may comprise a PUCCH transmission. In an implementation, a (e.g., only one) periodic PUCCH resource (corresponding to a first uplink channel) for use for the first uplink transmission is associated with the CSI report configuration for UE-initiated/event-driven beam reporting. The PUCCH transmission for the first uplink transmission may thus be performed via the periodic PUCCH resource (or via the first uplink channel). The first uplink transmission may comprise a notification that indicates a transmission occasion, of the periodic PUCCH resource, that will be used by wireless device 2702 for the second uplink transmission. The notification may have a format similar to an SR or may be based on a new uplink control information (UCI) type. After notifying the second uplink transmission, wireless device 2702 may transmit, in step 2712, the second uplink transmission via the transmission occasion indicated/notified in the first uplink transmission. The second uplink transmission may comprise/carry (or may be multiplexed with) the UE-initiated beam report indicating the first reference signal.

Figure 28:
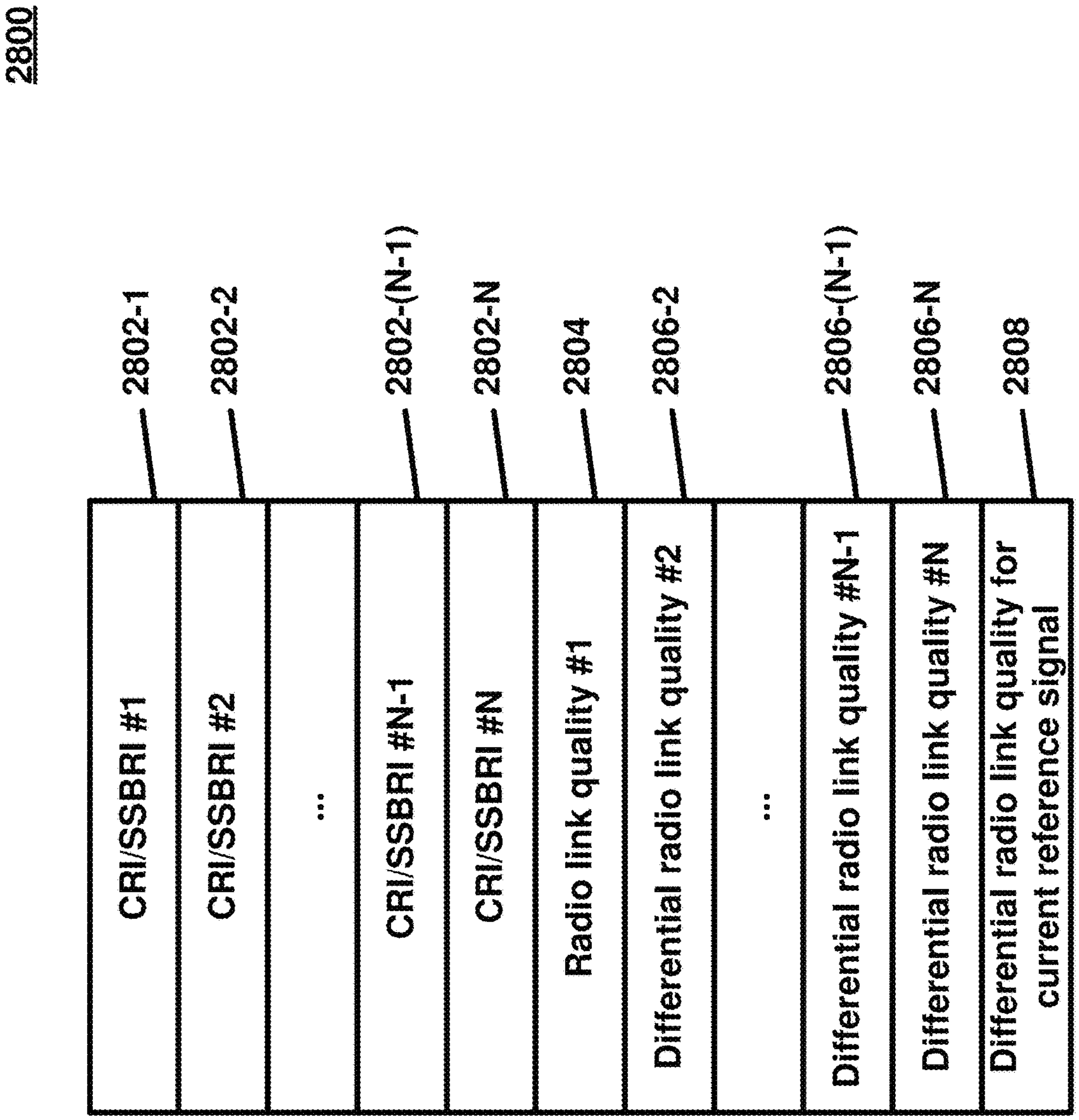
FIG. 28 illustrates an existing UE-initiated beam/CSI report.

In an example, the UE-initiated beam/CSI report transmitted by wireless device 2702 may use an existing beam/CSI report format 2800 illustrated in FIG. 28. As shown in FIG. 28, beam/CSI report format 2800 includes a plurality of fields 2802-1, . . . , 2802-N each indicating a respective reference signal resource indicator (e.g., CSI-RS resource indicator (CRI) or SSB resource indicator (SSBRI)) for a respective reference signal among N reported reference signals of the first list/set of reference signals; a field 2804 indicating an absolute radio link quality (e.g., L1-RSRP) for a first reference signal of the N reported reference signals where the first reference signal corresponds to the reference signal, of the N reference signals, with the largest/highest measured radio link quality among the N reported reference signals; a plurality of fields 2806-2, . . . , 2806-N each indicating a differential radio link quality for a respective reference signal (not including the first reference signal) of the N reported reference signals; and a field 2808 indicating a differential radio link quality for a current reference signal (if enabled).

The plurality of fields 2802-1, . . . , 2802-N are ordered in beam/CSI report format 2800 based on the measured radio link qualities (e.g., L1-RSRP) of the respective N reference signals indicated by the plurality of fields 2802-1, . . . , 2802-N. For example, the first listed field 2802-1 indicates the reference signal resource indicator (e.g., CRI/SSBRI #1) of the first reference signal (with the largest/highest radio link quality) of the N reported reference signals. The following field 2802-2 indicates the reference signal resource indicator (e.g., CRI/SSBRI #2) of a second reference signal of the N reported reference signals where the second reference signal is associated with the second largest/highest radio link quality among the N reported reference signals, and so on. The last listed field 2802-N indicates the reference signal resource indicator (e.g., CRI/SSBRI #N) of an N-th reference signal of the N reported reference signals where the N-th reference signal is associated with the smallest/lowest radio link quality among the N reported reference signals.

The field 2804 indicates the measured (absolute) radio link quality (e.g., L1-RSRP) of the first reference signal (with the largest/highest radio link quality) of the N reported reference signals). The plurality of fields 2860-2, . . . , 2806-N indicate differential radio link qualities for the second to the N-th reference signals (e.g., CRI/SSBRI #2, . . . , CRI/SSBRI #N−1, CRI/SSBRI #N) of the N reported reference signals, relative to the measured (absolute) radio link quality of the first reference signal (e.g., CRI/SSBRI #1). The differential radio link quality for a j-th reference signal, of the second to the N-th reference signals, may be determined as the difference between the measured (absolute) radio link quality of the j-th reference signal and the measured (absolute) radio link quality of the first reference signal (e.g., CRI/SSBRI #1).

The field 2808 indicates the differential radio link quality for the current reference signal relative to the measured (absolute) radio link quality of the first reference signal (e.g., CRI/SSBRI #1) of the N reported reference signals. The differential radio link quality for the current reference signal may be determined as the difference between the measured (absolute) radio link quality of the current reference signal and the measured (absolute) radio link quality of the first reference signal (e.g., CRI/SSBRI #1).

Returning to FIG. 27, when beam/CSI report format 2800 is used by wireless device 2702 for the UE-initiated beam/CSI report, beam/CSI report format 2800 may provide in field 2808 the differential radio link quality of the reference signal indicated by the indicated TCI state indicated by the first parameter (e.g., applyIndicatedTCI-State-UEIBR), of the one or more configuration parameters. However, as wireless device 2702 is indicated with two TCI states (first and second TCI states), the UE-initiated beam/CSI report (using beam/CSI report format 2800) does not allow base station 2704 to determine whether the differential radio link quality provided in field 2808 is for the reference signal indicated by the first TCI state or for the reference signal indicated by the second TCI state. In an example, where the first TCI state corresponds to a first TRP and the second TCI state corresponds to a second TRP, base station 2704 may not be able to determine, based on the UE-initiated beam CSI/report, whether to update the current beam for the first TRP or for the second TRP.

Figure 29:
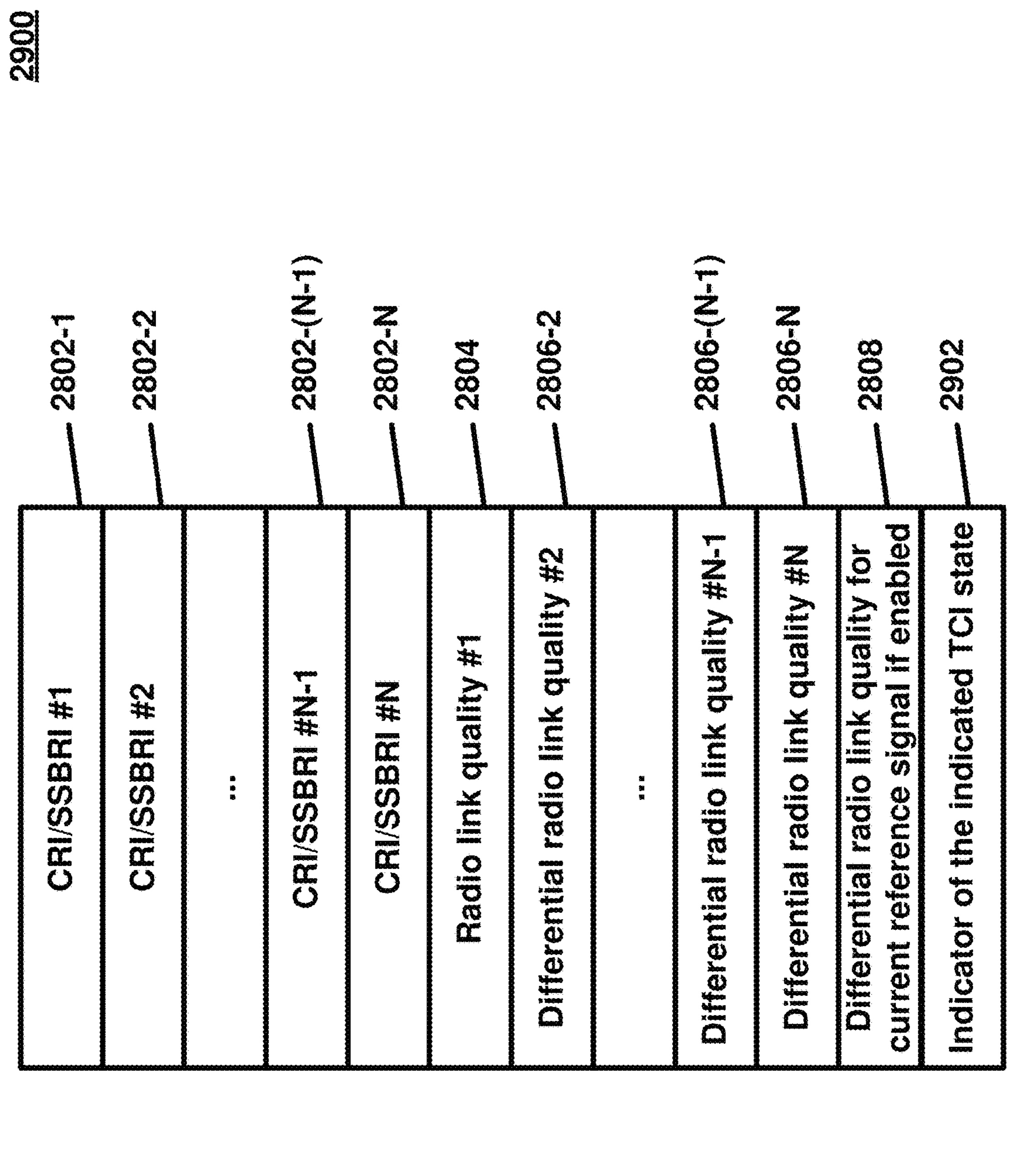
FIG. 29 illustrates an example UE-initiated beam/CSI report format according to an embodiment.

In an embodiment, to eliminate this problem, the UE-initiated beam/CSI report transmitted by wireless device 2702 may use a beam/CSI report format 2900 shown in FIG. 29. As illustrated, beam/CSI report format 2900 includes a field 2902 that comprises/provides an indicator of the TCI state being indicated in the UE-initiated beam/CSI report. For example, when wireless device 2702 is indicated a first TCI state and a second TCI state, field 2902 (e.g., 1-bit field) indicates whether the UE-initiated beam/CSI report is for the first TCI state or for the second TCI state. In an embodiment, field 2902 indicates whether field 2808 provides the differential radio link quality of the reference signal indicated by the first TCI state or the reference signal indicated by the second TCI state. A first value (e.g., 0) of the field 2902 may indicate the first TCI state, and a second value (e.g., 1) of the field 2902 may indicate the second TCI state. In another embodiment, when wireless device 2702 is configured with a first list/set of reference signals for the first TCI state and a second list/set of reference signals for the second TCI state, field 2902 may further indicate whether fields 2802-1, . . . , 2802-N, field 2804, and/or fields 2806-2, . . . , 2806-N are for the first TCI state or for the second TCI state.

Figure 30:
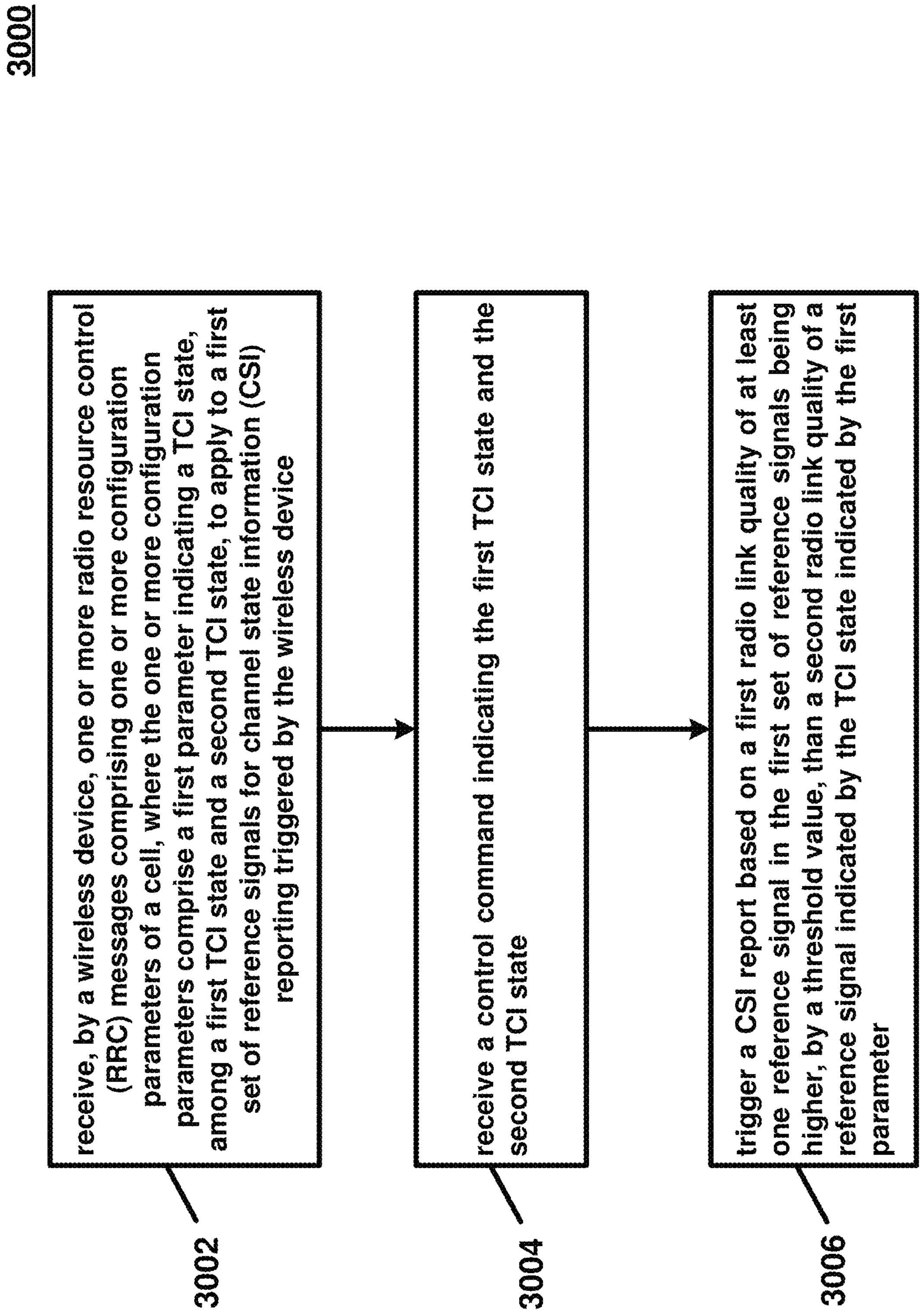
FIG. 30 illustrates an example process according to an embodiment.

FIG. 30 illustrates an example process 3000 according to an embodiment. Example process 3000 is provided for the purpose of illustration only and is not limiting of embodiments. Example process 3000 may be performed by a wireless device such as wireless device 2702. As shown in FIG. 30, example process 3000 may include steps 3002, 3004, and 3006.

Step 3002 includes receiving, by the wireless device, one or more RRC messages comprising one or more configuration parameters of a cell. The one or more configuration parameters may comprise a first parameter indicating a TCI state, among a first TCI state and a second TCI state, to apply to a first set of reference signals for beam/CSI reporting triggered by the wireless device. In another embodiment, the first parameter may, additionally or alternatively, comprise/indicate a parameter (e.g., TCI parameter) that indicates a serving cell on which an indicated TCI state is applied, where the indicated TCI state is used (e.g., by the wireless device) to determine a reference signal associated with a current beam (e.g., used by wireless device). In an embodiment, process 3000 may further comprise receiving a DCI indicating the TCI state for the cell. The wireless device may apply the TCI state to downlink receptions via the cell.

Step 3004 includes receiving a control command indicating the first TCI state and the second TCI state.

Step 3006 includes triggering a beam/CSI report based on a first radio link quality of at least one reference signal in the first set of reference signals being higher, by a threshold value, than a second radio link quality of a reference signal indicated by the TCI state indicated by the first parameter (or the reference signal associated with the indicated TCI state). In another embodiment, step 3006 includes triggering a beam/CSI report based on the second radio link quality of the reference signal indicated by the TCI state indicated by the first parameter being/becoming lower/worse than a threshold value.

In an embodiment, process 3000 may further comprise transmitting the CSI report indicating the at least one reference signal.

In an embodiment, the one or more configuration parameters indicate a list of TCI states comprising the first TCI state and the second TCI state. In an embodiment, the one or more configuration parameters comprise a downlink-or-joint TCI state list parameter indicating the list of TCI states. In an embodiment, the list of TCI states indicates a transmission configuration that includes quasi-colocation (QCL) relationships between at least one of: one or more downlink reference signals (RSs) in a reference signal (RS) set and physical downlink shared channel (PDSCH) demodulation reference signal (DMRS) ports, one or more downlink RSs in an RS set and physical downlink control channel (PDCCH) DMRS ports, and one or more downlink RSs in an RS set and CSI-RS ports. In an embodiment, each TCI state in the list of TCI states indicates a respective reference signal for quasi co-location for at least one of: a demodulation reference signal (DMRS) of a physical downlink shared channel (PDSCH) in a bandwidth part (BWP) of the cell; a DMRS of a physical downlink control channel (PDCCH) in a BWP of the cell; and a channel state information reference signal (CSI-RS) in a BWP of the cell.

In an embodiment, based on the one or more configuration parameters comprising a unified TCI type parameter set to 'joint', the list of TCI states indicates a transmission configuration that includes quasi-colocation (QCL) relationships between at least one of: one or more downlink reference signals (RSs) in a reference signal (RS) set and a physical uplink shared channel (PUSCH); one or more downlink RSs in an RS set and a physical uplink control channel (PUCCH); and one or more downlink RSs in an RS set and a sounding reference signal (SRS).

In an embodiment, each TCI state in the list of TCI states indicates a respective reference signal for determining an uplink transmission spatial filter or a transmission power for at least one of: a dynamic-grant based physical uplink shared channel (PUSCH) in a bandwidth part (BWP) of the cell; a configured-grant based PUSCH in a BWP of the cell;

a physical uplink control channel (PUCCH) resource in a BWP of the cell; and a sounding reference signal (SRS) in a BWP of the cell.

In an embodiment, the one or more configuration parameters indicate the first set of reference signals. In an embodiment, the one or more configuration parameters comprise one or more first CSI reporting configuration parameters of a first CSI report configuration. The one or more first CSI reporting configuration parameters may comprise: a first CSI resource parameter indicating the first set of reference signals; and the first parameter.

In an embodiment, the first set of reference signals comprises one or more reference signals. The one or more reference signals may comprise one or more CSI reference signals (CSI-RSs). In an embodiment, the one or more first CSI reporting configuration parameters indicate 'repetition' for the first set of reference signals comprising the one or more CSI-RSs. In an embodiment, based on the one or more first CSI reporting configuration parameters indicating 'repetition' for the first set of reference signals comprising the one or more CSI-RSs, the one or more CSI-RSs are transmitted, by a base station, with a same downlink spatial domain transmission filter.

In an embodiment, the reference signal indicated by the TCI state indicated by the first parameter comprises a CSI-RS indicated by the TCI state. The CSI-RS indicated by the TCI state may be a quasi co-location reference signal in the TCI state. In an embodiment, the reference signal indicated by the TCI state indicated by the first parameter comprises the CSI-RS indicated by the TCI state based on the first set of reference signals being/comprising CSI-RSs.

In an embodiment, the one or more reference signals comprise one or more synchronization signal blocks (SSBs). In an embodiment, the reference signal indicated by the TCI state indicated by the first parameter comprises an SSB indicated by the TCI state. The SSB indicated by the TCI state may be quasi co-located with a quasi co-location reference signal in the TCI state. In an embodiment, the reference signal indicated by the TCI state indicated by the first parameter comprises the SSB indicated by the TCI state based on the first set of reference signals being/comprising SSBs.

In an embodiment, the one or more first CSI reporting configuration parameters comprise an event type parameter indicating an event type for the CSI reporting triggered by the wireless device.

In an embodiment, the one or more first CSI reporting configuration parameters comprise a threshold parameter indicating the threshold value.

In an embodiment, the triggering of the CSI report is based on a total number of trigger-event instances for the at least one reference signal being equal to or greater than an event instance count (e.g. minimum/maximum) count within a time window. In an embodiment, the event instance count indicates a minimum number of event instances for which (or that should occur before) the wireless device triggers a UE-initiated CSI report for a reference signal of the set of reference signals.

In an embodiment, the one or more first CSI reporting configuration parameters comprise: a time window parameter indicating the time window; and/or a count parameter indicating the maximum count.

In an embodiment, the one or more configuration parameters further comprise one or more second CSI reporting configuration parameters. In an embodiment, the one or more first CSI reporting configuration parameters comprise the first parameter based on the one or more first CSI reporting configuration parameters being for the CSI reporting triggered by the wireless device; and the one or more second CSI reporting configuration parameters do not comprise the first parameter based on the one or more second CSI reporting configuration parameters not being for the CSI reporting triggered by the wireless device.

In an embodiment, the one or more first CSI reporting configuration parameters further comprise a second CSI resource parameter indicating a second set of reference signals for the CSI reporting triggered by the wireless device. The one or more first CSI reporting configuration parameters may further comprise a second parameter indicating a TCI state, among the first TCI state and the second TCI state, to apply to the second set of reference signals for the CSI reporting triggered by the wireless device. In an embodiment, the one or more first CSI reporting configuration parameters comprise the second parameter based on the one or more first CSI reporting configuration parameters comprising: the second CSI resource parameter indicating the second set of reference signals; and/or the first parameter. In an embodiment, the one or more first CSI reporting configuration parameters do not comprise the second parameter based on the one or more first CSI reporting configuration parameters not comprising at least one of: the second CSI resource parameter indicating the second set of reference signals; and/or the first parameter.

In an embodiment, the control command comprises a MAC-CE that maps the first and second TCI states to (only) one TCI codepoint.

In an embodiment, process 3000 may further comprise receiving a MAC-CE indicating activation of a subset of TCI states from the list of TCI states. The MAC-CE may be used, by the wireless device, to map the subset of TCI states to one or more TCI codepoints.

In an embodiment, the control command comprises a DCI format 1_1/1_2/1_3 comprising a TCI field. A value of the TCI field may indicate a TCI codepoint, among the one or more TCI codepoints, indicating the first and second TCI states. The subset of TCI states comprises the first and second TCI states.

In an embodiment, a first value of the first parameter indicates to apply the first TCI state, among the first TCI state and the second TCI state, to the first set of reference signals for the CSI reporting triggered by the wireless device; and a second value of the first parameter indicates to apply the second TCI state, among the first TCI state and the second TCI state, to the first set of reference signals for the CSI reporting triggered by the wireless device.

In an embodiment, the first radio link quality of the at least one reference signal comprises a layer-1 received signal received power (L1-RSRP); and the second radio link quality of the reference signal indicated by the TCI state comprises an L1-RSRP.

In an embodiment, TCI state is: the first TCI state based on the first parameter being equal to the first value; and the second TCI state based on the first parameter being equal to the second value.

In an embodiment, process 3000 may further comprise transmitting a PUCCH transmission requesting an uplink resource to transmit the CSI report; and receiving a DCI indicating the uplink resource. In an embodiment, the transmitting of the CSI report is via the uplink resource.

In another embodiment, process 3000 may further comprise transmitting a PUCCH transmission notifying transmission of the CSI report via an uplink resource. The transmitting of the CSI report may be after the PUCCH transmission.

In an embodiment, process 3000 may further comprise applying the TCI state indicated by the first parameter to the first set of reference signals. In an embodiment, the applying of the TCI state indicated by the first parameter comprises comparing radio link qualities of the first set of reference signals with the reference signal indicated by the TCI state indicated by the first parameter to detect an event of the CSI reporting triggered by the wireless device.

In an embodiment, the first and second TCI states comprise: joint TCI states; or downlink TCI states.

In an embodiment, process 3000 may further comprise receiving one or more second configuration parameters of the cell, where the one or more second configuration parameters: indicate a second list of TCI states comprising a third TCI state and a fourth TCI state; indicate a second set of reference signals for CSI reporting triggered by the wireless device; and do not comprise a third parameter indicating a TCI state, among the third TCI state and the fourth TCI state, to apply to the second set of reference signals for the CSI reporting triggered by the wireless device. In an embodiment, process 3000 may further comprise receiving a second control command indicating the third and fourth TCI states; and triggering a second CSI report based on a third radio link quality of at least one second reference signal in the second set of reference signals being better, by the threshold value, than a fourth radio link quality of a reference signal indicated by a default TCI state among the indicated third and fourth TCI states. In an embodiment, process 3000 may further comprise transmitting the second CSI report indicating the at least one second reference signal.

In an embodiment, the default TCI state corresponds to the TCI state, among the third TCI state and the fourth TCI state, indicated by a field "Fk,1", where k=1, . . . , 8, of a MAC CE.

In an embodiment, the first parameter further indicates whether to apply the first TCI state or the second TCI state for reception of the first set of reference signals.

In an embodiment, the first parameter applies to each reference signal of the first set of reference signals. In an embodiment, a first value of the first parameter indicates to apply the first TCI state, among the first and second TCI states, to each reference reference signal for both reception of the reference signal and for use of the reference signal to detect a trigger event of the CSI reporting triggered by the wireless device; and a second value of the first parameter indicates to apply the second TCI state, among the first and second TCI states, to each reference signal for both reception of the reference signal and for use of the reference signal to detect the trigger event.

In an embodiment, the first parameter applies to a first reference signal of the first set of reference signals. In an embodiment, a first value of the first parameter indicates to apply the first TCI state, among the first and second TCI states, to the first reference signal for both reception of the first reference signal and use of the first reference signal to detect a trigger event of the CSI reporting triggered by the wireless device; and a second value of the first parameter indicates to apply the second TCI state, among the first and second TCI states, to the first reference signal for both reception of the first reference signal and use of the first reference signal to detect the trigger event of the CSI reporting triggered by the wireless device.

Figure 31:
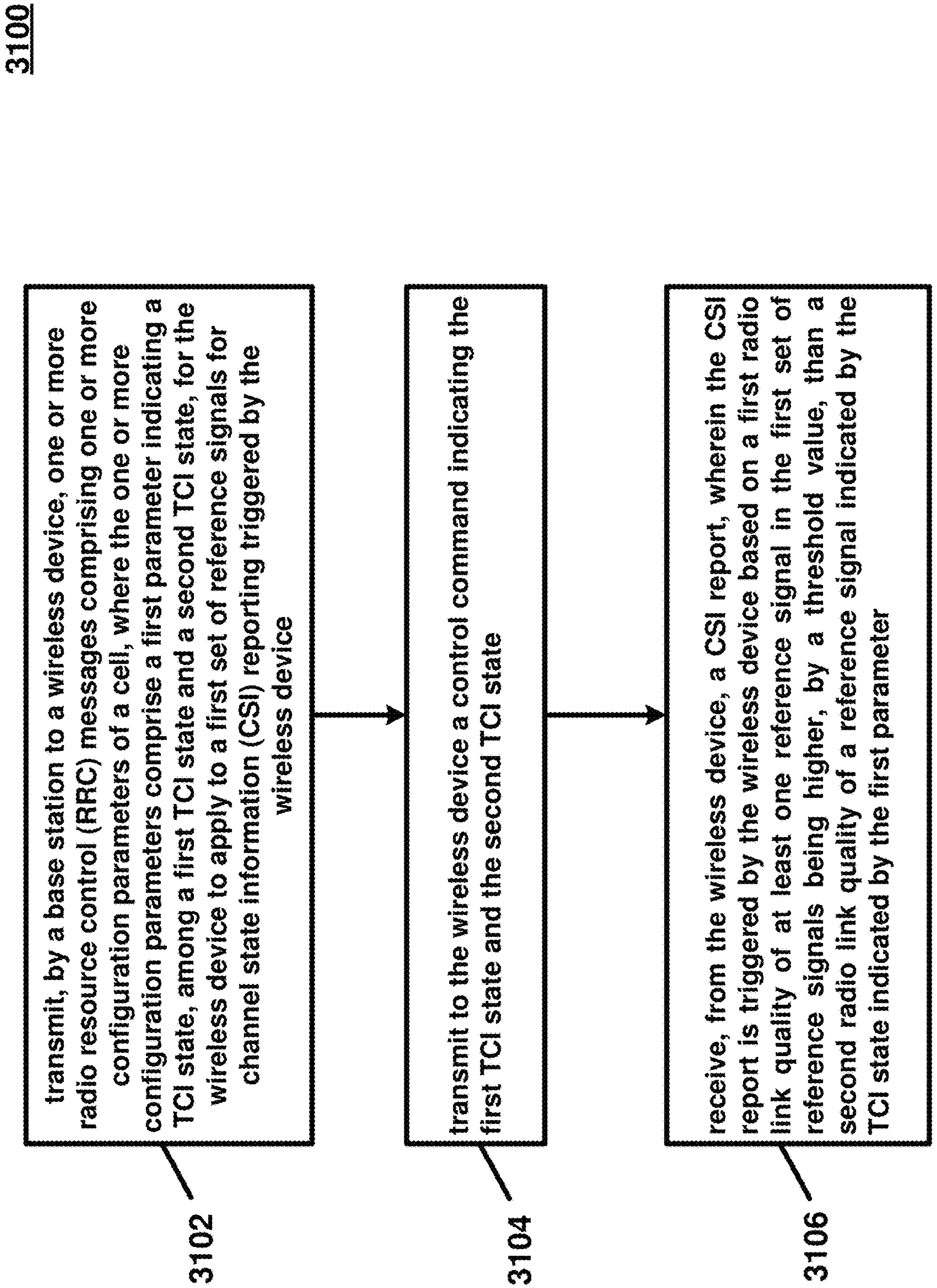
FIG. 31 illustrates another example process according to an embodiment.

FIG. 31 illustrates another example process 3100 according to an embodiment. Example process 3100 is provided for the purpose of illustration only and is not limiting of embodiments. Example process 3100 may be performed by a base station such as base station 2704. As shown in FIG. 31, example process 3100 may include steps 3102, 3104, and 3106.

Step 3102 includes transmitting, by the base station to a wireless device, one or more RRC messages comprising one or more configuration parameters of a cell. The one or more configuration parameters may comprise a first parameter indicating a TCI state, among a first TCI state and a second TCI state, for the wireless device to apply to a first set of reference signals for beam/CSI reporting triggered by the wireless device. In another embodiment, the first parameter may, additionally or alternatively, comprise/indicate a parameter (e.g., TCI parameter) that indicates a serving cell on which an indicated TCI state is applied, where the indicated TCI state is used (e.g., by the wireless device) to determine a reference signal associated with a current beam (e.g., used by wireless device). In an embodiment, process 3100 may further comprise transmitting a DCI indicating the TCI state for the cell. The wireless device may apply the TCI state to downlink receptions via the cell.

Step 3104 includes transmitting, to the wireless device, a control command indicating the first TCI state and the second TCI state.

Step 3106 includes receiving, from the wireless device, a beam/CSI report, wherein the beam/CSI report is triggered by the wireless device based on a first radio link quality of at least one reference signal in the first set of reference signals being higher, by a threshold value, than a second radio link quality of a reference signal indicated by the TCI state indicated by the first parameter. In an embodiment, the beam/CSI report is triggered by the wireless device based on the second radio link quality of the reference signal indicated by the TCI state indicated by the first parameter becoming/being lower/worse than a threshold value.

In an embodiment, the CSI report indicates the at least one reference signal.

In an embodiment, the one or more configuration parameters indicate a list of TCI states comprising the first TCI state and the second TCI state. In an embodiment, the one or more configuration parameters comprise a downlink-or-joint TCI state list parameter indicating the list of TCI states. In an embodiment, the list of TCI states indicates a transmission configuration that includes quasi-colocation (QCL) relationships between at least one of: one or more downlink reference signals (RSs) in a reference signal (RS) set and physical downlink shared channel (PDSCH) demodulation reference signal (DMRS) ports, one or more downlink RSs in an RS set and physical downlink control channel (PDCCH) DMRS ports, and one or more downlink RSs in an RS set and CSI-RS ports. In an embodiment, each TCI state in the list of TCI states indicates a respective reference signal for quasi co-location for at least one of: a demodulation reference signal (DMRS) of a physical downlink shared channel (PDSCH) in a bandwidth part (BWP) of the cell; a DMRS of a physical downlink control channel (PDCCH) in a BWP of the cell; and a channel state information reference signal (CSI-RS) in a BWP of the cell.

In an embodiment, based on the one or more configuration parameters comprising a unified TCI type parameter set to 'joint', the list of TCI states indicates a transmission configuration that includes quasi-colocation (QCL) relationships between at least one of: one or more downlink reference signals (RSs) in a reference signal (RS) set and a physical uplink shared channel (PUSCH); one or more downlink RSs in an RS set and a physical uplink control channel (PUCCH); and one or more downlink RSs in an RS set and a sounding reference signal (SRS).

In an embodiment, each TCI state in the list of TCI states indicates a respective reference signal for determining an uplink transmission spatial filter or a transmission power for at least one of: a dynamic-grant based physical uplink shared channel (PUSCH) in a bandwidth part (BWP) of the cell; a configured-grant based PUSCH in a BWP of the cell;

a physical uplink control channel (PUCCH) resource in a BWP of the cell; and a sounding reference signal (SRS) in a BWP of the cell.

In an embodiment, the one or more configuration parameters indicate the first set of reference signals. In an embodiment, the one or more configuration parameters comprise one or more first CSI reporting configuration parameters of a first CSI report configuration. The one or more first CSI reporting configuration parameters may comprise: a first CSI resource parameter indicating the first set of reference signals; and the first parameter.

In an embodiment, the first set of reference signals comprises one or more reference signals. The one or more reference signals may comprise one or more CSI reference signals (CSI-RSs). In an embodiment, the one or more first CSI reporting configuration parameters indicate 'repetition' for the first set of reference signals comprising the one or more CSI-RSs. In an embodiment, based on the one or more first CSI reporting configuration parameters indicating 'repetition' for the first set of reference signals comprising the one or more CSI-RSs, the one or more CSI-RSs are transmitted, by a base station, with a same downlink spatial domain transmission filter.

In an embodiment, the reference signal indicated by the TCI state indicated by the first parameter comprises a CSI-RS indicated by the TCI state. The CSI-RS indicated by the TCI state may be a quasi co-location reference signal in the TCI state. In an embodiment, the reference signal indicated by the TCI state indicated by the first parameter comprises the CSI-RS indicated by the TCI state based on the first set of reference signals being/comprising CSI-RSs.

In an embodiment, the one or more reference signals comprise one or more synchronization signal blocks (SSBs). In an embodiment, the reference signal indicated by the TCI state indicated by the first parameter comprises an SSB indicated by the TCI state. The SSB indicated by the TCI state may be quasi co-located with a quasi co-location reference signal in the TCI state. In an embodiment, the reference signal indicated by the TCI state indicated by the first parameter comprises the SSB indicated by the TCI state based on the first set of reference signals being/comprising SSBs.

In an embodiment, the one or more first CSI reporting configuration parameters comprise an event type parameter indicating an event type for the CSI reporting triggered by the wireless device.

In an embodiment, the one or more first CSI reporting configuration parameters comprise a threshold parameter indicating the threshold value.

In an embodiment, the triggering of the CSI report by the wireless device is based on a total number of trigger-event instances for the at least one reference signal being equal to or greater than an event instance count (e.g., minimum/maximum count) within a time window. In an embodiment, the event instance count indicates a minimum number of event instances for which (or that should occur before) the wireless device triggers a UE-initiated CSI report for a reference signal of the set of reference signals.

In an embodiment, the one or more first CSI reporting configuration parameters comprise: a time window parameter indicating the time window; and/or a count parameter indicating the maximum count.

In an embodiment, the one or more configuration parameters further comprise one or more second CSI reporting configuration parameters. In an embodiment, the one or more first CSI reporting configuration parameters comprise the first parameter based on the one or more first CSI reporting configuration parameters being for the CSI reporting triggered by the wireless device; and the one or more second CSI reporting configuration parameters do not comprise the first parameter based on the one or more second CSI reporting configuration parameters not being for the CSI reporting triggered by the wireless device.

In an embodiment, the one or more first CSI reporting configuration parameters further comprise a second CSI resource parameter indicating a second set of reference signals for the CSI reporting triggered by the wireless device. The one or more first CSI reporting configuration parameters may further comprise a second parameter indicating a TCI state, among the first TCI state and the second TCI state, to apply to the second set of reference signals for the CSI reporting triggered by the wireless device. In an embodiment, the one or more first CSI reporting configuration parameters comprise the second parameter based on the one or more first CSI reporting configuration parameters comprising: the second CSI resource parameter indicating the second set of reference signals; and/or the first parameter. In an embodiment, the one or more first CSI reporting configuration parameters do not comprise the second parameter based on the one or more first CSI reporting configuration parameters not comprising at least one of: the second CSI resource parameter indicating the second set of reference signals; and/or the first parameter.

In an embodiment, the control command comprises a MAC-CE that maps the first and second TCI states to (only) one TCI codepoint.

In an embodiment, process 3100 may further comprise transmitting to the wireless device a MAC-CE indicating activation of a subset of TCI states from the list of TCI states. The MAC-CE may be used, by the wireless device, to map the subset of TCI states to one or more TCI codepoints.

In an embodiment, the control command comprises a DCI format 1_1/1_2/1_3 comprising a TCI field. A value of the TCI field may indicate a TCI codepoint, among the one or more TCI codepoints, indicating the first and second TCI states. The subset of TCI states comprises the first and second TCI states.

In an embodiment, a first value of the first parameter indicates to the wireless device to apply the first TCI state, among the first TCI state and the second TCI state, to the first set of reference signals for the CSI reporting triggered by the wireless device; and a second value of the first parameter indicates to the wireless device to apply the second TCI state, among the first TCI state and the second TCI state, to the first set of reference signals for the CSI reporting triggered by the wireless device.

In an embodiment, the first radio link quality of the at least one reference signal comprises a layer-1 received signal received power (L1-RSRP); and the second radio link quality of the reference signal indicated by the TCI state comprises an L1-RSRP.

In an embodiment, TCI state is: the first TCI state based on the first parameter being equal to the first value; and the second TCI state based on the first parameter being equal to the second value.

In an embodiment, process 3100 may further comprise receiving, from the wireless device, a PUCCH transmission requesting an uplink resource to transmit the CSI report; and transmitting, to the wireless device, a DCI indicating the uplink resource. In an embodiment, the receiving of the CSI report is via the uplink resource.

In another embodiment, process 3100 may further comprise receiving, from the wireless device, a PUCCH transmission notifying transmission of the CSI report via an uplink resource. The receiving of the CSI report may be after the PUCCH transmission.

In an embodiment, the wireless device applies the TCI state indicated by the first parameter to the first set of reference signals. In an embodiment, the applying of the TCI state indicated by the first parameter comprises comparing radio link qualities of the first set of reference signals with the reference signal indicated by the TCI state indicated by the first parameter to detect an event of the CSI reporting triggered by the wireless device.

In an embodiment, the first and second TCI states comprise: joint TCI states; or downlink TCI states.

In an embodiment, process 3100 may further comprise transmitting to the wireless device one or more second configuration parameters of the cell, where the one or more second configuration parameters: indicate a second list of TCI states comprising a third TCI state and a fourth TCI state; indicate a second set of reference signals for CSI reporting triggered by the wireless device; and do not comprise a third parameter indicating a TCI state, among the third TCI state and the fourth TCI state, to apply to the second set of reference signals for the CSI reporting triggered by the wireless device. In an embodiment, process 3100 may further comprise transmitting to the wireless device a second control command indicating the third and fourth TCI states. In an embodiment, the wireless device triggers a second CSI report based on a third radio link quality of at least one second reference signal in the second set of reference signals being better, by the threshold value, than a fourth radio link quality of a reference signal indicated by a default TCI state among the indicated third and fourth TCI states. In another embodiment, the wireless device triggers a second CSI report based on the fourth radio link quality of the reference signal indicated by the default TCI state among the indicated third and fourth TCI states being lower/worse than a threshold value. In an embodiment, process 3100 may further comprise receiving from the wireless device the second CSI report indicating the at least one second reference signal.

In an embodiment, the default TCI state corresponds to the TCI state, among the third TCI state and the fourth TCI state, indicated by a field "Fk,1", where k=1, . . . , 8, of a MAC CE.

In an embodiment, the first parameter further indicates to the wireless device whether to apply the first TCI state or the second TCI state for reception of the first set of reference signals.

In an embodiment, the first parameter applies to each reference signal of the first set of reference signals. In an embodiment, a first value of the first parameter indicates to the wireless device to apply the first TCI state, among the first and second TCI states, to each reference signal for both reception of the reference signal and for use of the reference signal to detect a trigger event of the CSI reporting triggered by the wireless device; and a second value of the first parameter indicates to apply to the wireless device the second TCI state, among the first and second TCI states, to each reference signal for both reception of the reference signal and for use of the reference signal to detect the trigger event.

In an embodiment, the first parameter applies to a first reference signal of the first set of reference signals. In an embodiment, a first value of the first parameter indicates to the wireless device to apply the first TCI state, among the first and second TCI states, to the first reference signal for both reception of the first reference signal and use of the first reference signal to detect a trigger event of the CSI reporting triggered by the wireless device; and a second value of the first parameter indicates to the wireless device to apply the second TCI state, among the first and second TCI states, to the first reference signal for both reception of the first reference signal and use of the first reference signal to detect the trigger event of the CSI reporting triggered by the wireless device.

A further example method according to an embodiment is described below. The example method may be performed by a wireless device. In an embodiment, the method includes receiving, by the wireless device (e.g., from a base station), one or more radio resource control (RRC) messages comprising channel state information (CSI) report configuration parameters for user-equipment (UE)-initiated CSI reporting. In an embodiment, the CSI report configuration parameters comprise: a CSI resource parameter indicating a set of reference signals; an event instance count indicating a minimum number of event instances for which the wireless device triggers a UE-initiated CSI report for a reference signal of the set of reference signals; a transmission configuration indication (TCI) parameter indicating a serving cell on which an indicated TCI state is applied, where the indicated TCI state is used to determine a first reference signal associated with a current beam; and/or a threshold (e.g., for radio link quality). In another embodiment, the CSI report configuration parameters further indicate an event detection time window length parameter indicating a time window for triggering event determination. In an embodiment, the CSI report configuration parameters further comprise an event type parameter indicating an event type for the UE-initiated CSI reporting.

In an embodiment, the method further comprises receiving, by the wireless device (e.g., from the base station), a downlink control information (DCI) indicating the TCI state for the cell; and applying the TCI state to downlink receptions via the cell. In an embodiment, the TCI state is a downlink TCI state or a joint TCI state. In an embodiment, the second reference signal associated with the TCI state is a reference signal in the TCI state; or an SS/PBCH block that is quasi co-located with a reference signal in the TCI state.

In an embodiment, the method further includes incrementing a counter based on determining an event instance for a second reference signal among the set of reference signals. In an embodiment, the event instance is determined based on a second radio link quality of the second reference signal being greater, by at least the threshold, than a first radio link quality of the first reference signal associated with the indicated TCI state of the serving cell. In an embodiment, the time window is started based on determining the event instance. In an embodiment, a trigger-event is detected based on the number of event instances within the time window being greater than or equal to the event instance count.

In an embodiment, the method further includes, based on a number of event instances determined by the counter for the second reference signal being greater than or equal to the event instance count, transmitting a physical uplink control channel (PUCCH) transmission (e.g., to the base station) for the UE-initiated CSI reporting. In an embodiment, the PUCCH transmission requests a dynamically scheduled PUSCH to carry a UE-initiated CSI report for Mode-A of the UE-initiated CSI reporting; and notifies of a Type-1 configured grant PUSCH to carry a UE-initiated CSI report for Mode-B of the UE-initiated CSI reporting. In an embodiment, in the Mode-A of the UE-initiated CSI reporting, the method may further comprise receiving, by the wireless device (e.g., from the base station), in the Mode-A of the UE-initiated CSI reporting, a DCI scheduling the PUSCH transmission, where the DCI comprises a CSI request field indicating a CSI trigger state associated with the UE-initiated CSI reporting.

In an embodiment, the method further includes transmitting, by the wireless device (e.g., to the base station) after the PUCCH transmission, a CSI report in a physical uplink shared channel (PUSCH), where the CSI report indicates the second reference signal. In an embodiment, in the Mode-B of the UE-initiated CSI reporting, the transmitting the CSI report is in a first available transmission occasion that occurs after a number of symbols after a last symbol of the PUCCH transmission. In an embodiment, the CSI report configuration parameters indicate the number of symbols. In an embodiment, the CSI report further indicates the first radio link quality of the first reference signal.

What is claimed is:

1. A wireless device comprising:
one or more processors; and
memory storing instructions that, when executed by the one or more processors, cause the wireless device to:
receive one or more radio resource control (RRC) messages comprising a channel state information (CSI) report configuration for user-equipment (UE)-initiated CSI reporting, wherein the CSI report configuration comprises:
a transmission configuration indication (TCI) parameter indicating a serving cell on which a TCI state, used to determine a first reference signal associated with a current beam, is applied; and
a threshold;
detect, for the UE-initiated CSI reporting, an event based on:
a first radio link quality of the first reference signal; and
the threshold;
based on detecting the event, transmit a physical uplink control channel (PUCCH) transmission for the UE-initiated CSI reporting; and
transmit, after the PUCCH transmission, a CSI report in a physical uplink shared channel (PUSCH).

2. The wireless device of claim 1, wherein the instructions, when executed by the one or more processors, further cause the wireless device to:
receive a downlink control information (DCI) indicating the TCI state; and
apply the TCI state to downlink receptions via the serving cell.

3. The wireless device of claim 1, wherein the CSI report configuration comprises a CSI resource parameter indicating a set of reference signals.

4. The wireless device of claim 3, wherein the event is detected based on a second radio link quality of a second reference signal from the set of reference signals being greater, by at least the threshold, than the first radio link quality of the first reference signal.

5. The wireless device of claim 4, wherein the CSI report indicates the second reference signal.

6. The wireless device of claim 3, wherein the CSI report configuration further comprises an event instance count indicating a minimum number of event instances for which the wireless device triggers a UE-initiated CSI report.

7. The wireless device of claim 6, wherein the instructions, when executed by the one or more processors, further cause the wireless device to increment a counter based on determining an event instance for a second reference signal among the set of reference signals, wherein the event instance for the second reference signal is determined based on a second radio link quality of the second reference signal being greater, by at least the threshold, than the first radio link quality of the first reference signal.

8. The wireless device of claim 7, wherein the event is detected based on a number of event instances indicated by the counter for the second reference signal being greater than or equal to the event instance count.

9. The wireless device of claim 7, wherein the CSI report configuration indicates an event detection time window length parameter indicating a time window for triggering event determination.

10. The wireless device of claim 9, wherein the instructions, when executed by the one or more processors, further cause the wireless device to start the time window based on determining the event instance.

11. The wireless device of claim 1, wherein the PUSCH carrying the CSI report uses:
a dynamic uplink grant in a first mode of UE-initiated CSI reporting; and
a Type 1 configured uplink grant in a second mode of UE-initiated CSI reporting.

12. The wireless device of claim 11, wherein the PUCCH transmission:
requests the dynamic uplink grant in the first mode of UE-initiated CSI reporting; and
notifies transmission of the CSI report using the Type 1 configured uplink grant in the second mode of UE-initiated CSI reporting.

13. A base station comprising:
one or more processors; and
memory storing instructions that, when executed by the one or more processors, cause the base station to:
transmit, to a wireless device, one or more radio resource control (RRC) messages comprising a channel state information (CSI) report configuration for user-equipment (UE)-initiated CSI reporting, wherein the CSI report configuration comprises:
- a transmission configuration indication (TCI) parameter indicating a serving cell on which a TCI state, used to determine a first reference signal associated with a current beam, is applied; and
- a threshold;

transmit, to the wireless device, a downlink control information (DCI) indicating the TCI state;

receive, from the wireless device, a physical uplink control channel (PUCCH) transmission for the UE-initiated CSI reporting; and receive, from the wireless device, a CSI report in a physical uplink shared channel (PUSCH).

14. The base station of claim 13, wherein the PUSCH carrying the CSI report uses:
- a dynamic uplink grant in a first mode of UE-initiated CSI reporting; and
- a Type 1 configured uplink grant in a second mode of UE-initiated CSI reporting.

15. The base station of claim 14, wherein the PUCCH transmission:
- requests the dynamic uplink grant in the first mode of UE-initiated CSI reporting; and
- notifies transmission of the CSI report using the Type 1 configured uplink grant in the second mode of UE-initiated CSI reporting.

16. The base station of claim 13, wherein the PUCCH transmission is based on the wireless device detecting an event, for the UE-initiated CSI reporting, based on a first radio link quality of the first reference signal and the threshold.

17. A non-transitory computer-readable medium comprising instructions that, when executed by one or more processors of a wireless device, cause the wireless device to:

receive one or more radio resource control (RRC) messages comprising a channel state information (CSI) report configuration for user-equipment (UE)-initiated CSI reporting, wherein the CSI report configuration comprises:
- a transmission configuration indication (TCI) parameter indicating a serving cell on which a TCI state, used to determine a first reference signal associated with a current beam, is applied; and
- a threshold;

detect, for the UE-initiated CSI reporting, an event based on:
- a first radio link quality of the first reference signal; and
- the threshold;

based on detecting the event, transmit a physical uplink control channel (PUCCH) transmission for the UE-initiated CSI reporting; and transmit, after the PUCCH transmission, a CSI report in a physical uplink shared channel (PUSCH).

18. The non-transitory computer-readable medium of claim 17, wherein the CSI report configuration comprises a CSI resource parameter indicating a set of reference signals.

19. The non-transitory computer-readable medium of claim 18, wherein the event is detected based on a second radio link quality of a second reference signal from the set of reference signals being greater, by at least the threshold, than the first radio link quality of the first reference signal.

20. The non-transitory computer-readable medium of claim 17, wherein the PUSCH carrying the CSI report uses:
- a dynamic uplink grant in a first mode of UE-initiated CSI reporting; and
- a Type 1 configured uplink grant in a second mode of UE-initiated CSI reporting.

* * * * *